(12) United States Patent
Nakamura

(10) Patent No.: US 6,659,570 B2
(45) Date of Patent: Dec. 9, 2003

(54) VEHICLE MOTION CONTROL DEVICE AND METHOD

(75) Inventor: Akira Nakamura, Tagata-gun (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 16 days.

(21) Appl. No.: 09/987,180

(22) Filed: Nov. 13, 2001

(65) Prior Publication Data

US 2002/0109402 A1 Aug. 15, 2002

(30) Foreign Application Priority Data

Nov. 20, 2000 (JP) .................................. 2000-353436
Aug. 31, 2001 (JP) .................................. 2001-264987

(51) Int. Cl.$^7$ .............................. B60T 8/58; B60T 8/66; B60T 8/52
(52) U.S. Cl. ................... 303/146; 180/147; 303/112; 701/74
(58) Field of Search .................. 303/146, 147, 303/148, 149, 150, 112; 701/74, 71, 80; 180/197

(56) References Cited

U.S. PATENT DOCUMENTS

| | | | | |
|---|---|---|---|---|
| 4,586,581 A | * | 5/1986 | Shibahata et al. | .......... 180/197 |
| 5,379,222 A | * | 1/1995 | Anan et al. | .................. 303/112 |
| 5,480,219 A | | 1/1996 | Kost et al. | |
| 5,657,229 A | * | 8/1997 | Naito et al. | .................. 303/112 |
| 6,070,952 A | | 6/2000 | Tozu et al. | |
| 6,089,680 A | * | 7/2000 | Yoshioka et al. | ............ 303/146 |
| 6,266,601 B1 | * | 7/2001 | Soga et al. | ..................... 701/74 |
| 6,308,126 B2 | * | 10/2001 | Yokoyama et al. | ............ 701/70 |
| 6,341,826 B2 | * | 1/2002 | Onogi | ........................ 303/112 |
| 6,473,682 B1 | * | 10/2002 | Nakamura | .................... 701/74 |

FOREIGN PATENT DOCUMENTS

| | | |
|---|---|---|
| DE | 42 00 061 A1 | 7/1993 |
| DE | 196 24 795 A1 | 1/1998 |
| EP | 0 943 515 A1 | 9/1999 |
| EP | 0 949 131 A2 | 10/1999 |
| EP | 0 995 656 A1 | 4/2000 |
| JP | 11-91526 A | 4/1999 |

* cited by examiner

*Primary Examiner*—Matthew C. Graham
(74) *Attorney, Agent, or Firm*—Oliff & Berridge, PLC

(57) ABSTRACT

Vehicle motion control devices and methods systematically treat a conditions of each wheel to acquire and maintain the vehicle behavior stability together with anti wheel lock and wheel spin processing, braking forces distribution. Device for controlling a running behavior of a vehicle estimates a road reaction force on each wheel, calculates a yaw moment around a centroid of the vehicle body generated by the road reaction force on each wheel, and controls driving and braking forces on each wheel based upon the yaw moments so as to stabilize a running of the vehicle. Spin and Drift conditions are detected through presently generated yaw moments and critical yaw moments which can be generated by a road reaction force assumed to be maximized. Physical parameters of each wheels, required for detecting and controlling the behavior of the vehicle are estimated with a theoretical tire model.

82 Claims, 30 Drawing Sheets

VEHICLE MOTION CONTROL DEVICE AND METHOD

BACKGROUND OF THE INVENTION

1. Field of the Invention

The present invention relates to a device and a method for controlling a motion of a vehicle such as an automobile, and more specifically, to such a device that controls driving and braking forces applied to wheels of a vehicle to stabilize the behavior of the vehicle during turn driving.

2. Description of Prior Art

In a modern automobile, a motion of a vehicle, such as a turning behavior of the vehicle body, is stabilized by an electronic controlling system monitoring vehicle running conditions such as a vehicle velocity, longitudinal and lateral accelerations, a yaw rate and a steering angle. When an undesirable condition such as a spin and a drift-out occurs, the controlling system cooperates with driving and braking systems to generate an appropriate driving or braking force on a particular wheel, which induces a yaw moment on the vehicle body (around its centroid) against the spin or drift-out condition, thereby maintaining an appropriate yaw rate of the vehicle body. For example, one of such devices for stabilizing the behavior of a vehicle body is disclosed in Japanese Patent Laid-Open Publication No. 11-91526, filed by Assignee of the present application, in which the behavior of a running vehicle is estimated through an index value (Drift-out Value) based upon a deviation between actual and target yaw rates of the vehicle body. When the behavior stability is deteriorated, the device applies braking forces to wheels individually, depending upon the degree of the deterioration, and generates a yaw moment for recovering the behavior stability or decelerates the vehicle, avoiding the risk that the vehicle is off its course.

In conventional vehicle motion control devices as shown in said publication, the condition of each wheel is less considered: the condition of each wheel is controlled by other devices, such as ABS control system, etc. Further, the controlling process for suppressing an undesirable motion is a negative feedback control, starting in response to the deterioration of the behavior, in which the actual index value is gradually varied toward a target index value. Thus, the suppression effect could be late or insufficient for an extensive deterioration. Further, such a vehicle motion control device would not start a behavior controlling process unless an index value indicating the stability/instability of a vehicle behavior largely deviates from its target value even if an undesirable condition such as wheel lock, wheel spin occurs at one of the wheels. Such deteriorated conditions at any of wheels would easily lead to the behavior instability. Thus, it is desirable that those are avoided in conjunction with a vehicle motion control process in order to obtain and maintain the behavior stability more effectively.

In principle, a motion of a turning vehicle is determined by frictional forces between wheels and road surfaces. Thus, together with anti-wheel-lock and anti-wheel-spin processes, the vehicle motion behavior would be estimated and controlled based upon the condition of each wheel.

SUMMARY OF INVENTION

Based upon such a concept as described above, the present invention provides novel and unique vehicle motion control devices and methods systematically treating the respective conditions of wheels to acquire and maintain the vehicle behavior stability together with anti wheel lock and wheel spin processing, braking forces distribution, etc.

According to the present invention, a device for controlling a running behavior of a vehicle comprises means for estimating a road reaction force generated on each of the wheels, means for calculating a yaw moment around a centroid of the vehicle body generated by the road reaction force on each of the wheels, and means for controlling driving and braking forces on each of the wheel based upon the yaw moments so as to stabilize the running of the vehicle. In this device, the running of the vehicle is efficiently and surely stabilized based upon a yaw moment actually generated by a road reaction force on each wheel by monitoring the road reaction forces on each of the wheels, instead of depending upon an index value based upon only a total vehicle running condition as in a conventional motion controlling device.

In order to obtain the stability of the vehicle running, the means for controlling the driving and braking forces on each of the wheels may include a calculation means which calculates a yaw moment required to be added to the vehicle body, and the driving and braking force on each wheels may be controlled so as to generate the required yaw moment. The required yaw moment may be calculated based upon the yaw moment presently generated by the road reaction force on each of the wheels and a yaw moment which can be generated through the control of the driving and braking forces on each of the wheels. In calculation of the required yaw moment and target forces on the wheels, a theoretical tire model may be employed.

The driving and braking force controlling means may be adapted to judge whether the behavior of the turning vehicle is stable or unstable based upon the yaw moment actually generated by the road reaction force on each wheel. More specifically, Critical yaw moment is defined as a yaw moment which can be generated on a wheel when a road reaction force is maximized by varying the slip angle of the wheel while its longitudinal force component is kept constant, and the judgement of the behavior may be done by using the sum of the presently generated yaw moments by the front wheels of the vehicle and the critical yaw moments by the rear wheels of the vehicle. The critical yaw moment reflects the critical limit of a road reaction force on a wheel.

If the sum of the yaw moments is out of a predetermined range, the vehicle may be judged under a spin or a drift condition. The spin condition may be defined as a condition where the magnitude of the sum of the yaw moments by the front wheels is larger than that of the critical yaw moments by the rear wheels. The drift condition may be defined as a condition where the magnitude of the sum of the yaw moments by the front wheels is smaller than that of the critical yaw moments of the rear wheels while, in the front wheels, the yaw moments are close to the critical yaw moments. In the above judgement, for practical purposes, a reference value and a phase advance, represented by $-KI\beta dr$, may be employed.

The driving and braking force controlling means may be also adapted to control the driving and braking forces on each of the wheels so as to produce a spin avoiding yaw moment and a drift avoiding yaw moment as the yaw moment required to be added to the vehicle body so as to stabilize the vehicle running. These yaw moments required to be added to the vehicle body may be calculated from the presently generated yaw moments and critical yaw moments with a control reference value, denoted by $-\Delta Ms$, $\Delta Ms$, $-\Delta Md$ and $\Delta Md$, for practical purposes. The required yaw moment may be borne by one or more of the wheels which will effectively generate a yaw moment suppressing the spinning or drifting of the vehicle. For practical purpose, each required yaw moment borne by each wheel may be converted to a target longitudinal force.

Further, the driving and braking force controlling means may be also adapted to define normal running limits for a longitudinal force on each of the wheel and to limit a longitudinal force applied to each wheel in between the limits, thereby avoiding a slip of any of the wheel, such as wheel-spin and wheel-lock phenomena. The normal running limits may be set out individually for each of the wheels.

The driving and braking force controlling means may be provided with means to calculate a slip angle of each of the wheels; means to calculate a vertical load on each of the wheels; and means to calculate a maximum static frictional coefficient between each wheel and the road surface abutting thereon. From these parameters, it is possible to take the critical limit of the road reaction force on each of the wheels into account in the control of the longitudinal force on each wheels so that the device may effectively and surely control the driving and braking forces on each wheel so as to stabilize the vehicle running together with wheel-spin and wheel lock avoiding processes.

The means for estimating a road reaction force generated on each of the wheels may estimate a longitudinal force and a lateral force on each of the wheels individually, and accordingly the detailed condition of the road reaction force including the direction of the force may be taken into account. Thus, it is possible to control the driving and braking forces on each wheel more appropriately.

The present invention also provides a method for controlling a running behavior of a vehicle comprising steps of: estimating a road reaction force generated on each of the wheels; calculating a yaw moment around a centroid of the vehicle body generated by the road reaction force on each of the wheels; and controlling driving and braking forces on each of the wheel based upon said yaw moments so as to stabilize a running of the vehicle. The modifications and improvements of this method may be done as described above with respect to the device according to the present invention.

Thus, it is an object of the present invention to provide new and novel devices and methods for controlling a running behavior of a vehicle based upon a yaw moment generated by a road reaction force on each of the wheels.

It is another object of the present invention to provide such devices and methods allowing for the critical limit of a road reaction force on each of wheels so as to efficiently and surely stabilize the vehicle running.

It is a further object of the present invention to provide such devices and methods controlling the driving and braking force on each wheel so as to stabilize the vehicle running while avoiding wheel-spin and wheel-lock phenomena.

It is another object of the present invention to provide such devices and methods defining normal running limits of a longitudinal force on each of the wheels, thereby avoiding that too large driving or braking force is applied to each of the wheels.

It is a yet further object of the present invention to provide such devices and methods wherein the vehicle running behavior is judged based upon a yaw moment generated by a road reaction force on each of the wheels, thereby efficiently and surely detecting an abnormal running behavior such as a spin condition, drift condition.

It is another object of the present invention to provide such devices and methods wherein a yaw moment required for stabilizing the vehicle running is estimated based upon presently generated yaw moments, thereby making the control of the driving and braking forces on each wheel efficient and accurate.

It is another object of the present invention to provide such devices and methods wherein a yaw moment required for stabilizing the vehicle running is calculated from presently generated yaw moments and critical yaw moments, thereby allowing for the critical limits of the road reaction force on each of the wheels in the calculation of the required yaw moment.

It is a further object of the present invention to provide such devices and methods wherein physical parameters of each wheel are estimated, thereby reflecting the individual physical conditions of the wheels in the control of the behavior of a turning vehicle.

Other objects and advantages of the present invention will be in part apparent and in part pointed out hereinafter.

BRIEF DESCRIPTION OF THE DRAWINGS

In the accompanying drawings.

DESCRIPTION OF PREFERRED EMBODIMENTS

In this section, the general concept of the present invention is explained first. Then, practical embodiments of the invention will be described later.

I. General Concept of the Invention

The vehicle motion control process according to the present invention, in general, estimates an actual force applied on each wheel or tire (road reaction forces) and a road frictional coefficient on each wheel, etc. from actually measured vehicle running conditions, such as longitudinal and lateral accelerations and a yaw rate of a vehicle body, and then adjusts longitudinal forces on the wheels to the respective target values calculated from the estimated and directly measured values so as to avoid wheel lock and spin conditions and provide an appropriate braking force distribution for the wheels. Abnormal running conditions, namely, the spinning and drifting of a vehicle are monitored and prevented through novel and unique protocols of the present invention. In the estimations of the actual parameters and the calculations of the target values, a theoretical tire model (typically "Brush model") is employed together with conventional vehicle motion equations. The process according to the present invention may be adapted for different drive systems such as a four wheel drive vehicle (4WD), a rear wheel drive vehicle (e.g. Front-engine rear-wheel (FR) vehicle) and a front wheel drive vehicle (e.g. Front engine front-wheel (FF) vehicle).

Figure 1:
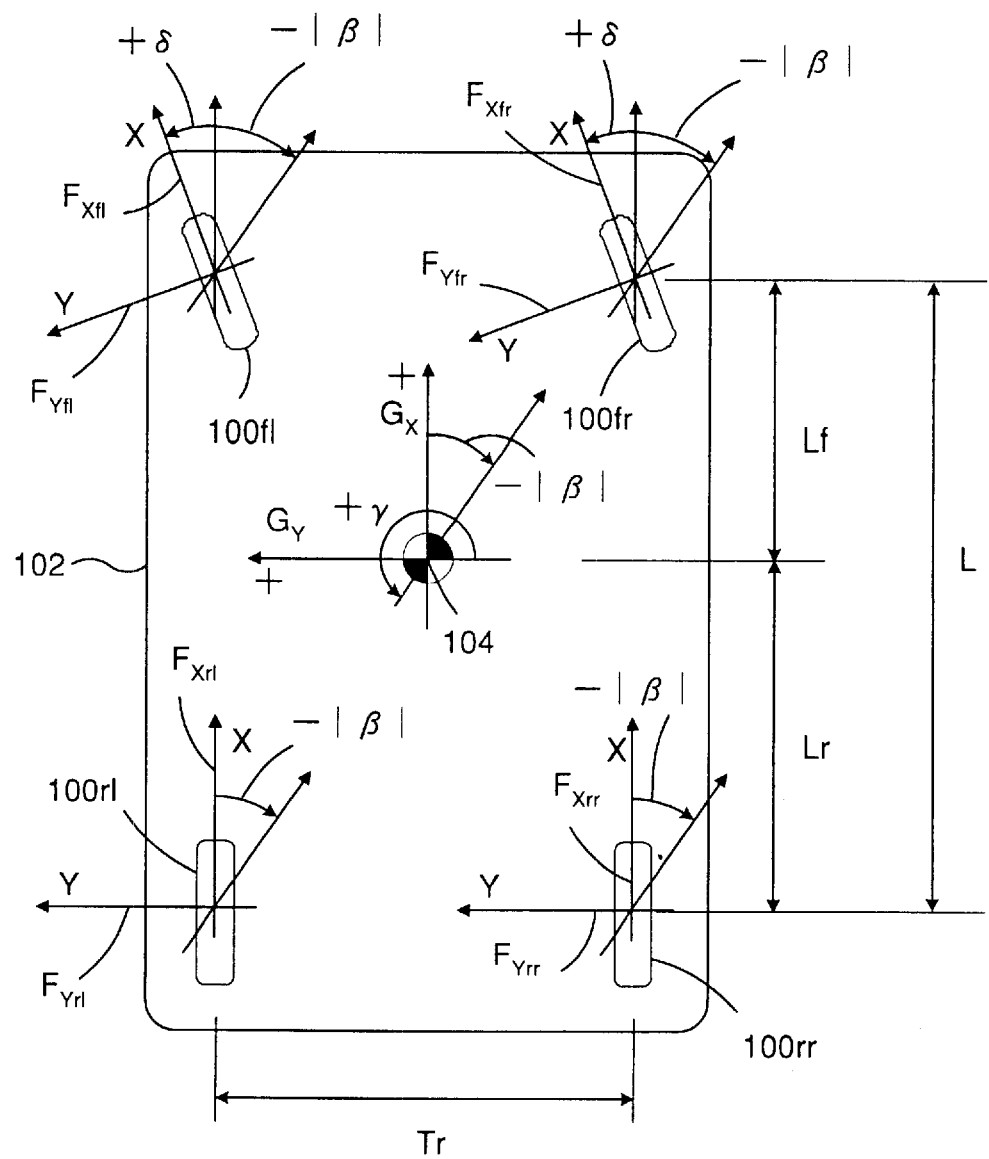
FIG. 1 is a diagrammatical view (from above) showing coordinate systems, defined on a vehicle, used in the estimation and calculation in embodiments according to the present invention.

FIG. 1 shows the systems of coordinates defined on a vehicle having front-left, front-right, rear-left, rear-right wheels 100fl, 100fr, 100rl and 100rr, respectively, a vehicle body 102, a centroid (the center of mass) 104 and a wheel base L and a tread Tr. X and Y directions on each wheel denote directions of wheel heading and rotational axis, respectively. The signs of parameters are designated as follows: In a longitudinal force Fxi on each wheel, driving and braking forces are defined as + and −, respectively; longitudinal acceleration and deceleration, denoted by $G_X$, on the vehicle body are defined as + and −, respectively; a lateral force $F_{yi}$ on each wheel and a lateral acceleration, denoted by $G_Y$, on the vehicle body toward the left hand in the drawings are defined as +; slip angles $\beta_B$, $\beta_i$ of the body and wheels, a yaw rates γ and a steering angle δ are defined as + in the counter-clockwise direction in the drawings. Hereinafter, a suffix i in all parameters denotes fl, fr, rl and rr, indicating values of front-left, front-right, rear-left, and rear-right wheels, respectively.

In the following descriptions, the process during left turning is mainly described. The process during right turning is briefly mentioned in section I-6.

I-1 General Flow of the Processes in the Vehicle Motion Control Device

The vehicle motion control process consists of Regions of (A) Measurements and estimations of actual parameters; (B) Judgement of the stability/instability of a vehicle behavior; and (C) Calculations of target values for wheels (FIG. 2).

Figure 2A:
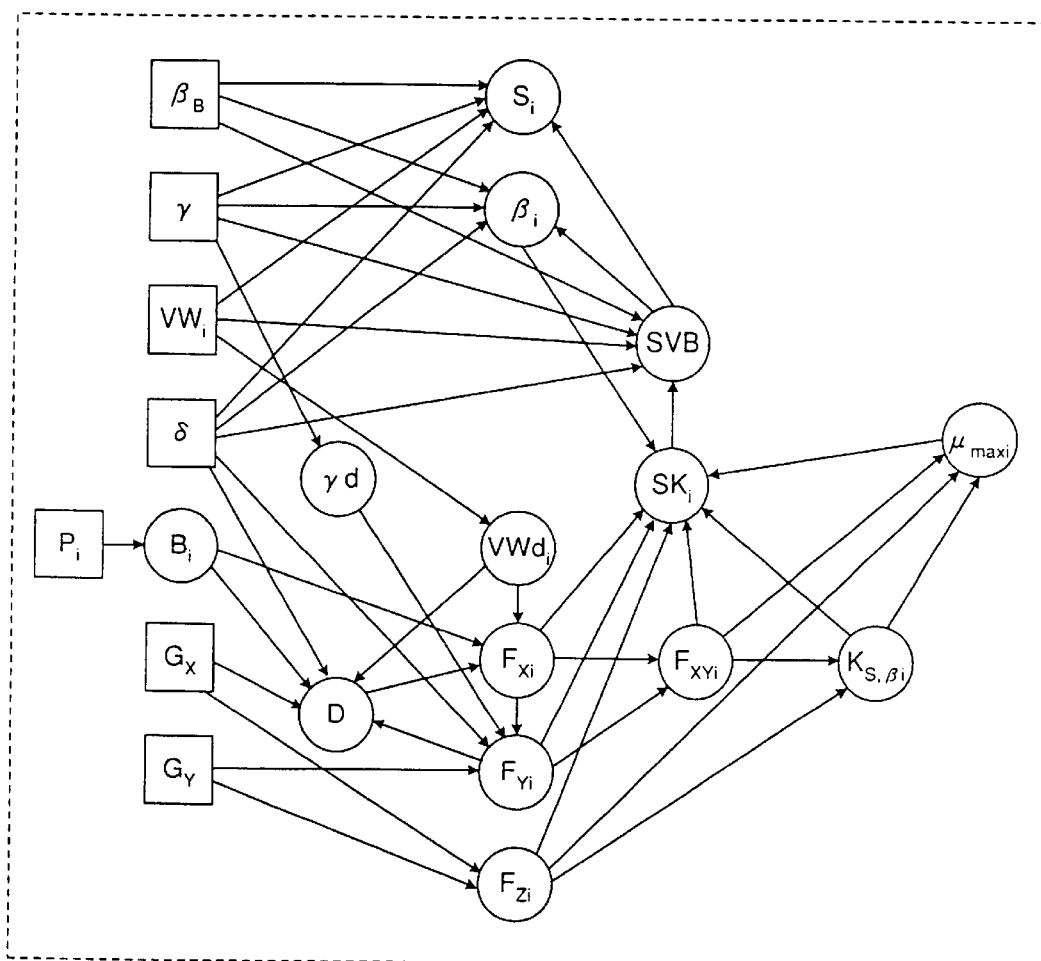
FIG. 2A generally shows the flow of parameters processed in Region (A) of the vehicle motion control of embodiments according to the present invention.

The flow of the processes in Region (A) is generally shown in FIG. 2A. In Region (A), employing a tire model and vehicle motion equations (conventional), physical parameters of each wheel required for the processes in Regions (B) and (C) are estimated from parameters directly measurable with appropriate physical sensors indicating vehicle running conditions. In FIG. 2A, symbols indicate parameters treated in the Region (A), and arrows indicate the flows of these parameters. Region (A) will be detailed in Section I-3.

Figure 2B:
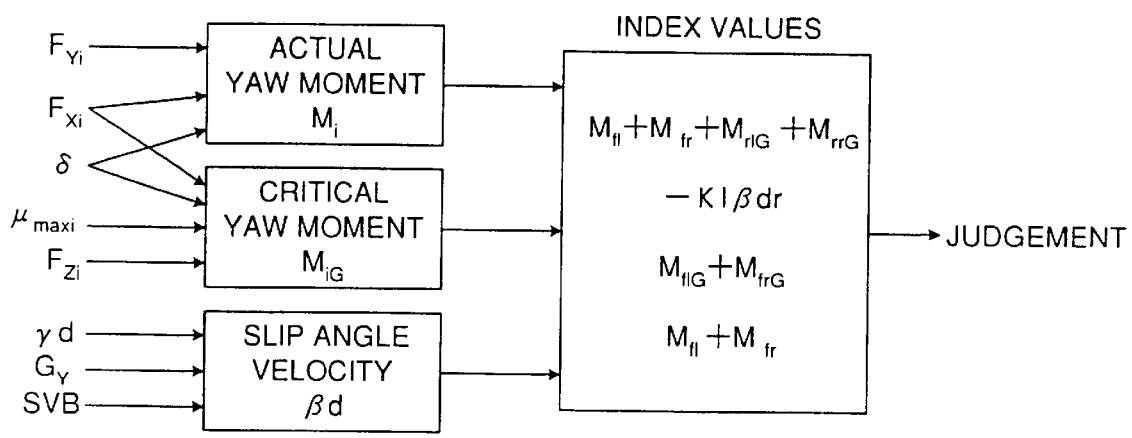
FIG. 2B generally shows the flow of parameters processed in Region (B) of the vehicle motion control of embodiments according to the present invention.

In Region (B) as shown in FIG. 2B, the vehicle behavior stability, i.e. whether the vehicle is under a normal turning condition or abnormal conditions (Spin or Drift conditions), is judged based upon yaw moments generated by the wheels around the centroid of the vehicle. In the novel and unique judgement protocols in the present invention, the instability of the vehicle behavior may be detected prior to the occurrence of the spinning or drifting of the vehicle by monitoring a balance of the yaw moments of the front and rear wheels and the saturation of road reaction forces on the wheels. The way of judging the condition of the turning vehicle will be detailed in Section I-4.

Figure 2C:
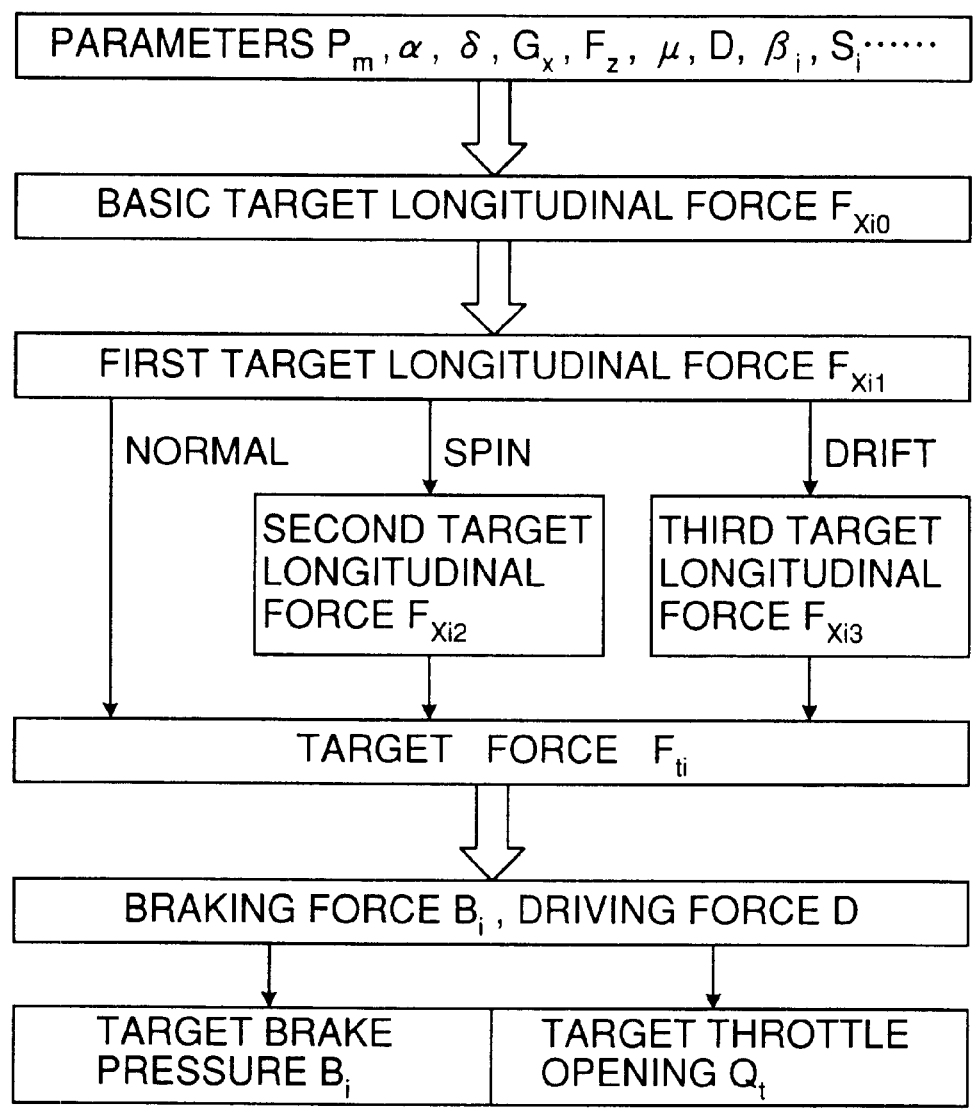
FIG. 2C generally shows the flow of target longitudinal forces for each wheel modulated in Region (C) of the vehicle motion control of embodiments according to the present invention.

Region (C) as shown in FIG. 2C, calculates a target value for a longitudinal force on each wheel, using the parameters obtained in Region (A). Irrespective of the vehicle behavior, Basic target longitudinal forces are determined first in response to the driver's demands including a brake pedal depression (e.g. a master cylinder pressure Pm) and a throttle angle (or acceleration pedal depression, etc. α), while taking into account an appropriate braking force distribution. Then, in order to maintain an appropriate balance of the longitudinal and lateral forces on each wheel while avoiding wheel-lock and wheel-spin conditions (namely, anti-lock and anti wheel spin process), the basic target; values are modulated to "First" target longitudinal forces. Under the normal running condition, the longitudinal force on each wheel is adjusted to the first target value through a throttle angle or braking pressures. For the judgement of Spin or Drift condition, the first target values are further modulated to "Second" or "Third" target values so as to induce yaw moments against those undesirable conditions, the required amounts of which yaw moments are calculated based upon the balance of estimated yaw moments of the front and rear wheels. The way of determining the target values will be detailed in Section I-5.

I-2 Theoretical Tire Model

The present invention employs, together with a conventional motion equation of a turning vehicle, a theoretical (mechanical) tire model, called "Brush Tire" model for obtaining the relations among mechanical parameters, such as a slip angle, a slip ratio, required in the calculation of the target values. Here, theoretical matters of the tire model are summarized. Detailed discussions for the model are described elsewhere, e.g. in "Motion and Control of Automobile" (p30-; Masato Abe; 1992, K. K. Sankai-do); "Tire Shear Force Generation During Combined Steering and Braking Manueuvers" (J. E. Bernard, L. Segal and R. E. Wild; SAE paper, 770852).

Figure 3:
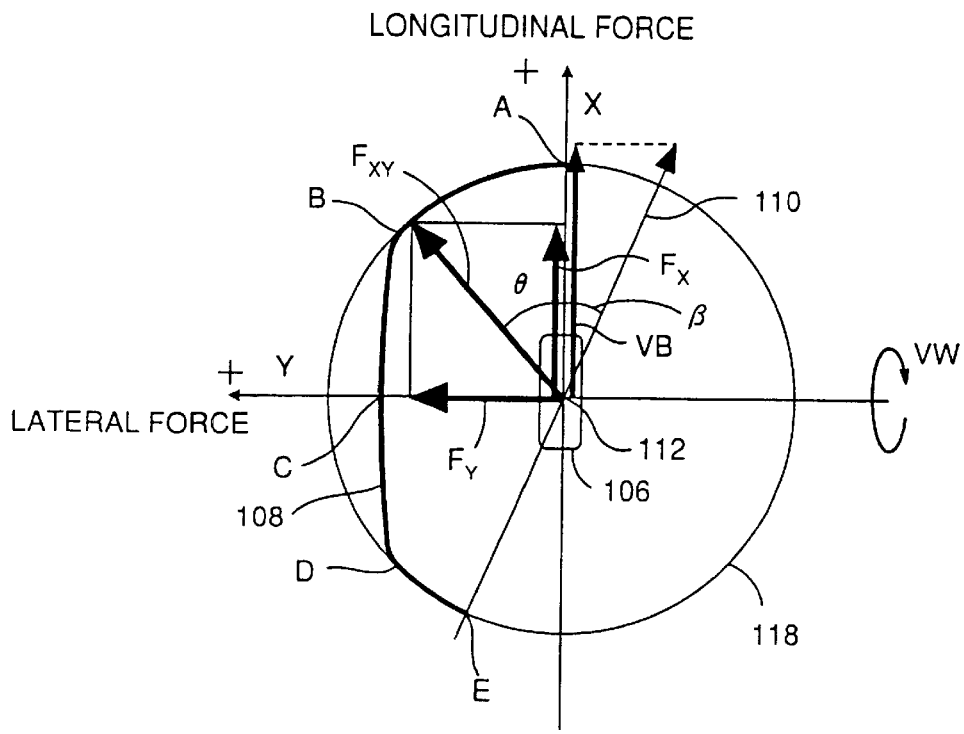
FIG. 3 diagrammatically shows a frictional circle and road reaction force vectors on a wheel (tire) based upon "Brush tire model"

FIG. 3 shows a diagram of a tire model indicating road reaction force vectors $F_{XY}$, $F_X$ and $F_Y$ applied on the center 112 of a tire 106 travelling in a direction 110 at a certain slip angle β. The complete circle shown with a thin line 118 is a critical frictional circle determined by $\mu_{max} F_z$, where $\mu_{max}$ and Fz are a maximum static frictional coefficient and a vertical load on the tire, respectively. The road reaction force vector $F_{XY}$, composed of Fx (longitudinal) and Fy (lateral), moves along a bold line 108 as the slip ratio S varies.

Slip ratio S is defined by $$S = \frac{VB - VW}{VW}, \qquad (2.1)$$

where VB denotes a component of a wheel travelling velocity 110 in a wheel heading direction X; and VW denotes Wheel rotational speed. Composite slip ratio λ is given by $$\lambda = \sqrt{S^2 + (1+S)^2 \left(\frac{K_\beta}{K_S}\right)^2 \tan^2\beta}, \qquad (2.2)$$

where β is a slip angle, and $K_\beta$ and Ks are tire lateral and longitudinal stiffness, respectively. Then, a dimensionless parameter ξ is defined by:

$$\xi = 1 - \frac{K_S}{3\mu_{max} F_Z}\lambda. \qquad (2.3)$$

This parameter ξ indicates the relation between the critical (maximum) frictional force and an elastic force generated on the tire: the elastic force reaches its critical frictional force at ξ=0.

Using the parameters described above, the longitudinal force Fx and lateral force Fy are expressed by:

for ξ>0, $$F_X = -K_S S \xi^2 - 6\mu_{max} F_Z \cos\theta \left(\frac{1}{6} - \frac{1}{2}\xi^2 + \frac{1}{3}\xi^3\right) \qquad (2.4)$$

$$F_Y = -K_\beta(1+S)\tan\beta \cdot \xi^2 - 6\mu_{max} F_Z \sin\theta \left(\frac{1}{6} - \frac{1}{2}\xi^2 + \frac{1}{3}\xi^3\right) \qquad (2.5)$$

and for ξ<0, $$Fx = -\mu_{max} Fz \cos\theta \qquad (2.6)$$

$$Fy = -\mu_{max} Fz \sin\theta \qquad (2.7)$$

where $\cos\theta = S/\lambda$, $\sin\theta = (K_\beta/K_S)\tan\beta(1+S)/\lambda$.

As shown in the drawing, the composite frictional force $F_{XY}$ follows the critical frictional circle from A to B and D to E (corresponding to ξ≤0), indicating that the road reaction force in these ranges reaches the maximum limit $\mu_{max}$ Fz, i.e. no stronger force is available. From B to C (ξ>0), the locus of Fxy is inside the critical circle, indicating that a stronger force is available by increasing the magnitude of the slip angle. Curve B to D goes closer to the longitudinal axis of the tire as the slip angle |β| becomes smaller, indicating that the lateral force decreases.

Since Composite force vector Fxy is calculated from $$F_{XY} = (F_X^2 + F_Y^2)^{1/2},$$

Fxy will be expressed by $$F_{XY} = \mu_{max} Fz(1-\xi^3) \text{ for } \xi>0 \qquad (2.8)$$

$$Fxy = \mu_{max} Fz \text{ for } \xi \leq 0 \qquad (2.9)$$

Then, Fx and Fy can be expressed by simpler forms as follows (for any ξ):

$$F_X = F_{XY} \cos\theta = (S/\lambda) F_{XY} \qquad (2.10)$$

$$F_Y = F_{XY} \sin\theta = \{(K_\beta/K_S)\tan\beta(1+S)/\lambda\} F_{XY} \qquad (2.11)$$

Thus, Fy is expressed as a function of Fx by:

$$F_Y = \frac{1+S}{S} \frac{K_\beta}{K_S} \tan\beta \cdot F_X \quad (2.12)$$

Hereinafter, the forces Fx and Fy determined through the expressions of this tire model are denoted by Fx_m and Fy_m, Fxy_m.

Parameters calculated through the above expressions for several points on the locus of the composite force are summarized as follows:

Point A (where a wheel spin occurs)

$S_A = 0$ $VW = \infty$ $F_{XYA} = \mu_{max} F_Z \quad (2.13a)$ $F_{XA} = F_{XYA} = \mu_{max} F_Z$ $F_{YA} = 0$ Point B $\xi_B = 0$ $\lambda_B = 3\mu_{max} F_Z / K_S$ $$S_B = \frac{-\left(\frac{K_\beta}{K_S}\right)^2 \tan^2\beta - \sqrt{-\left(\frac{K_\beta}{K_S}\right)^2 \tan^2\beta + \left\{1 + \left(\frac{K_\beta}{K_S}\right)^2 \tan^2\beta\right\}\left(\frac{3\mu_{max} F_Z}{K_S}\right)^2}}{1 + \left(\frac{K_\beta}{K_S}\right)^2 \tan^2\beta}$$

$F_{XYB} = \mu_{max} F_Z$ $F_X = -(S_B / \lambda_B) F_{XY}$ $F_Y = -\{(K_\beta / K_S)\tan\beta(1 + S_B) / \lambda_B\} F_{XYB}$ Point C  (2.13c)

$\lambda_C = (K_\beta / K_S) |\tan\beta|$ $\xi_c = 1 - \{K_\beta / (3\mu_{max} F_Z)|\tan\beta|\}$ $F_{XC} = 0$ $F_{XYC} = F_{YC} = -\frac{\tan\beta}{|\tan\beta|}\mu_{max} F_Z \left\{1 - \left(1 - \frac{K_\beta}{3\mu_{max} F_Z}|\tan\beta|\right)^3\right\}$ Point D  (2.13d)

$\xi_D = 0$ $\lambda_D = 3\mu_{max} F_Z / K_S$ $$S_D = \frac{-\left(\frac{K_\beta}{K_S}\right)^2 \tan^2\beta + \sqrt{-\left(\frac{K_\beta}{K_S}\right)^2 \tan^2\beta + \left\{1 + \left(\frac{K_\beta}{K_S}\right)^2 \tan^2\beta\right\}\left(\frac{3\mu_{max} F_Z}{K_S}\right)^2}}{1 + \left(\frac{K_\beta}{K_S}\right)^2 \tan^2\beta}$$

$F_{XYD} = \mu_{max} F_Z$ $F_X = -(S_D / \lambda_D) F_{XY}$ $F_Y = -\{(K_\beta / K_S)\tan\beta(1 + S_D) / \lambda_D\} F_{XYD}$ Point E (where wheel lock occurs)

$S_E = \infty$ $VW = 0$ $F_{XYE} = \mu_{max} F_Z \quad (2.13e)$ $F_{XE} = F_{XYE} \cos\beta$ $F_{YE} = -F_{XYE} \sin\beta$ I-3 Region (A) Measurements and Estimations of Actual Parameters As described above, region (A) provides actual parameters required for the judgement and control of the vehicle behavior. The following parameters, each enclosed in a square in FIG. 2A, are directly measured with appropriate physical sensors: Vehicle body longitudinal acceleration $G_X$; Vehicle body lateral acceleration $G_Y$; Vehicle body yaw rate γ; a steering angle δ; wheel rotational speeds VWi and brake pressures Pi. Vehicle body slip angle $\beta_B$ is obtained from and other appropriate estimation device (e.g. a conventional VSC device).

(2.13b)

Then, from these measured parameters, the following parameters, each enclosed in a circle in FIG. 2A, are estimated through the tire model and/or vehicle motional equations: Longitudinal and Lateral forces $F_{xi}$, $F_{Y1}$; Vertical loads $F_{zi}$; Tire characteristics (longitudinal and lateral stiffness) $K_{S1}$, $K_{\beta i}$; Slip angles βi; Slip ratios Si; Maximum Road frictional coefficients $\mu_{max1}$; and Vehicle (total) driving force D. The ways of estimating these values are described in the followings.

I-3-1 Estimations of Wheel Longitudinal Force Fxi and Total Driving Force D

A longitudinal force Fxi on each wheel is expressed with Wheel rotational acceleration VWdi through the motion equation of the wheel rotation. Taking differential gears into account, Fxi on each wheel is expressed as follows (see Appendix I. for detailed calculations):

$$F_{Xfl} = \frac{a}{2(1+a)}D + B_{fl} - \left\{\frac{1}{4}\left(\frac{a}{1+a}\right)^2 I_e + \frac{1}{4}I_{Df} + I_{wf}\right\}\frac{VWd_{fl}}{r^2} - \quad (3.1)$$

$$\left\{\frac{1}{4}\left(\frac{a}{1+a}\right)^2 I_e + \frac{1}{4}I_{Df}\right\}\frac{VWd_{fr}}{r^2} - \frac{1}{4}\frac{a}{(1+a)^2}I_e \frac{VWd_{rl}+VWd_{rr}}{r^2}$$

$$F_{Xfr} = \frac{a}{2(1+a)}D + B_{fr} - \left\{\frac{1}{4}\left(\frac{a}{1+a}\right)^2 I_e + \frac{1}{4}I_{Df}\right\}\frac{VWd_{fl}}{r^2} -$$

$$\left\{\frac{1}{4}\left(\frac{a}{1+a}\right)^2 I_e + \frac{1}{4}I_{Df} + I_{wf}\right\}\frac{VWd_{fr}}{r^2} -$$

$$\frac{1}{4}\frac{a}{(1+a)^2}I_e \frac{VWd_{rl}+VWd_{rr}}{r^2}$$

$$F_{Xrl} = \frac{1}{2(1+a)}D + B_{rl} - \left\{\frac{1}{4}\left(\frac{1}{1+a}\right)^2 I_e + \frac{1}{4}I_{Dr} + I_{wr}\right\}\frac{VWd_{rl}}{r^2} -$$

$$\left\{\frac{1}{4}\left(\frac{1}{1+a}\right)^2 I_e + \frac{1}{4}I_{Dr}\right\}\frac{VWd_{rr}}{r^2} - \frac{1}{4}\frac{a}{(1+a)^2}I_e \frac{VWd_{fl}+VWd_{fr}}{r^2}$$

$$F_{Xrr} = \frac{1}{2(1+a)}D + B_{rr} - \left\{\frac{1}{4}\left(\frac{1}{1+a}\right)^2 I_e + \frac{1}{4}I_{Dr}\right\}\frac{VWd_{rl}}{r^2} -$$

$$\left\{\frac{1}{4}\left(\frac{1}{1+a}\right)^2 I_e + \frac{1}{4}I_{Dr} + I_{wr}\right\}\frac{VWd_{rr}}{r^2} -$$

$$\frac{1}{4}\frac{a}{(1+a)^2}I_e \frac{VWd_{fl}+VWd_{fr}}{r^2}$$

where Bi denotes a braking force applied from a brake shoe; $I_{wf}$ and $I_{wr}$ are inertia moments of front and rear wheels; $I_e$ is an inertia moment of an engine; $I_{Df}$ and $I_{Dr}$ are inertia moments between a center differential gear device and front and rear differential gear devices, respectively; a is the ratio of output torque applied from the center differential gear device to the front differential gear device to that of the rear differential gear device; r is a tire effective radius. In the above expressions, reduction gear ratios in the differential gear device are assumed to be one for simplifying the expressions. As for a rear wheel drive vehicle, $I_{Dr}$, $I_{Df}$, a=0. As for a front wheel drive vehicle, $I_{Dr}$, $I_{Df}$, 1/a=0. The braking forces Bi are expressed with braking pressures Pi by:

$$B_{fl}=K_{Pf}P_{fl}$$
$$B_{fr}=K_{Pf}P_{fr}$$
$$B_{rl}=K_{Pr}P_{rl} \quad (3.2)$$
$$B_{rr}=K_{Pr}P_{rr},$$

where Kpf and Kpr are conversion factors (negative values) from wheel cylinder hydraulic pressures to braking forces on front and rear wheels, respectively. These factors are constant during the vehicle running, and thus, previously available e.g. from experiments, etc. Further, the inertia moments and torque ratio shown in the above expressions are also previously available from the structure of the differential gears. The effective radius r is available previously or from other independent methods.

The longitudinal force Fxi on each wheel relates to one another in the longitudinal motion equation of the vehicle (see FIG. 1), expressed by $$mG_X=(F_{Xfl}+F_{Xfr})\cos\delta-(F_{Yfl}+F_{Yfr})\sin\delta+F_{Xrl}+F_{Xrr} \quad (3.3)$$

where m denotes the mass of the vehicle.

By substituting Fxi in (3.1) for those in (3.3), the following expression is obtained, $$(F_{Yfl}+F_{Yfr})\sin\delta - \left(\frac{a}{1+a}\cos\delta + \frac{1}{1+a}\right)D + mG_X = \quad (3.4)$$

$$(B_{fl}+B_{fr})\cos\delta + B_{rl}+B_{rr} - \frac{VWd_{fl}+VWd_{fr}}{r^2}$$

$$\left[\left\{\frac{1}{2}\left(\frac{a}{1+a}\right)^2 I_e + \frac{1}{2}I_{Df} + I_{wf}\right\}\cos\delta + \frac{1}{2}\frac{a}{1+a}^2 I_e\right] -$$

$$\frac{VWd_{rl}+VWd_{rr}}{r^2}$$

$$\left[\left\{\frac{1}{2}\frac{a}{(1+a)^2}I_e + \frac{1}{2}I_{Dr} + I_{wr}\right\} + \frac{1}{2}\frac{a}{(1+a)^2}I_e\cos\delta\right].$$

Thus, using this expression, the longitudinal forces Fxi may be expressed as a function of known parameters without the total driving force D.

In expressions (3.1) and (3.4), VWdi of each wheel is available from the measurements of VWi. The sum of lateral forces $F_{Yfl}+F_{Yfr}$ is obtained from the process described in the next section I-3-2. The estimation of $F_{Yi}$ in the next section, however, requires the longitudinal forces Fxi to be estimated here. Thus, in the above expression, the lateral forces estimated in the previous routine will be used (The process in the vehicle motion control are cyclically repeated during running of the vehicle). Alternatively, the sum $F_{Yfl}+F_{Yfr}$ is available from the expression (3.4) if the total driving force D is obtained from an engine mapping.

I-3-2 Estimation of Wheel Lateral Force $F_{Yi}$

A lateral force $F_{Yi}$ on each wheel may be expressed as functions of the longitudinal forces Fxi obtained in the previous section I-3-1 and several available values, by solving the lateral motion equation of the vehicle:

$$mG_Y=(F_{Xfl}+F_{Xfr})\sin\delta-(F_{Yfl}+F_{Yfr})\cos\delta+F_{Yrl}+F_{Yrr} \quad (3.5),$$

and the motion equation of the rotation of the vehicle in the horizontal plane:

$$I_B\gamma d = L_f(F_{Yfl}\cos\delta + F_{Xfl}\sin\delta) - \frac{Tr}{2}(F_{Xfl}\cos\delta - F_{Yfl}\sin\delta) + \quad (3.6)$$

$$L_f(F_{Yfr}\cos\delta + F_{Xfr}\sin\delta) + \frac{Tr}{2}(F_{Xfr}\cos\delta - F_{Yfr}\sin\delta) -$$

$$L_rF_{Yrl} - \frac{Tr}{2}F_{Xrl} - L_fF_{Yrr} + \frac{Tr}{2}F_{Xrr},$$

where $I_B$ and $\gamma d$ are the inertia moment and yawing acceleration of the vehicle body, respectively; L is the distance between the front and rear wheel axis (the wheel base), Lf and Lr are the distances between the centroid of the vehicle and front and rear wheel axes, respectively; Tr the tread of the vehicle.

By canceling the rear lateral forces Fyrl and Fyrr from the above two motion equations, the following expression are obtained:

$$\left(\cos\delta + \frac{Tr}{2L}\sin\delta\right)F_{Yfl} + \left(\cos\delta - \frac{Tr}{2L}\sin\delta\right)F_{Yfr} = \quad (3.7)$$

$$\frac{I_B\gamma d + L_r mG_Y - \frac{Tr}{2}(F_{Xrr}-F_{Xrl})}{L} -$$

$$\left(\sin\delta - \frac{Tr}{2L}\cos\delta\right)F_{Xfl} - \left(\sin\delta + \frac{Tr}{2L}\cos\delta\right)F_{Xfr}.$$

For clarity of the expression, it is described as $$Ak\,F_{Yfl}+Bk\,F_{Yfr}=Ck, \quad (3.8)$$

where Ak and Bk are factors of Fyfl and Fyfr; Ck is the right hand term in the expression (3.7). In a practical vehicle, Ak>0 and Bk>0 will be satisfied.

By using the ratio of the lateral forces Fyfl/Fyfr=Dk, Fyfl and Fyfr are expressed individually as:

$$F_{Yfl} = \frac{C_k D_k}{A_k D_k + B_k} \quad (3.9)$$

$$F_{Yfr} = \frac{C_k}{A_k D_k + B_k}$$

The ratio of the forces Dk is obtained by the ratio of Fyfl_m/Fyfr_m, determined through the tire model described in Section I-2. As described in Section I-2, however, Fyfl_m and Fyfr_m are not available unless a slip angle $\beta_i$, a slip ratio $S_i$, a maximum frictional coefficient $\mu_{maxi}$, etc. are provided, and these parameters require the estimation of $F_{Yi}$ to be estimated here. Thus, in the initial routine where the slip angle $\beta_i$, slip ratio Si etc. are not available, Dk is calculated with an appropriate positive constant $F_{Y0}$ as an initial value. Then, Dk may be given by:

$$\frac{F_{Yfl}}{F_{Yfr}} = \frac{\text{MAX}(|F_{Yfl} - m|, F_{Y0})}{\text{MAX}(|F_{Yfr} - m|, F_{Y0})} = D_k, \quad (3.10)$$

where Max(x, x', ... ) indicates that the largest value is to be selected among values in the parentheses.

The use of an appropriate constant $F_{Y0}$ avoids unreliable variations of the ratio Dk when the absolute values of Fy_m are small, e.g. the vehicle is running straight.

Similarly, the sum Fyrl+Fyrr is given as:

$$F_{Yrl} + F_{Yrr} = \frac{-I_B \gamma d + L_f m G_Y + \frac{Tr}{2}\{(F_{Xfr} - F_{Xfl})\cos\delta - (F_{Yfr} - F_{Yfl})\sin\delta\}}{L} \quad (3.11)$$

$$= Ek$$

By defining the ratio of these forces as:

$$\frac{F_{Yrl}}{F_{Yrr}} = \frac{\text{MAX}(|F_{Yrl} - m|, F_{Y0})}{\text{MAX}(|F_{Yrr} - m|, F_{Y0})} = F_k \quad (3.12)$$

the lateral forces Fyrl and Fyrr are expressed as:

$$F_{Yrl} = Ek \, Fk/(1+Fk); \quad F_{Yrr} = Ek/(1+Fk) \quad (3.13).$$

I-3-3 Estimation of Wheel Vertical Load Fzi

Using the vehicle longitudinal and lateral accelerations Gx and $G_Y$, obtained from appropriate sensors, a vertical load on each wheel Fzi is estimated by:

$$F_{Zfl} = \left(\frac{L_r g - h G_X}{2L} - \eta_f \frac{h}{Tr} G_Y\right)\frac{F_{ZV}}{g} \quad (3.14)$$

$$F_{Zfr} = \left(\frac{L_r g - h G_X}{2L} + \eta_f \frac{h}{Tr} G_Y\right)\frac{F_{ZV}}{g}$$

$$F_{Zrl} = \left(\frac{L_f g + h G_X}{2L} - \eta_r \frac{h}{Tr} G_Y\right)\frac{F_{ZV}}{g}$$

$$F_{Zrr} = \left(\frac{L_f g + h G_X}{2L} + \eta_r \frac{h}{Tr} G_Y\right)\frac{F_{ZV}}{g},$$

where Fzv is the weight of the vehicle; h is the height of the centroid of the vehicle; g is the acceleration of gravity; $\eta_f$ and $\eta_r$ are roll stiffness distributions of the front and rear wheels, respectively. In these expressions, the dynamic characteristics of pitch and roll components are not taken into account: these may be reflected in estimation errors.

On an inclined road, the components of the weight (force) of the vehicle, perpendicular to the road surface, decreases, and thus Fzv in the first terms of the above expressions should be Fzv=Fzv$_{(\theta=0)}$ cos θ, where θ is an inclined angle of the road. However, under a usual running condition, θ is small and cos θ≈1, and therefore the first terms in expressions (3.14) are approximately valid. The second and third terms in the expressions are exactly valid because $G_X$ and $G_Y$ are measured with inertia sensors and include the components of the weight parallel to the road surface.

I-3-4 Estimations of Tire Stiffness $K_{S1}$ and $K_{\beta i}$

The tire longitudinal and lateral stiffness of each of the wheels $K_{si}$ and $K_{\beta}i$ are functions of the composite road forces Fxyi and vertical loads Fzi, expressed by:

$$K_{Si} = K_{XYS} F_{XYi} + K_{ZS} F_{Zi}$$

$$K_{\beta i} = K_{XY\beta} F_{XYi} + K_{Z\beta} F_{Zi} \quad (3.15),$$

where $K_{XYS}$, $K_{ZS}$, $K_{XY\beta}$ and $K_{Z\beta}$ are constant factors for $F_{XYi}$ and $F_{Zi}$, previously available from experiments, etc. The results obtained in the previous sections I-3-1, -2, -3 are employed for $F_{XYi}$ and $F_{Zi}$. As described below, these tire stiffness $K_{si}$ and $K_{\beta i}$ will be used for calculations of slip angles βi and slip ratios Si through the tire model.

I-3-5 Estimation of Wheel Slip Angle βi and Wheel Slip Ratio Si

Figure 4:
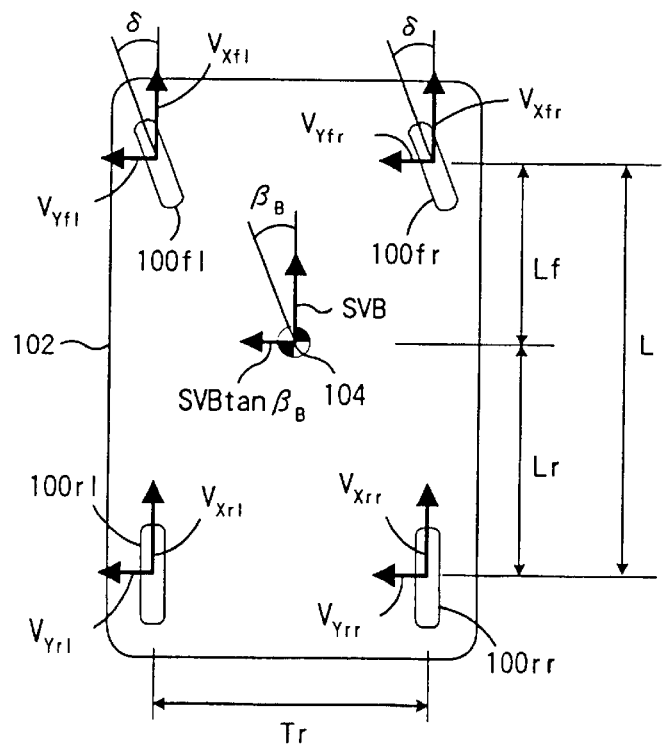
FIG. 4 diagrammatically shows the definitions of velocity vectors, longitudinal and lateral, on each wheel.

A wheel slip angle βi is defined as an angle included between the wheel travelling direction and wheel heading direction, and thus expressed by tan β$_i$=$V_{Yi}/V_{Xi}$, where $V_{Xi}$ and $V_{Yi}$ are the travelling velocity components in the directions parallel and perpendicular to the plane of wheel rotation, respectively (see FIG. 4).

For each wheel of the vehicle, $V_{Yi}$ and $V_{Xi}$ are given by $V_{Xfl}=(SVB-Tr\,\gamma/2)\cos\delta+(SVB\tan\beta_B+L_f\gamma)\sin\delta$ $V_{Xfr}=(SVB+Tr\,\gamma/2)\cos\delta+(SVB\tan\beta_B+L_f\gamma)\sin\delta$ $V_{Xrl}=SVB+Tr\,\gamma/2 \quad (3.16)$ $V_{Xrr}=SVB+Tr\,\gamma/2$ $V_{Yfl}=-(SVB-Tr\,\gamma/2)\sin\delta+(SVB\tan\beta_B+L_f\gamma)\cos\delta$ $V_{Yfr}=-(SVB+Tr\,\gamma/2)\sin\delta+(SVB\tan\beta_B+L_f\gamma)\cos\delta$ $V_{Yrl}=SVB\tan\beta_B-L_r\gamma \quad (3.17)$ $V_{Yrr}=SVB\tan\beta_B-L_r\gamma$, where SVB is a vehicle longitudinal speed; $\beta_B$ a slip angle of the vehicle body.

Accordingly, a slip angle βi of each of the wheels is given by:

$$\tan\beta_{fl} = \frac{-\left(SVB - \frac{Tr}{2}\gamma\right)\sin\delta + (SVB\tan\beta_B + L_f\gamma)\cos\delta}{\left(SVB - \frac{Tr}{2}\gamma\right)\cos\delta + (SVB\tan\beta_B + L_f\gamma)\sin\delta} \quad (3.18)$$

$$\tan\beta_{fr} = \frac{-\left(SVB + \frac{Tr}{2}\gamma\right)\sin\delta + (SVB\tan\beta_B + L_f\gamma)\cos\delta}{\left(SVB + \frac{Tr}{2}\gamma\right)\cos\delta + (SVB\tan\beta_B + L_f\gamma)\sin\delta}$$

-continued $$\tan\beta_{rl} = \frac{SVB\tan\beta_B - L_r\gamma}{SVB - \frac{Tr}{2}\gamma}$$

$$\tan\beta_{rr} = \frac{SVB\tan\beta_B - L_r\gamma}{SVB + \frac{Tr}{2}\gamma}.$$

As described in Section I-2, the slip ratio Si of a wheel are given by $$Si=(Vxi-VWi)/VWi \quad (2.1),$$

where Vxi corresponds to VB.

Thus, using the expressions (3.16), the slip ratio Si of each wheel is given by:

$$S_{fl} = \frac{SVB(\cos\delta + \tan\beta_B\sin\delta) + \gamma\left(-\frac{Tr}{2}\cos\delta + L_f\sin\delta\right)}{VW_{fl}} - 1 \quad (3.19)$$

$$S_{fr} = \frac{SVB(\cos\delta + \tan\beta_B\sin\delta) + \gamma\left(\frac{Tr}{2}\cos\delta + L_f\sin\delta\right)}{VW_{fr}} - 1$$

$$S_{rl} = \frac{SVB - \frac{Tr}{2}\gamma}{VW_{rl}} - 1$$

$$S_{rr} = \frac{SVB + \frac{Tr}{2}\gamma}{VW_{rr}} - 1.$$

In the expressions (3.18) and (3.19), the vehicle longitudinal speed SVB is not directly measured but estimated through the process described in the next Section I-3-6. The other parameters are available previously or from appropriate sensors (see FIG. 2A.).

I-3-6. Estimation of Vehicle Longitudinal Speed SVB

A vehicle longitudinal speed SVB, namely, the component of the vehicle speed in direction of vehicle heading (see FIG. 4), is estimated from the wheel longitudinal and lateral forces $F_{Xi}$ and $F_{Yi}$ and vertical loads Fzi, obtained in the previous sections, through the tire model. In the estimation process here, first, "Reference slip ratio SKi" is determined from $F_{Xi}$ and $F_{Yi}$ for each wheel, and then, a vehicle longitudinal speed SVBi is deduced individually for each wheel. From these speeds SVBi, an appropriate value is selected as the most reliable vehicle longitudinal speed, SVB.

(a) During Braking a Vehicle

Reference slip ratios SKi are defined as follows:

For a small $|Fxi|$, SKi=0.

For a large $|Fxi|$ and a small $|F_{Yi}|$, assuming a slip angle $\beta i=0$, composite slip ratio $\lambda=|S|=|SKi|$ and $F_{XY}=|F_X|=\mu_{max} Fz(1-\xi^3)$. Referring to expression (2.12) (SKi corresponds to S.), SKi is expressed by:

$$|SKi| = \left(1 - \sqrt[3]{1 - \frac{|F_{Xi}|}{\mu_{max1}F_{Zi}}}\right)\frac{3\mu_{maxi}F_{Zi}}{K_{Si}}.$$

[Notes: In this expression, $\xi \geq 0$ must be satisfied. Thus, at least one wheel must be controlled so as to meet this condition. This is possible in the process described later.]

For large $|F_{Xi}|$ and $|F_{Yi}|$, $$SKi = \frac{\frac{K_{\beta i}}{K_{Si}}\tan\beta_i}{\frac{F_{Yi}}{F_{Xi}} - \frac{K_{\beta i}}{K_{Si}}\tan\beta_i}$$

through expression (2.12).

Thus, the vehicle longitudinal speeds SVBi are given as:

$$SVB_{fl} = \frac{(1 + SK_{fl})VW_{fl} - \gamma\left(-\frac{Tr}{2}\cos\delta + L_f\sin\delta\right)}{\cos\delta + \tan\beta_B\sin\delta} \quad (3.20)$$

$$SVB_{fr} = \frac{(1 + SK_{fr})VW_{fr} - \gamma\left(\frac{Tr}{2}\cos\delta + L_f\sin\delta\right)}{\cos\delta + \tan\beta_B\sin\delta}$$

$$SVB_{rl} = (1 + SK_{rl})VW_{rl} + Tr\gamma/2$$

$$SVB_{rr} = (1 + SK_{rr})VW_{rr} - Tr\gamma/2$$

These are obtained by solving the expressions (3.19) with the resultant SKi and wheel rotational speeds VWi. Then, the largest value among SVBi s is selected as the vehicle longitudinal speed SVB because the largest one is expected to be closest to the real SVB when the vehicle is being braked.

(b) During Not Braking a Vehicle

In a four-wheel drive vehicle, reference slip ratio SKi is defined similar to those during braking except for the case of a large $|Fxi|$ and a small $|F_{Yi}|$, in which SKi is given by $$SKi = \left(1 - \sqrt[3]{1 - \frac{|F_{Xi}|}{\mu_{maxi}F_{Zi}}}\right)\frac{3\mu_{maxi}F_{Zi}}{K_{Si}},$$

because SKi should be negative. The vehicle longitudinal speeds SVBi are given by the same expressions as (3.20), and the smallest value among SVBi is selected as the vehicle longitudinal speed SVB because the smallest one is expected to be closest to the real SVB in this case.

In a two-wheel drive vehicle, an estimation based upon a non-driven wheel is expected to be reliable because neither driving nor braking forces is applied to the wheel. Thus, assuming SKi=0, a vehicle longitudinal speed SVBi on each non-driven wheel is given by:

for a rear wheel drive vehicle, $$SVB_{fl} = \frac{VW_{fl} - \gamma\left(-\frac{Tr}{2}\cos\delta + L_f\sin\delta\right)}{\cos\delta + \tan\beta_B\sin\delta} \quad (3.21a)$$

$$SVB_{fr} = \frac{VW_{fr} - \gamma\left(\frac{Tr}{2}\cos\delta + L_f\sin\delta\right)}{\cos\delta + \tan\beta_B\sin\delta}$$

and; for a front wheel drive vehicle, $$SVB_{rl}=VW_{rl}+(Tr/2)\gamma$$

$$SVB_{rr}=VW_{rr}+(Tr/2)\gamma. \quad (3.21b)$$

In each of the cases, the vehicle longitudinal speed SVB is determined by selecting the larger one from these SVBi or by averaging SVBi.

In some of the above procedures, slip angles $\beta i$ and maximum frictional coefficients $\mu_{max}$ are required. The calculations of these parameters, however, require the vehicle longitudinal speed SVB to be estimated here (see FIG. 2A). Thus, in the initial cycle of the process, an appropriate initial value is given to either of those parameters, for examples, SKi=0, $\beta i=0$, etc. In subsequent cycles, the values obtained in the nearest previous estimation will be used in each calculation.

I-3-7 Estimation of Maximum Static Frictional Coefficient $\mu_{maxi}$ for Each Wheel According to the tire model described in Section I-2, a composite road reaction force $F_{XY}$ is given by $$F_{XYi} = \mu_{maxi} F_{Zi}(1-\xi^3) \text{ for } \xi > 0 \tag{2.8}$$

$$F_{XYi} = \mu_{maxi} F_{Zi} \text{ for } \xi \leq 0. \tag{2.9}$$

Figure 5A:
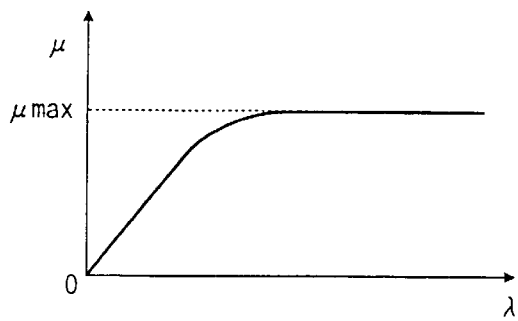
FIG. 5A is a graph of a frictional coefficient $\mu$ vs. a composite slip ratio $\lambda$ according to the tire model employed in the present invention.
Figure 5B:
FIG. 5B is a graph of a frictional coefficient $\mu$ vs. a composite slip ratio $\lambda$ of a real tire.

Defining a static frictional coefficient $\mu_i = F_{XYi}/F_{Zi}$, the relation of $\mu_i$ and a composite slip ratio $\lambda_i$ is shown in FIG. 5A. As seen from the expressions (2.8) and (2.9), $\mu_i$ is assumed to be constant for large $\lambda i$, where $\mu_i$ is defined as the critical (or maximum) static frictional coefficient $\mu_{maxi}$. [In an actual tire, $\mu$ vs. $\lambda$ should be depicted as in FIG. 5B, where $\mu$ has a peak. However, $\mu$ for the region of $\lambda > \lambda_{PEAK}$ is unconcerned because the tire would have been already slipping in this region. Thus, the model presented here is approximately valid.]

Referring to the relation of $\mu_i$ vs. $\lambda_i$ shown in FIG. 5A, $\mu_{max}i$ on each wheel is estimated by $$\mu_{maxi} = \mu i + \Delta\mu(\partial\mu/\partial\lambda)/(\partial\mu/\partial\lambda)_{\lambda=0} \tag{3.22}$$

where $\Delta\mu$ is an appropriate positive constant. $(\partial\mu/\partial\lambda)$ and $(\partial\mu/\partial\lambda)_{\lambda=0}$ are slopes of the curve $\mu i(\lambda)$ at $\lambda=$(the present value) and $\lambda=0$ (see FIG. 5C.) [For detailed explanation of the derivation of the expression (3.22), see Appendix II.]

From the expressions (2.8) and (2.9), $$(\partial\mu/\partial\lambda) = (\partial F_{XYi}/\partial\lambda)/F_{zi} = K_{Si}\xi^2/Fzi$$

$$(\partial\mu/\partial\lambda)_{\lambda=0} = K_S/Fzi \; (\xi=1 \text{ at } \lambda=0)$$

Thus, $\mu_{max}i$ can be expressed as a function of $\xi$, calculated from the vertical load Fzi, wheel slip ratio Si, wheel slip angle $\beta i$, and tire stiffness Ksi, $K_\beta i$, obtained in the previous sections. In order to obtain $\mu_{max}i$, another $\mu_{max}i$ is required as a parameter as seen from the above expression [$\xi$ is a function of $\mu_{max}$.]. Thus, the value estimated in the previous cycle, $\mu_{max}i_{(n-1)}$, is used as the parameter.

Figure 5C:
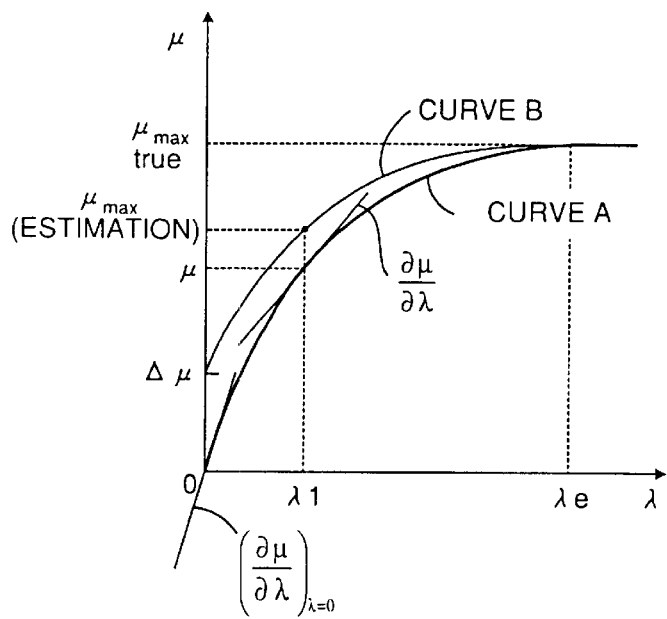
FIG. 5C shows the way of estimating a maximum static frictional coefficient $\mu_{max}$ through expression (3.22)

When $\mu$ does not reach to the true $\mu_{max}$, the error of the estimation of $\mu_{max}$, is rather large. Referring to FIG. 5C, Curve A indicates $\mu(\lambda)$ which is saturated to $\mu_{max}$ [true] at $\lambda e$, and Curve B indicates $\mu_{max}$ estimated through expression (3.22), starting from $\Delta\mu$ on the vertical axis. As seen from this figure, with $\mu$ at point $\lambda 1$ which has not been saturated, $\mu_{max}$ will be estimated to be lower than the true $\mu_{max}$. However, the slope $(\partial\mu/\partial\lambda)$ becomes flat (close to zero) as $\lambda$ increases so that the error of the estimation decreases, and finally, after $\lambda$ reaches $\lambda e$ (i.e. $\xi=0$), the estimated $\mu_{max}$ is consistent to the true value.

The composite slip ratios of rear wheels are always smaller than those of front wheels during braking of a vehicle under an usual turning condition, because the front wheels are steered and braked more strongly than the rear wheels, and therefore an error of an estimated $\mu_{max}$ is larger in the rear wheels. For compensating the error in the rear wheels, the estimated $\mu_{max}$ of left and right rear wheels may be set to those of left and right front wheels, respectively: $\mu_{maxrl} = \mu_{maxfl}; \mu_{maxrr} = \mu_{maxfr}$.

As described in Section I-3-3, Fzi may include an error derived from the dynamic characteristics of pitch and roll components, inducing error in the estimation of $\mu_{maxi}$. However, the value of $\mu_{maxi}$ Fzi is little affected by these dynamic characteristics because $\mu_{maxi}$ Fzi is given by the expressions (2.8) and (2.9).

I-3-8 Calculations of Parameters of Points on a Frictional Circle

In the sections described above, several parameters, i.e. the slip ratio, the slip angle, the maximum frictional coefficient, etc., for each of the wheels are obtained. Thus, using these, a set of parameters at each point on a frictional circle, A, B, C, D, E, etc. may be obtained through the expressions listed in Section I-2. These sets of parameters at points on the frictional circle will be used for the calculations of target values in the following sections. Further, as described above regarding the estimation of lateral forces, the ratios of forces Dk and Fk are now available through the tire model with the parameters estimated in the previous sections.

I-4 Region (B): Judgement of Vehicle Behavior Stability/Instability

Region (B) judges whether or not the behavior of a turning vehicle is stable based upon the balance of yaw moments generated by four wheels. In the judgement protocol, an actual vehicle turning yaw moment, Mi, generated by a road reaction force on each wheel is calculated with the longitudinal and lateral forces Fxi, $F_{Yi}$ obtained in the processes of Region (A). Also, based upon the tire model in section I-2, a "Critical" vehicle turning yaw moment, $M_{iG}$, is defined as a yaw moment which can be generated by a wheel (tire) if the road reaction force is assumed to be saturated while maintaining a present longitudinal force Fxi, for each wheel. Then, by comparing the actual and critical yaw moments, the behavior of the vehicles is judged to be under either of Normal, Spin or Drift conditions. Hereinbelow, the protocol in this region is detailed.

I-4-1 Calculation of Current Yaw Moments Mi

Figure 6:
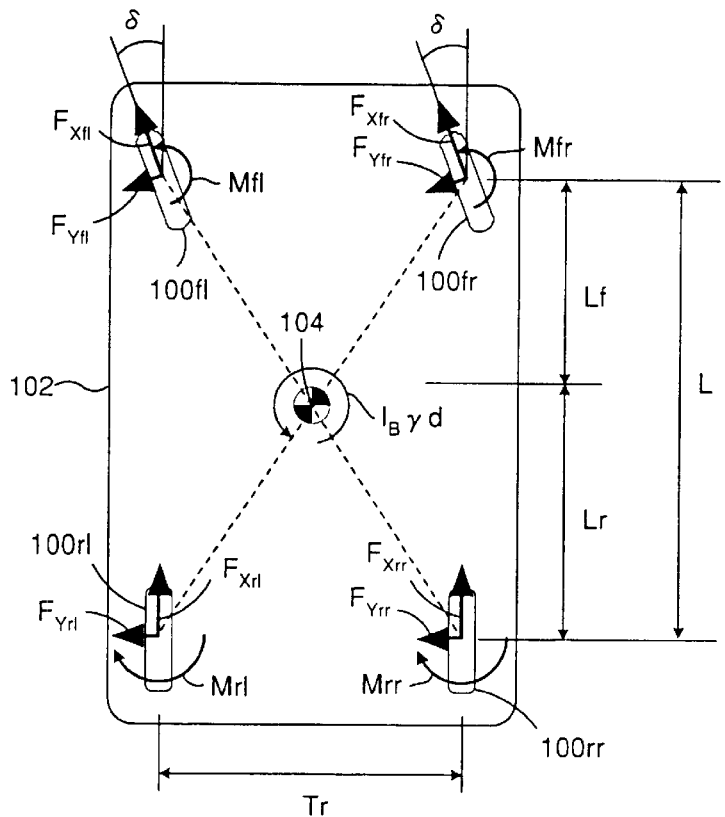
FIG. 6 diagrammatically shows a yaw moment generated by a road reaction force, composed of longitudinal and lateral forces, on each of the wheels of a vehicle during left turning.

The vehicle turning yaw moment, Mi, presently generated by each wheel is calculated with Fxi and $F_{Yi}$ estimated in Region (A), by (see FIG. 6.)

$$M_{fl} = \{-(Tr/2)\cos \delta + L_f \sin \delta\} \cdot F_{Xfl} + \{(Tr/2)\sin \delta + L_f \cos \delta\} \cdot F_{Yfl}$$

$$M_{fr} = \{(Tr/2)\cos \delta + L_f \sin \delta\} \cdot F_{Xfr} + \{-(Tr/2)\sin \delta + L_f \cos \delta\} \cdot F_{Yfr}$$

$$M_{rl} = -(Tr/2) \cdot F_{Xrl} - L_f \cos \delta \cdot F_{Yrl} \tag{4.1}$$

$$M_{rr} = (Tr/2) \cdot F_{Xrr} - L_f F_{Yfr}$$

Thus, a yaw moment, $$I_B \cdot \gamma d = M_{fl} + M_{fr} + M_{rl} + M_{rr}, \tag{4.2}$$

where $I_B$ and $\gamma d$ are the inertia moment of the vehicle body and yaw acceleration, respectively, is presently generated around the centroid of the vehicle.

I-4-2 Calculation of Critical Yaw Moments $M_{iG}$

Figure 7:
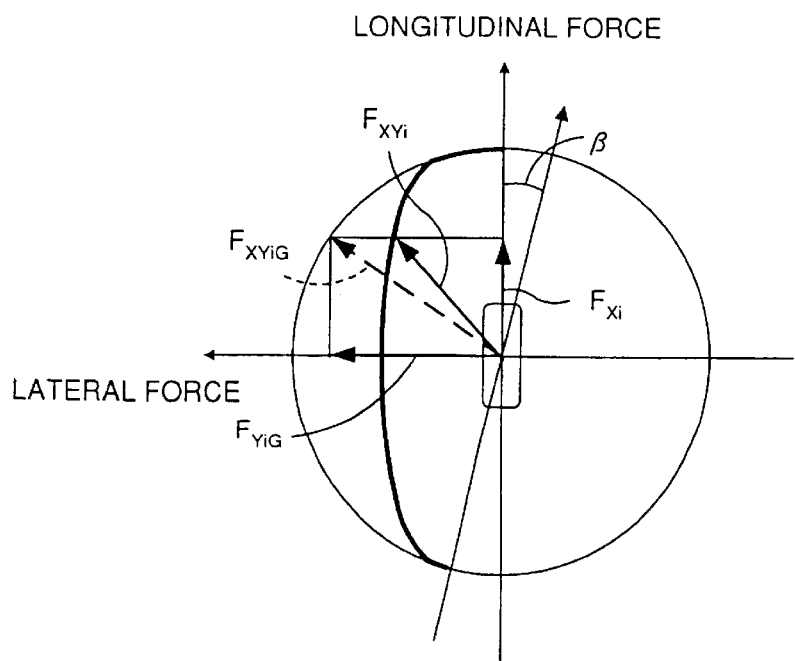
FIG. 7 shows how to define a critical yaw moment of a wheel during left turning.

As shown in FIG. 7, while maintaining the present longitudinal force Fxi on a wheel, a critical lateral force $F_{YiG}$, namely, a lateral force upon maximizing a composite road reaction force $F_{XYi} = \mu_i F_{zi}$ to $\mu_{maxi} F_{zi}$, is given by $F_{YiG} = (\mu_{maxi}^2 F_{zi}^2 - F_{Xi}^2)^{1/2}$. Then, the yaw moment generated by the maximized composite force $F_{XYiG}$ composed of $F_X i$ and $F_{YiG}$, on each wheel, defined as "Critical Yaw Moment", is given by $$M_{flG} = \{-(Tr/2)\cos \delta + L_f \sin \delta\} \cdot F_{Xfl} + \{(Tr/2)\sin \delta + L_f \cos \delta\} \cdot F_{YflG}$$

$$M_{frG} = \{(Tr/2)\cos \delta + L_f \sin \delta\} \cdot F_{Xfr} + \{-(Tr/2)\sin \delta + L_f \cos \delta\} \cdot F_{YfrG}$$

$$M_{rlG} = -(Tr/2) \cdot F_{Xrl} - L_r \cdot F_{YrlG}$$

$$M_{rrG} = (Tr/2) \cdot F_{Xrr} - L_r \cdot F_{YfrG} \tag{4.3}$$

The critical yaw moment indicates the upper limit of yaw moment that a wheel can generate while maintaining its current longitudinal force. At a constant longitudinal force, if a slip angle $|\beta i|$ (namely, a lateral force) is intended to increase for obtaining yaw moment beyond the critical yaw moment, the wheel will start to slip since a composite force $F_{XY}$ could not exceed the corresponding critical frictional circle. Such a tire condition will lead to the behavior instability.

I-4-3 Judgement of Vehicle Behavior Stability (a) Theoretical

When a road reaction force at a wheel is saturated to the critical frictional circle, no further stronger force, i.e. no further larger yaw moment around the centroid of a vehicle, is available from the wheel (at a constant longitudinal force). In a vehicle having two front wheels and two rear wheels and turning along a curved course, if the road reaction forces on the rear wheels have reached to the respective critical frictional circles (that is, the yaw moments have reached to the critical yaw moments) and the sum of the yaw moments generated by the two front wheels is stronger than those generated by the rear wheels, the rear portion of the vehicle will slip outwardly from the curved course. This slipping condition is defined as Spin condition. On the other hand, if the sum of yaw moments generated by the front wheels reaches to its critical value, no further stronger force is available by steering of the front wheel (the loss of controllability by steering). Thus, the front portion of the vehicle can not turn further inwardly and tends to deviate outwardly from the curved course. This condition is defined as Drift condition.

Quantitatively, the current yaw moment of a vehicle body, as described above, is given by expression (4.2):

$$I_B \cdot \gamma d = M_{fl} + M_{fr} + M_{rl} + M_{rr},$$

where $M_{fl}$, $M_{fr} > 0$ and $M_{rl}$, $M_{rr} < 0$ during left turning. If $I_B \cdot \gamma d$ is larger than further available yaw moments from the rear wheels, $|M_{rlG} + M_{rrG} - M_{rl} - M_{rr}|$, while the current yaw moments from the front wheels $M_{fl} + M_{fr}$ is maintained, namely, $$I_B \cdot \gamma d > |M_{rlG} + M_{rrG} - M_{rl} - M_{rr}|, \quad (4.4)$$

the rear portion of the vehicle body will start to slip when the yaw moment generated by the rear wheels reaches its critical value, resulting in the Spin condition. This is because the yaw moments of the front wheels tend to rotate the vehicle body beyond the critical limit of the rear wheels.

On the other hand, if further available yaw moment from the front wheels $M_{flG} + M_{frG} - M_{fl} - M_{fr}$ is little while $I_B \cdot \gamma d$ ($\geq 0$) is smaller than further available yaw moments for the rear wheels $|M_{rlG} + M_{rrG} - M_{rl} - M_{rr}|$, i.e., $$I_B \cdot \gamma d < |M_{rlG} + M_{rrG} - M_{rl} - M_{rr}| \text{ and } M_{flG} + M_{frG} - M_{fl} - M_{fr} << \quad (4.5)$$

while increasing wheel slip angles $|\beta i|$, the yaw rate of the vehicle body will be fixed when the yaw moment generated by the rear wheels is equal to that generated by the front wheels, i.e. $I_B \cdot \gamma d = 0$. This is because the yaw moment of the vehicle body has been already uncontrollable by steering the front wheels. The vehicle, consequently, can not follow a more inwardly curved course, resulting in the Drift condition.

Thus, a spinning or drifting of a vehicle body can be detected or predicted from whether or not the condition (4.4) or (4.5) is satisfied.

(b) Practical

In the protocol of the process, an index value is defined as $$M_{fl} + M_{fr} + M_{rlG} + M_{rrG} - KI\beta d_r$$

where $-KI\beta d_r$ allows for an advance in phase; $\beta d_r$ is a rear wheel slip angle velocity; KI is a positive constant; and $$\begin{aligned} M_{fl} + M_{fr} + M_{rlG} + M_{rrG} &= I_B \cdot \gamma d - M_{rlG} + |M_{rrG} - M_{rl} - M_{rr}| \\ &= I_B \cdot \gamma d - M_{rlG} + M_{rrG} - M_{rl} - M_{rr} \\ &= M_{fl} + M_{fr} + M_{rl} + M_{rr} + M_{rlG} + \\ &\quad M_{rrG} - M_{rl} - M_{rr}. \end{aligned}$$

Thus, when the index value satisfies:

$$M_{fl} + M_{fr} + M_{rlG} + M_{rrG} - KI\beta d_r > -\Delta Ms \quad (4.6)$$

[corresponding to expression (4.4)], where $\Delta Ms$ is an appropriate small positive constant, the behavior is judged under Spin condition.

When the index value satisfies:

$$M_{fl} + M_{fr} + M_{rlG} + M_{rrG} - KI\beta d_r < -\Delta M_d$$

and $$M_{fl} + M_{fr} > K_f (M_{flG} + M_{frG}) \quad (4.7)$$

[corresponding to expression (4.5)], where $\Delta Md$ is an appropriate small positive constant; Kf is an appropriate positive factor of 0.8–0.9, the behavior is judged under Drift condition under $I_B \cdot \gamma d \geq 0$.

If neither Spin nor Drift conditions are detected in the above, the behavior is judged under Normal condition.

In the above-mentioned index value, the advance in phase $-KI\beta d_r$ may be omitted. In order to allow for the advance in phase in the index value more accurately, $$[d(M_{fl} + M_{fr} + M_{rlG} + M_{rrG})/dt] \text{ for the judgement of spin,}$$

$$[d(M_{flG} + M_{frG} + M_{rlG} + M_{rrG})/dt] \text{ for the judgement of drift-out}$$

should be used as a variable. However, since the calculation of these amounts is too complicated, $-KI\beta d_r$ is used as these approximation.

It should be noted that, in the above, since the vehicle behavior is judged from the balances of the actual and critical yaw moments, the present invention can detect (or predict) and efficiently avoid the behavior abnormalities prior to those actual occurrences.

I-4-4 Calculation of Rear Wheel Slip Angle Velocity $\beta d_r$

Rear wheel slip angle velocity $\beta dr$, used for the index value for the judgement of the vehicle behavior, is obtained as follows [Here the difference between the right and left wheels is neglected (Tr=0).]: The rear wheel slip angle $\beta r$ is given by $$\tan \beta r = \tan \beta_B - Lr\gamma/Vx$$

where $Vx$ is the longitudinal velocity of the vehicle body. Assuming $Vx$=constant, the time differentiation of this expression is expressed by $$d \tan \beta r/dt = d \tan \beta_B/dt - Lr \gamma d/Vx$$

The slip angle $\beta_B$ and its time differentials are given by $$\tan \beta_B = V_Y/V_X,$$

$$d \tan \beta_B/dt = dV_Y/V_X = (G_Y - V_X\gamma)/V_X = G_Y/V_X - \gamma$$

where $V_Y$ is the lateral velocity of the vehicle body. In the latter expression, the relation, $G_Y = V_Y d + V_X \gamma$, where $V_Y d$ is the time differential of $V_y$, is used. Thus, the rear wheel slip angle velocity is expressed by $$\beta dr = \arctan[(G_Y - V_X\gamma - Lr\,\gamma d)/Vx]. \quad (4.8)$$

SVB obtained in Section I-3-6 is substituted for Vx.

I-5 Region (C) Calculations of Target Values for Individual Wheels

Region (C), as shown in FIG. 2C, first, calculates a target longitudinal force for each wheel in response to the result of region (B), and adjusts actual longitudinal forces of the wheels to the respective target forces through a braking system and/or an engine and driving system.

In this region, the following target values are calculated:

(1) Basic target longitudinal forces, determined from driver's demands, such as a braking pedal depression, throttle angle opening or an acceleration pedal depression;

(2) First target longitudinal forces, determined by modulating the basic target forces based upon Normal running condition limits. Normal running condition limits are defined so as to maintain an appropriate balance of the longitudinal and lateral forces while avoiding wheel-spin and wheel-lock conditions.

(3) Second target longitudinal forces, determined by modulating the first target forces so as to appropriately avoid and/or suppress Spin condition if it is detected.

(4) Third target longitudinal forces, determined by modulating the first target forces so as to appropriately avoid and/or suppress Drift-out condition if it is detected.

These target forces are calculated using the parameters obtained in the region (A) through the tire model described in section I-2.

In controlling the actual longitudinal forces, the first target forces are selected in response to the judgement of Normal running conditions; in response to the judgements of Spin and Drift-out conditions, the second and third target forces are selected, respectively [unless noted otherwise. See section I-5-5.]. Then, the values of the selected target forces are converted to the corresponding target braking pressures and/or throttle openings.

Hereinafter, the processes in this region are detailed.

I-5-1 Calculations of Basic Target Longitudinal Forces

Basic target longitudinal force for each wheel directly reflects the driver's demand of forwarding or braking her/his vehicle. Representing a vehicle body (total) target braking force, e.g. corresponding to the depression of a brake pedal, by $F_{XVB}$ and a vehicle body (total) target driving force, e.g. corresponding to a throttle opening or the depression of an axle pedal, by D, a vehicle body (total) longitudinal forces is given as $$F_{XV} = F_{XVB} + D. \quad (5.1)$$

The total target braking force may be obtained from the pressure in master cylinder Pm, which is converted with an appropriate factor $K_{pm}$ by $$F_{XVB} = K_{pm} \cdot Pm. \quad (5.1a)$$

The target driving force D may be obtained by $$D = K_\alpha \cdot \alpha, \quad (5.1b)$$

where α denotes the amount of an acceleration pedal depression; $K_\alpha$ a conversion factor. [It should be noted that, when an engine brake is used, D<0.]

Then, during braking, i.e. $F_{XV} < 0$, the total target longitudinal force is distributed to each wheel at a distribution ratio in proportion to the corresponding vertical load Fzi (obtained in the section I-3-3) as:

$$F_{Xfl0} = (F_{Zfl}/F_{ZV})F_{XV}$$

$$F_{Xfr0} = (F_{Zfr}/F_{ZV})F_{XV}$$

$$F_{Xrl0} = (F_{Zrl}/F_{ZV})F_{XV} \quad (5.2a)$$

$$F_{Xrr0} = (F_{Zrr}/F_{ZV})F_{XV},$$

where $F_{Xi0}$ denotes the basic target longitudinal forces.

On the other hand, during driving (non-braking), assuming that the driving force is directly applied to the wheels, the basic target forces $F_{Xi0}$ are determined as:

for a four-wheel drive vehicle, $$F_{Xfl0} = F_{Xfr0} = [a/(1+a)]F_{XV}/2,$$

$$F_{Xrl0} = F_{Xrr0} = [1/(1+a)]F_{XV}/2; \quad (5.2b)$$

for a rear-wheel drive vehicle, $$F_{Xfl0} = F_{Xfr0} = 0,$$

$$F_{Xrl0} = F_{Xrr0} = F_{XV}/2; \quad (5.2c)$$

for a front-wheel drive vehicle, $$F_{Xfl0} = F_{Xfr0} = F_{XV}/2,$$

$$F_{Xrl0} = F_{Xrr0} = 0. \quad (5.2d)$$

I-5-2 Calculations of First Target Longitudinal Forces

The basic target forces described in the previous subsection provide an appropriate braking/driving force distribution based upon the driver's demand. However, an excessive driver's demand will lead to wheel-spin or -lock conditions. Further, as seen from the tire model in section I-2, the variation in a longitudinal force may induce the reduction in the corresponding lateral force, leading to the loss of the turning ability of the vehicle. Thus, in this region, Normal running limits [upper and lower limits] are introduced, and, if the basic target force exceeds either of the normal running limits, the target force is modulated to the limit. Target values through this modulation process are defined as "First" target longitudinal forces denoted by $F_{xi1}$. The actual longitudinal force on each wheel is therefore adjusted to this first target force in between the opposite normal running limits [unless Spin condition is judged].

The normal running limits are determined individually for each wheels, dependent upon slip angles βi. Here, the general way of determining the limits is explained first, then those of individual cases will be detailed.

Figure 8A:
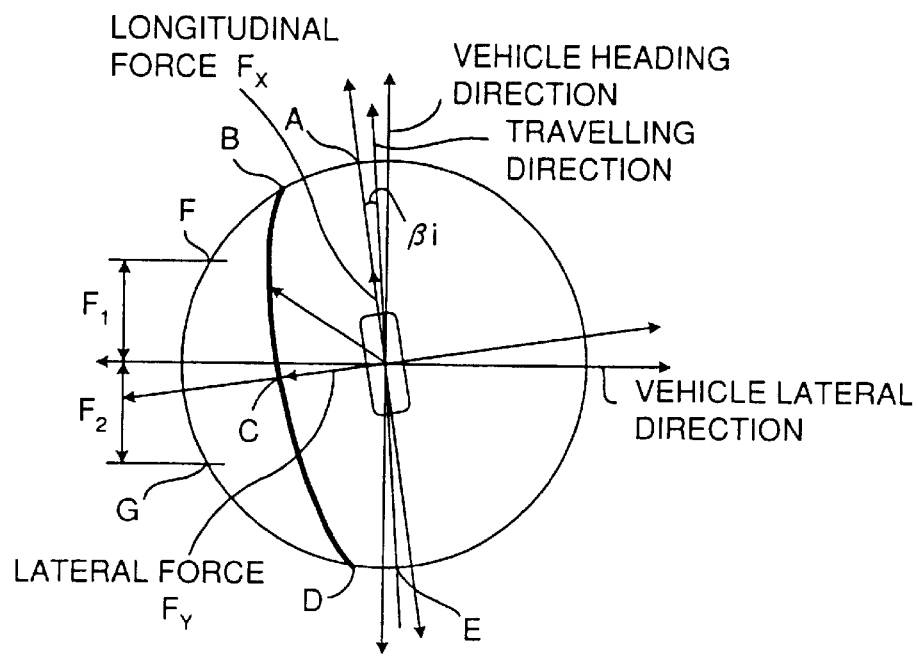
FIGS. 8A and 8B each show a frictional circle indicating how to define Normal running limits on a front wheel of a left turning vehicle.
Figure 8B:
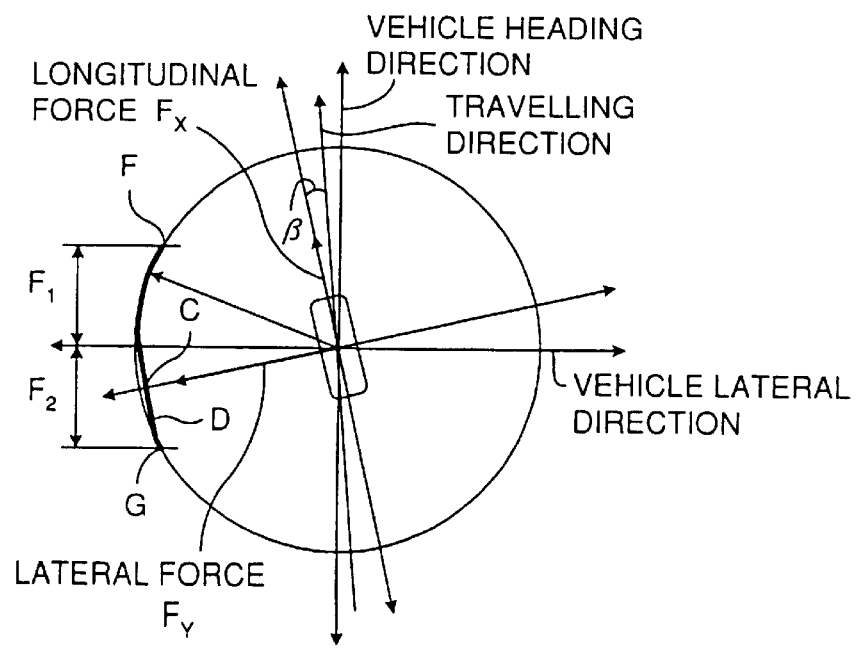

FIGS. 8A and 8B show frictional circles similar to FIG. 3 for small and large slip angles |βi|, respectively. It should be noted that, in principle, a composite force vector $F_{XYi}$ would be movable in between points A and E by the variation of the longitudinal force Fx. As seen from FIG. 8A, if the slip angle |βi| is small, the lateral force $F_{Yi}$ is less varied by the variation of the longitudinal force $F_{Xi}$, so that, in this case, the longitudinal force $F_{Xi}$ may be varied widely. Since, however, wheel spin and lock would occur at points A and E, respectively, the normal running limits should be defined at points closer to the center of the tire, e.g. at B and D (where ξ=0), thereby avoiding the wheel spinning and locking (anti-wheel spin and anti-lock processes).

For a large slip angle |βi| as shown in FIG. 8B, $F_{Yi}$ is largely varied depending upon Fxi, so that the normal running limits should be defined at e.g. points F and G so as to maintain a certain amount of the lateral force $F_{Yi}$ while satisfying the driver's demand to some extent. [Both of points B and D move toward the rotational axis of the tire as a slip angle $|\beta i|$ increases. If the normal running limits are set to points B and D in the whole range of slip angle, the target longitudinal force would be limited within too small range for a large slip angle, so that the driver's command could not be reflected in the target value.]

For determining whether the slip angle $|\beta i|$ is large or small and for defining the normal running limits for a large slip angle, index points are introduced as shown by points F and G in FIGS. 8A and 8B. If points B and/or D, where $\xi=0$, are positioned out of an arc defined between F and G (FIG. 8A), the corresponding slip angle $|\beta i|$ is judged small and the normal running limits are defined by points B and/or D. If points B and/or D are between points F and G (FIG. 8B), the corresponding slip angle $|\beta i|$ is judged large and the normal running limits are defined by points F and G.

The definitions of the normal running limits and the determinations of the first target longitudinal forces for individual cases are detailed below. [The values of the forces at points B and D are shown in section 1-2.]

(a) Front Wheels (See FIGS. 8A and 8B)

Index points F and G are defined by the widths $F_1$ and $F_2$, which are determined by $$F_1 = K_{FXf} \mu_{max} Fz,$$

$$F_2 = -K_{FXf} \mu_{max} Fz, \quad (5.3)$$

where $K_{FXf}$ is an appropriate positive constant of e.g. 0.4. $F_1$ and $F_2$ are taken along the vehicle body longitudinal direction. The normal running limits and the first longitudinal forces $F_{Xfl1}$ and $F_{Xfr1}$ are determined as follows:

In a rear-wheel drive vehicle:
For a small $|\beta i|$, Normal running limits: C and D
For a large $|\beta i|$, Normal running limits: C and G $$F_{Xfl1} = MIN[MAX\{F_{Xfl0}, MIN(F_{XDfl}, -\mu_{maxfl} F_{Zfl} \cdot \sin(\arcsin K_{FXf} - |\delta|))\}, 0]$$

$$F_{Xfr1} = MIN[MAX\{F_{Xfr0}, MIN(F_{XDfr}, -\mu_{maxfr} F_{Zfr} \cdot \sin(\arcsin K_{FXf} - |\delta|))\}, 0] \quad (5.4)$$

Notes: The front wheels of the rear-wheel front vehicle is non-driven so that Fxi1<0. The upper limit is set to point C, accordingly. In the expressions of $F_{Xfl1}$ and $F_{Xfr1}$, $$MIN(F_{XDfl}, -\mu_{maxfl} F_{Zfl} \cdot \sin(\arcsin K_{FXf} - |\delta|))$$

$$MIN(F_{XDfr}, -\mu_{maxfr} F_{Zfr} \cdot \sin(\arcsin K_{FXf} - |\delta|)) \quad (5.4a)$$

represent to anti-lock target longitudinal forces.

In a front-wheel drive vehicle and a four-wheel vehicle:
For a small $|\beta i|$, Normal running limits: B and D
For a large $|\beta i|$, Normal running limits: F and G $$F_{Xfl1} = MIN[MAX\{FX_{fl0},$$
$$MIN(F_{XDfl}, -\mu_{maxfl} F_{Zfl} \cdot \sin(\arcsin K_{FXf} - |\delta|))\},$$
$$MAX(F_{XBfl}, -\mu_{maxfl} F_{Zfl} \cdot \sin(\arcsin K_{FXf} - |\delta|))] \quad (5.5)$$

$$F_{Xfr1} = MIN[MAX\{FX_{fr0},$$
$$MIN(F_{XDfr}, -\mu_{maxfr} F_{Zfr} \cdot \sin(\arcsin K_{FXf} - |\delta|))\},$$
$$MAX(F_{XBfr}, -\mu_{maxfr} F_{Zfr} \cdot \sin(\arcsin K_{FXf} - |\delta|))]$$

Note:

$$MAX(F_{XBfl}, \mu_{maxfl} F_{Zfl} \cdot \sin(\arcsin K_{FXf} + |\delta|))$$

$$MAX(F_{XBfr}, \mu_{maxfr} F_{Zfr} \cdot \sin(\arcsin K_{FXf} + |\delta|)) \quad (5.5a)$$

represent to anti-wheel spin target longitudinal forces.

Figure 9A:
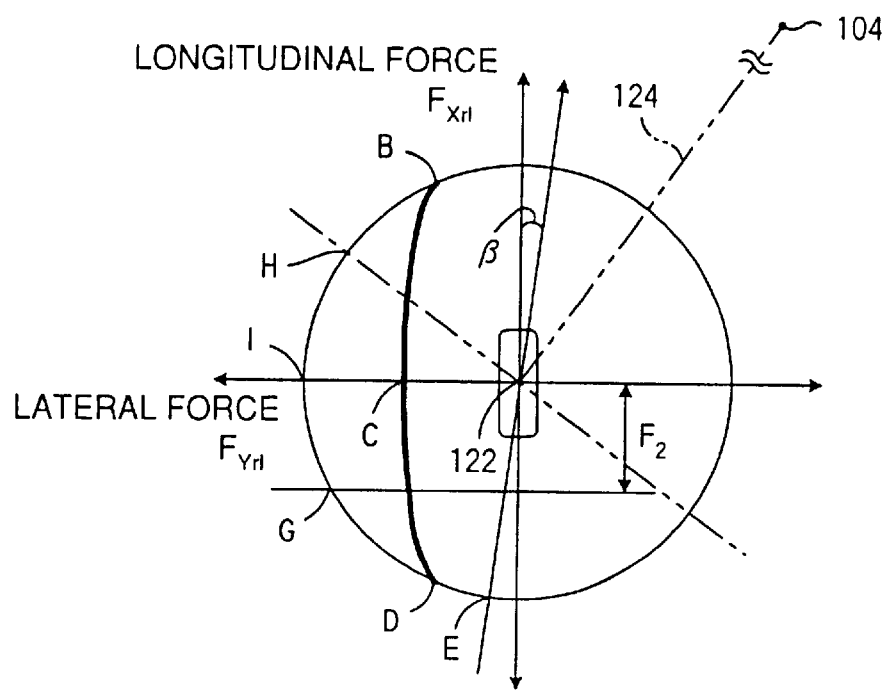
FIGS. 9A and 9B each show a frictional circle indicating how to define normal running limits on the rear inside (left) wheel of a left turning vehicle.
Figure 9B:
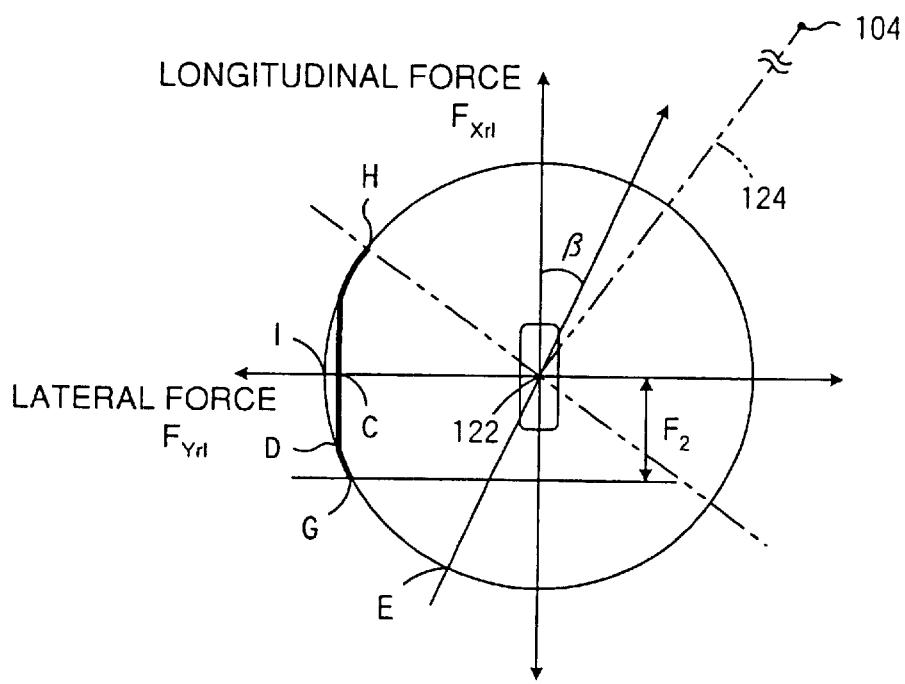

(b) Rear Inside (Left) Wheel (see FIGS. 9A and 9B)

Index points H and G are defined. Point G is defined by the width $F_2$, expressed by $$F_2 = -K_{FXr} \mu_{max} Fz \quad (5.6)$$

where $K_{FXr}$ is an appropriate positive constant of e.g. 0.4. Point H is defined as shown in the figures, where the composite force vector $F_{XY}$ is perpendicular to a moment arm 124 between the centroid 104 of the vehicle body and tire center 122 (the force acting point). Thus, the maximum reverse vehicle turning yaw moment is obtained at point H. The normal running limits and the first longitudinal forces $F_{Xfl1}$ and $F_{Xfr1}$ are determined as follows:

In a front-wheel drive vehicle:
For a small $|\beta i|$, Normal running limits: C and D
For a large $|\beta i|$, Normal running limits: C and G $$F_{Xrl1} = MAX\{F_{Xrl0}, MIN(F_{XDrl}, -K_{FXr} \cdot \mu_{maxrl} F_{Zrl})\} \quad (5.7)$$

Note: The rear wheel of the front-wheel front vehicle is non-driven so that Fxi1<0. The upper limit is set to point C, accordingly. In the expression of $F_{Xrl1}$, $$MIN(F_{XDrl}, -K_{FXr} \cdot \mu_{maxrl} F_{Zrl}) \quad (5.7a)$$

represents an anti-lock target longitudinal force.

In a rear-wheel drive vehicle and a four-wheel vehicle:
During braking: identical to that in the front-wheel drive vehicle;
During non-braking:
For a small $|\beta i|$, Normal running limits: B and C.
For a large $|\beta i|$, Normal running limits: H and C.

$$F_{XrH} = MIN[MAX\{F_{Xrl0}, MIN(F_{XDrl}, -K_{FXr} \cdot \mu_{maxrl} \cdot F_{Zrl})\}, \quad (5.8)$$

$$MAX(F_{XBrl}, -\mu_{maxrl} F_{Zrl} \cdot \sin(\arctan(Tr/2Lr)))]$$

Note: During non-braking, $F_{Xfl} > 0$ so that the lower limit is defined at C.

$$MAX(F_{XBrl}, \mu_{maxrl} F_{Zrl} \cdot \sin(\arctan(Tr/2L_r))) \quad (5.8a)$$

represents an anti-wheel spin target longitudinal forces.

Figure 10A:
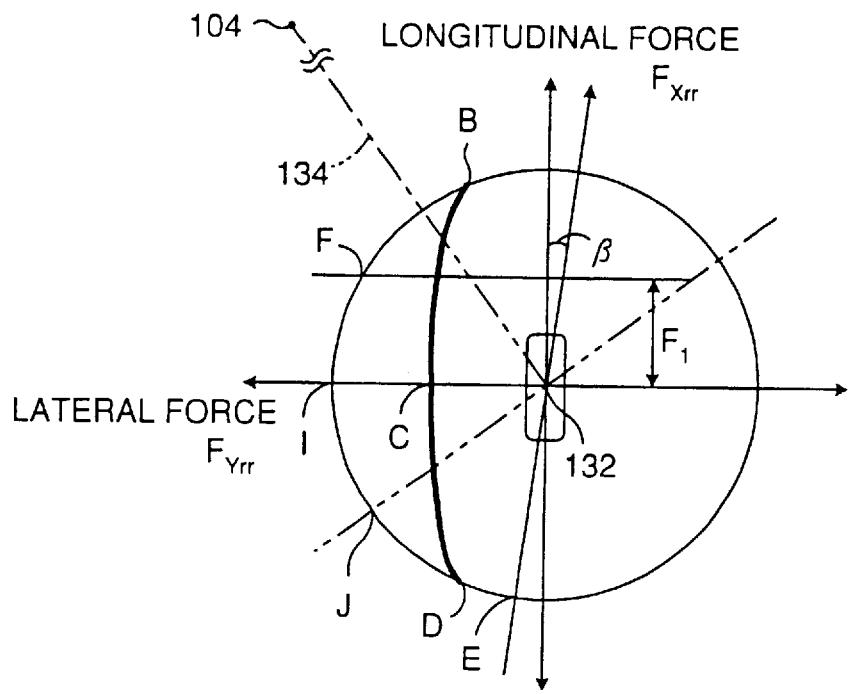
FIGS. 10A and 10B each show a frictional circle indicating how to define normal running limits on the rear outside (right) wheel of a left turning vehicle.
Figure 10B:
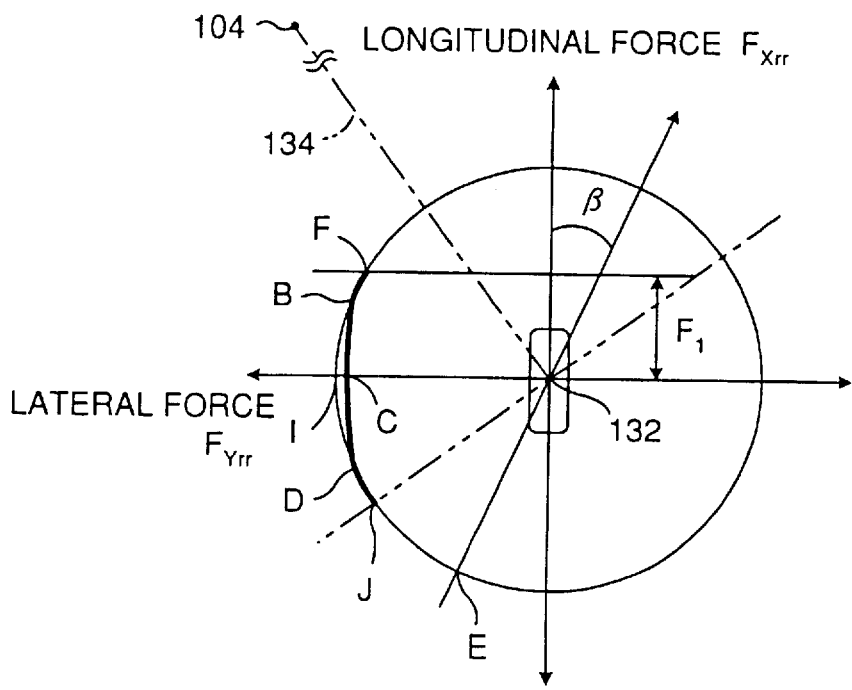

(c) Rear Outside (Right) Wheel (see FIGS. 10A and 10B)

Index points F and J are defined. Point F is defined by the width $F_1$, expressed by $$F_1 = K_{FXr} \mu_{max} Fz \quad (5.9)$$

where $K_{FXr}$ is an appropriate positive constant of e.g. 0.4. Point J is defined, where the composite force vector $F_{XY}$ is perpendicular to a moment arm 134 between the centroid 104 of the vehicle body and tire center 132. Thus, the maximum reverse vehicle turning yaw moment is obtained at point J. The normal running limits and the first longitudinal forces $F_{Xfl1}$ and $F_{Xfr1}$ for each case are determined as follows:

In a front-wheel drive vehicle:
For a small $|\beta i|$, Normal running limits: C and D;
For a large $|\beta i|$, Normal running limits: C and J;

$$F_{Xrr1} = MAX\{F_{Xrr0}, MIN(F_{XDrr}, -\mu_{maxrr} F_{Zrr} \cdot \sin(\arctan(Tr/2L_r)))\} \quad (5.10)$$

Note: The rear wheel of the front-wheel front vehicle is non-driven so that Fxi1<0. The upper limit is set to point C, accordingly. In the expression of $F_{Xrr1}$, $$MIN(F_{XDrr}, -\mu_{maxrr} F_{Zrr} \cdot \sin(\arctan(Tr/2L_r))) \quad (5.10a)$$

represents an anti-lock target longitudinal force.

In a rear-wheel drive vehicle and a four-wheel vehicle:
During braking: identical to that in the front-wheel drive vehicle;
During non-braking:
For a small $|\beta i|$, Normal running limits: B and C;
For a large $|\beta i|$, Normal running limits: F and C;

$$F_{Xrrl} = \text{MIN}[\text{MAX}\{F_{Xrr0}, \text{MIN}(F_{XDrr}, \qquad (5.11)$$
$$-\mu_{maxrr}F_{Zrr}\cdot\sin(\arctan(Tr/2Lr))\},$$
$$\text{MAX}(F_{XBrr}, K_{FXr}\cdot\mu_{maxrr}\cdot F_{Zrr})]$$

Note: During non-braking, $F_{Xfr}>0$ so that the lower limit is defined at C.

$$\text{MAX}(F_{XBrr}, K_{FXr}\cdot\mu_{maxrr}\cdot F_{Zrr}) \qquad (5.11a)$$

represents an anti-wheel spin target longitudinal forces.

(d) Simplified Normal Running Limit

Figure 11A:
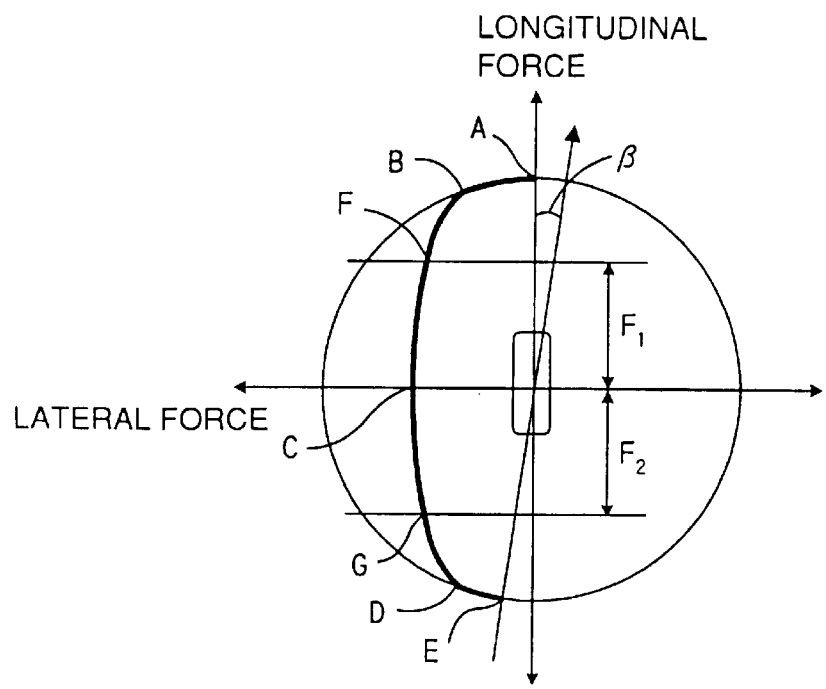
FIGS. 11A and 11B each show a frictional circle indicating how to define simplified normal running limits on a wheel of a left turning vehicle.
Figure 11B:
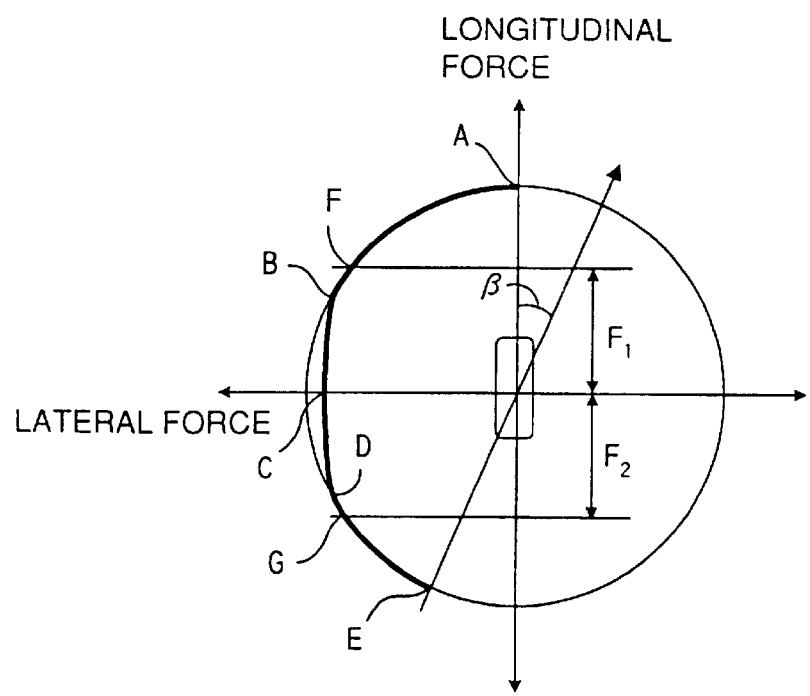

In the above protocols, the index points are determined individually for the respective wheels. For the purpose of simplifying the calculation of the first target forces, the index points F and G may be defined commonly in all of the wheels by widths $F_1$ and $F_2$ taken along the longitudinal (Heading) direction of each wheel as shown in FIGS. 11A and 11B. The widths $F_1$ and $F_2$ are defined as:

$$F_1 = K_{FX}\mu_{maxi}Fzi,$$
$$F_2 = K_{FX}\mu_{maxi}Fzi, \qquad (5.12)$$

Thus, the normal running limits and the first longitudinal forces $F_{Xi1}$ and $F_{Xi1}$ (i=fl, fr, rl, and rr) may be determined as follows:

During braking:
For a small $|\beta i|$, Normal running limits: C and D.
For a large $|\beta i|$, Normal running limits: C and G.

$$F_{Xi1} = \text{MAX}\{F_{Xi0}, \text{MIN}(F_{XDi}, -K_{FX}\mu_{maxi}F_{Zi})\} \qquad (5.13)$$

During non-braking:
For a small $|\beta i|$, Normal running limits: B and C.
For a large $|\beta i|$, Normal running limits: F and C.

$$F_{Xi1} = \text{MIN}\{F_{Xi0}, \text{MAX}(F_{XBi}, K_{FX}\mu_{maxi}F_{Zi})\} \qquad (5.14)$$

(e) Auxiliary Controls for the Longitudinal Forces

In order to improve the controllability of the longitudinal forces, $F_{XB1}$, $F_{XDi}$ at the points B and D appearing in the expressions listed above may be modified with a term of the difference between a target and an actual slip ratios, as follows:

During braking, $F_{XD} \rightarrow F_{XD}\{1-K_D(S-S_D)\}$;

During non-braking, $F_{XB} \rightarrow F_{XB}\{1+K_D(S-S_B)\}$. $\qquad (5.15)$ In the following descriptions, these values will be simply denoted by $F_{XD}$ and $F_{XB}$.

I-5-3 Calculations of Second Target Longitudinal Forces $F_{Xi2}$ (Target Forces for Suppressing and/or Avoiding Spin Condition)

In the present invention, upon detecting spin condition, the first target force for each wheel $F_{Xi1}$ will be modulated to "Second" target force $F_{Xi2}$ for suppressing a spin condition, where an additional yaw moment will be generated in the direction opposite to the current rotation of the vehicle around its centroid. During left turning, a yaw moment in clockwise direction should be produced by either of the wheels.

As described in the section I-4, in the present invention, Spin condition, more strictly, spin tendency, is detected when the index value satisfies:

$$M_{fl}+M_{fr}+M_{rlG}+M_{rrG}-KI\beta d_r > -\Delta Ms.$$

Thus, for suppressing this spin tendency, a control yaw moment Mns in the direction against spinning is generated by wheels so as to satisfy:

$$(M_{fl}+M_{fr}+M_{rlG}+M_{rrG})+Mns=-\Delta Ms+KI\beta d_r, \qquad (5.16)$$

where Mns should be distributed to the wheels so as to satisfy $$M_{fl}+M_{fr}+M_{rlG}+M_{rrG}-KI\beta d_r \leq -\Delta Ms$$

after a controlling process.

It should be noted that, in the index value, the amounts of yaw moments for the front wheels are actual values while those for the rear wheels are not actual but critical values. Correspondingly, a target value for an actual or a critical value should be calculated for each wheel.

In the process described here, first, a target yaw moment to be generated by each wheel is calculated based upon the concept described above. Then, Second target longitudinal force $F_{Xi2}$ for each wheel is obtained from the target yaw moment.

In the followings, the ways of calculating parameters required for calculating the target yaw moment are described first. Then, the ways of determining target yaw moment for each wheel are described. Finally, the way of converting the target yaw moments to the second target longitudinal forces $F_{Xi2}$.

(i) Calculations of Parameters

Yaw Moments To Be Generated by $F_{Xi1}$

Here, only yaw moments for the front wheels are provided because those for the rear wheels are not used in the following calculation.

The lateral forces $F_{Yi1}$ corresponding to the first target longitudinal forces $F_{Xi1}$ are calculated as follows:

If $|F_{XDi}|$ is small, i.e. the slip angle $|\beta i|$ is large (see FIG. 8B), $$F_{Yfl1}=(\mu_{maxfl}^2 F_{zfl}^2 - F_{Xfl1}^2)^{1/2}$$
$$F_{Yfr1}=(\mu_{maxfr}^2 Fzfr^2 - F_{Xfr1}^2)^{1/2} \qquad (5.17)$$

If $|F_{XDi}|$ is large, i.e. the slip angle $|\beta i|$ is small (see FIG. 8A), through the expression (2.12) of the tire model (see section I-2):

for $F_{Xi1}<0$, $$F_{Yfl1} = \frac{1+S_{fl}}{\text{MAX}(S_{fl}, S_{min})} \frac{K_{\beta fl}}{K_{Sfl}}\tan\beta_{fl}\cdot F_{Xfl1} \qquad (5.18a)$$

$$F_{Yfr1} = \frac{1+S_{fr}}{\text{MAX}(S_{fr}, S_{min})} \frac{K_{\beta fr}}{K_{Sfr}}\tan\beta_{tr}\cdot F_{Xfr1}$$

for $F_{Xi1}=0$:

$$F_{Yfl1}=F_{XYfl1}$$

$$F_{Yfr1}=F_{XYfr1} \qquad (5.18b)$$

where $F_{XYi1}=\mu_{max} Fzi(1-\xi^3)$ at S=0.

for $F_{Xi1}>0$:

$$F_{Yfl1} = \frac{1+S_{fl}}{\text{MIN}(S_{fl}, -S_{\min})} \frac{K_{\beta fl}}{K_{Sfl}} \tan\beta_{fl} \cdot F_{Xfl1} \quad (5.18c)$$

$$F_{Yfr1} = \frac{1+S_{fr}}{\text{MIN}(S_{fr}, -S_{\min})} \frac{K_{\beta fr}}{K_{Sfr}} \tan\beta_{fr} \cdot F_{Xfr1}.$$

Thus, the yaw moments generated by these forces are given by $$M_{fl1}=\{-(Tr/2)\cos\delta+L_f\sin\delta\}\cdot F_{Xfl1}+\{(Tr/2)\sin\delta+L_f\cos\delta\}\cdot F_{Yfl1}$$

$$M_{fr1}=\{(Tr/2)\cos\delta+L_f\sin\delta\}\cdot F_{Xfr1}+\{-(Tr/2)\sin\delta+L_f\cos\delta\}\cdot F_{Yfr1} \quad (5.19)$$

Critical Yaw Moments Which Can be Generated by $F_{Xi1}$

A critical yaw moment which can be generated by each wheel at the first target longitudinal forces $F_{Xi1}$, denoted by $M_{iG1}$, are calculated as follows:

$$M_{flG1}=\{-(Tr/2)\cos\delta+L_f\sin\delta\}\cdot F_{Xfl1}+\{(Tr/2)\sin\delta+L_f\cos\delta\}\cdot F_{YflG1}$$

$$M_{frG1}=\{(Tr/2)\cos\delta+L_f\sin\delta\}\cdot F_{Xfr1}+\{-(Tr/2)\sin\delta+L_f\cos\delta\}\cdot F_{YfrG1}$$

$$M_{rlG1}=-(Tr/2)\cdot F_{Xrl1}-L_r\cdot F_{YrlG1} \quad (5.20)$$

$$M_{rrG1}=(Tr/2)\cdot F_{Xrr1}-L_r\cdot F_{YfrG1},$$

where $F_{YiG1}=(\mu_{maxi}^2 F_{zi}^2-F_{Xi1}^2)^{1/2}$.

For the definition of "critical yaw moment", see Section I-4-2.

Critical Yaw Moments at $F_{Xi1}=0$

Here, the amounts for the rear wheel are only shown because those for the front wheels are not used in the following calculation. Critical yaw moment by each wheel at $F_{Xi}=0$, i.e. $F_Y i=\mu_{max} F_{Z1}$, denoted by $M_{iG0}$, are calculated as follows:

$$M_{rlG0}=-\mu_{max} F_{Zrl} Lr$$

$$M_{rrG0}=-\mu_{max} F_{Zrr} Lr \quad (5.21).$$

Effective Yaw Moments Against Spinning

Here, "Effective Yaw Moment" against Spinning for each wheel is introduced. The effective yaw moment for each wheel is defined as the yaw moment largest in its magnitude in the direction of suppressing the spin condition, in other words, most effective for satisfying expression (5.16). This effective yaw moment defines an upper limit of the magnitude of the target yaw moment for each wheel, usable in distributing a control yaw moment Mns to the wheels.

As described above, in the expression (5.16), yaw moments to be controlled for the front wheels are actual values $M_{fl}$, $M_{fr}$, while those for the rear wheels are critical values $M_{rlG}$, $M_{rrG}$. Thus, the effective yaw moments are correspondingly defined. The yaw moment for suppressing the spinning is always negative during left turning, thus the effective yaw moment against spinning will be denoted by "$M_{i\_}$min" or $M_{iG\_}$min in the following descriptions.

The effective (critical) yaw moment against spinning for each wheel is defined as follows:

(a) Front Outside (Right) Wheel

Figure 12A:
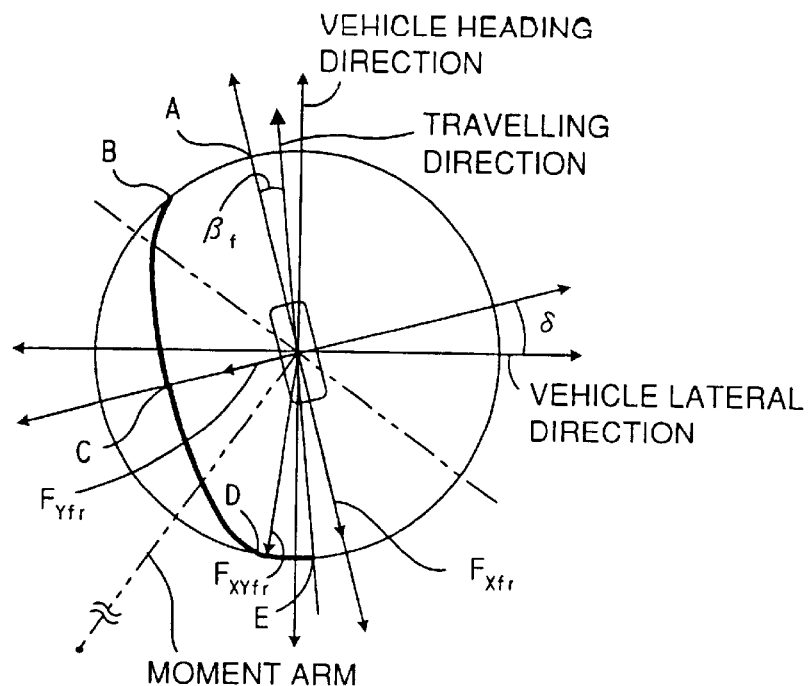
FIGS. 12A and 12B each show a frictional circle indicating how to define an effective yaw moment of the front outside (right) wheel of a left turning vehicle for a spin avoiding process.

When $\beta_f \leq 0$ i.e. the front wheels is steered in the direction identical to the current turning (leftward) direction as shown in FIG. 12A, a composite force vector $F_{XY}$ is expected to be present between points B and D under the control in normal running condition (see section I-3) and movable between points A and E by changing the longitudinal force $F_X$. Thus, a composite force vector between points D and E will effectively produce a yaw moment most effectively suppressing the spin condition, and the minimum yaw moment (largest in the clockwise direction) may be generated by the composite vector on point E as $$M_{fr\_}\min^*=-\mu_{maxfr} F_{Zfr} \sin(\arctan(Tr/2L_f)+\delta+\beta_{fr})\cdot L_f/\cos(\arctan(Tr/2L_f)) \quad (5.22)$$

where $F_{Xfr}=-\mu_{maxfr} F_{Zfr} \cos\beta_{fr}$.

On the point E, however, a wheel Locking would occur. In order to avoid this, by limiting the slip ratio to an appropriate value $S_{max}$, and thus the corresponding longitudinal force $F_{Xfr}$ to $$F_{Xfr\_}\min = -(S_{\max}/\lambda_{\max fr})\mu_{\max fr}\cdot F_{Zfr}\{1-K_D(S_{fr}-S_{\max})\} \quad (5.23)$$

where $$\lambda_{\max fr} = \sqrt{S_{\max}^2 + (1+S_{\max})^2\left(\frac{K_{\beta fr}}{K_{Sfr}}\right)^2 \tan^2\beta_{fr}}.$$

Thus, the effective yaw moment against spinning is given by $$M_{fr\_}\min=\{(Tr/2)\cos\delta+L_f\sin\delta\}\cdot F_{Xfr\_}\min+\{-(Tr/2)\sin\delta+L_f\cos\delta\}\cdot F_{Yfr\_}\min, \quad (5.24)$$

where $F_{Yfr\_}\min=(\mu_{maxfr}^2 F_{zfr}^2-F_{Xfr\_}\min^2)^{1/2}$.

Figure 12B:
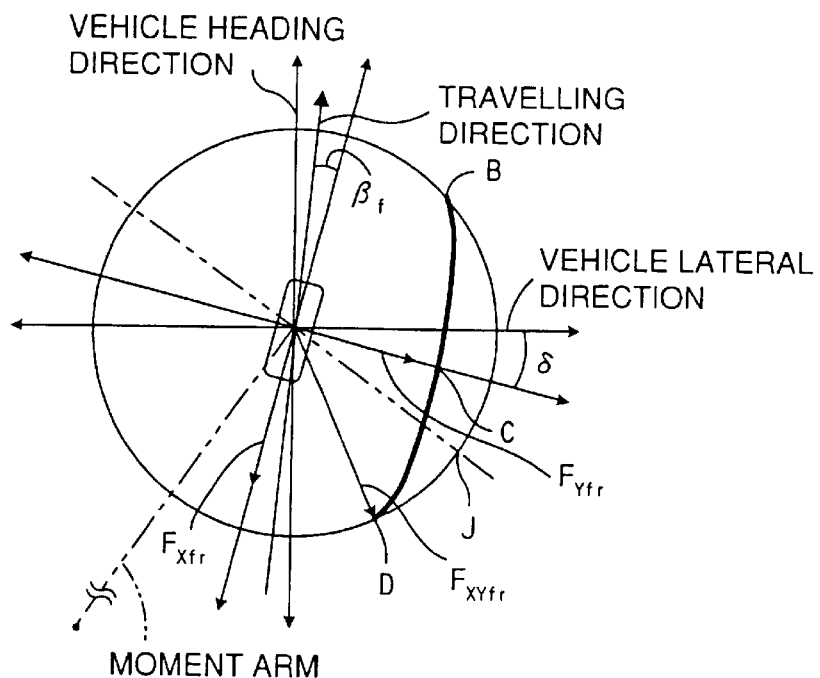

When $\beta f>0$, i.e. the front wheels is steered in the direction reverse to the current turning direction (leftward) as shown in FIG. 12B, a point generating the effective yaw moment is varied dependent on the magnitude of the slip angle $|\beta i|$:

If $F_{XDfr} \geq -\mu_{maxfr} F_{Zfr}\cdot\sin(\arctan(Tr/2Lf)+\delta)$, i.e. $|\beta i|$ is large, where point D is above point J on which the composite force vector is directed perpendicular to the moment arm, the effective yaw moment is given on point J by:

$$M_{fr\_}\min=-\mu_{maxfr} F_{Zfr} L_f/\cos(\arctan(Tr/2L_f)). \quad (5.25)$$

If $F_{XDfr}<-\mu_{maxfr}F_{Zfr}\cdot\sin(\arctan(Tr/2Lf)+\delta)$, i.e. $|\beta i|$ is small, where point D is below point J as shown in FIG. 12B, the effective yaw moment is given on point D by $$M_{fr\_}\min=\{(Tr/2)\cos\delta+L_f\sin\delta\}\cdot F_{XDfr}+\{-(Tr/2)\sin\delta+L_f\cos\delta\}\cdot F_{YDfr}, \quad (5.26)$$

where $F_{YDfr}=(\mu_{maxfr}^2 F_{zfr}^2-F_{XDfr}^2)^{1/2}$.

As seen from FIGS. 12A and 12B, the effective yaw moment is obtained by applying a braking force. It should be noted that, in the actual control of suppressing spinning, the front outside wheel yaw moment will be adjusted to between $M_{fr1}$ and $M_{fr\_}$min.

(b) Rear Inside (Left) Wheel

Figure 13A:
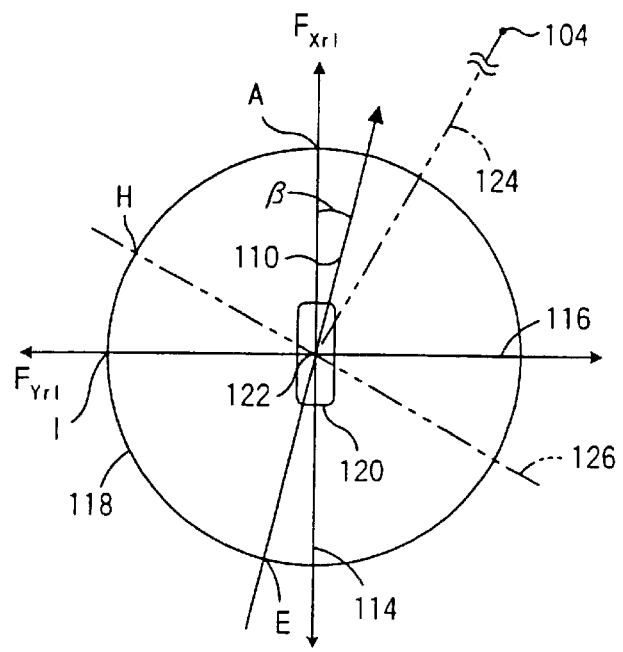
FIGS. 13A and 13B show frictional circles indicating how to define an effective critical yaw moment of the rear inside (left) and outside (right) wheels, respectively, of a left turning vehicle for a spin avoiding process.

Referring to FIG. 13A, during braking vehicle, i.e. when a composite force vector should be in the left lower quadrant, the effective "critical" yaw moment is given by the composite force vector on point I. Thus, $$M_{rlG\_}\min=M_{rlG0} \quad (5.27)$$

(the critical yaw moment at $F_{Xrl}=0$ described above).

During non-braking, i.e. when the composite force vector should be in the left upper quadrant, the effective critical yaw moment is given by the composite force vector on point H where the composite forces is directed perpendicular to the moment arm 124. Thus, $$M_{rlG\_}\min=-\mu_{max\ rl} F_{Zrl} L_r/\cos(\arctan(Tr/2L_r)). \quad (5.28)$$

(c) Rear Outside (Right) Wheel

Figure 13B:
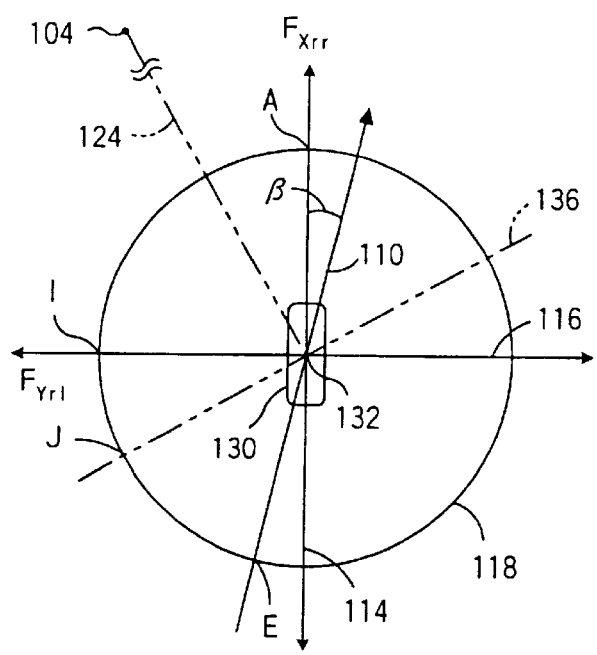

Referring to FIG. 13B, the effective "critical" yaw moment is obtained by the composite force vector on point J. Thus, $$M_{rrG\_}\min=-\mu_{max\ rr} F_{Zrr} L_r/\cos(\arctan(Tr/2L_r)). \quad (5.29)$$

(d) Front Inside (Left) Wheel

Figure 14:
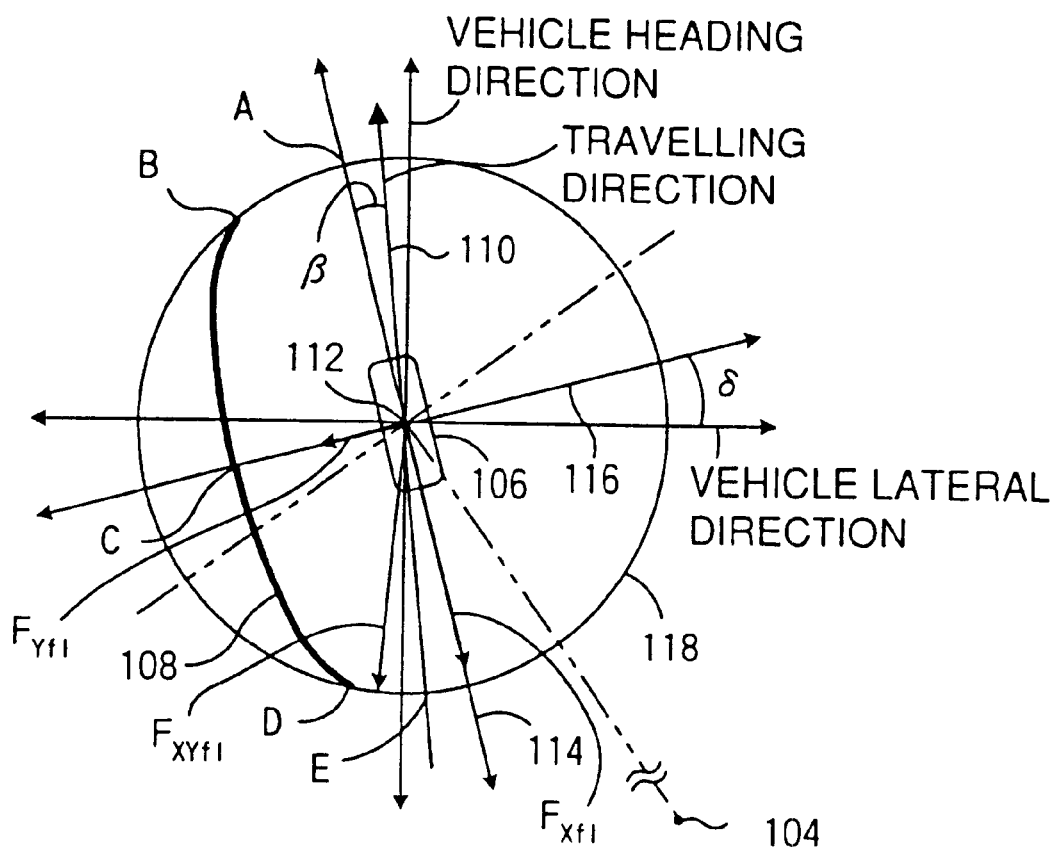
FIG. 14 shows a frictional circle indicating that the front inside (left) wheel is not useful for a spin avoiding process.

Referring to FIG. 14, if the composite force vector is directed to the interval between D and E, the presently generated yaw moment by the front wheel will be reduced. However, the direction of the yaw moment is not reversed so that only a little effect is obtained. Thus, the modulation of the target value for this wheel will not be done.

(ii) Determination of a Target Yaw Moment for Each Wheel

Several ways of distributing the required (control) yaw moment Mns are possible, each of which ways results in a different effect on the subsequent vehicle behavior. Hereinbelow, the ways of distributing Mns and the respective effects are detailed. A target actual or critical yaw moment for each wheel is denoted by $M_{i2}$ or $M_{iG2}$, respectively.

(a) During Barking a Vehicle

In order to acquire a yaw moment suppressing the spinning during braking a vehicle, braking forces should be increased on the front outside wheel and reduced on the rear wheels. The increase of a braking force on the front wheel reduces a turning performance, but improves a braking performance. On the other hand, the reduction in the braking force leads to improving the turning performance while deteriorating the braking performance. Thus, the way of distributing yaw moments to the wheels is determined by the preferred performance in the vehicle behavior. Further, as described above, a distributing way should be adapted to the magnitude of the yaw moment to be additionally generated, Mns.

Several ways of distributing the control yaw moment Mns are described below. Practically, from those ways, any preferred one will be selected. In the process described here, a yaw moment for each wheel is controlled such that neither of wheels is applied to a driving forces (i.e. a longitudinal force is limited within the lower (left) quadrant in a frictional circle.) for surely obtaining a braking effect. Thus, $M_{rlG\_min} = M_{rlG0}$.

(1) When the Turning Performance is Preferred

If a control yaw moment Mns can be obtained only from the rear wheel, i.e.

$$(M_{fl}+M_{fr}+M_{rlG}+M_{rrG})+Mns=-\Delta Ms+KI\beta d_r \geq M_{fl}+M_{fr}+M_{rlG0}+M_{rrG\_min} \quad (5.30)$$

a total yaw moment of the vehicle should be set out as:

$$(M_{fl} + M_{fr} + M_{rlG} + M_{rrG}) + Mns = -\Delta Ms + KI\beta d_r. \quad (5.31)$$

$$= M_{fl} + M_{fr} + M_{rlG} + M_{rrG} +$$

$$K_{ls}\{(M_{rlG0} - M_{rlG1}) +$$

$$(M_{rrG\_min} - M_{rrG1})\}$$

Then, since a factor $K_{ls}$ is expressed by $$K_{ls} = \frac{-\Delta M_S + KI_\beta \beta d_r - (M_{fl1} + M_{fr1} + M_{rlG1} + M_{rrG1})}{(M_{rlG0} - M_{rlG1}) + (M_{rrg\_min} - M_{rrG1})},$$

a target moment for each wheel may be set out as:

$M_{fr2} = M_{fr1}$ $M_{rlG2} = (1-K_{ls})M_{rlG1} + K_{ls}M_{rlG0}$ $M_{rrG2} = (1-K_{ls})M_{rrG1} + K_{ls}M_{rrG\_min} \quad (5.32)$ Otherwise, i.e.

$$(M_{fl}+M_{fr}+M_{rlG}+M_{rrG})+Mns=-\Delta Ms+KI\beta d_r \leq M_{fl}+M_{fr}+M_{rlG0}+M_{rrG\_min}$$

where the effective critical yaw moments for the rear wheels should be fully used while compensated with the effective yaw moment for the front wheel, a total yaw moment of the vehicle may be set out as:

$$(M_{fl} + M_{fr} + M_{rlG} + M_{rrG}) + Mns = -\Delta Ms + KI\beta d_r. \quad (5.33)$$

$$= M_{fl1} + M_{fr1} + M_{rlG0} +$$

$$M_{rrG\_min} +$$

$$K_{ls}(M_{fr\_min} - M_{fr1}).$$

Then, since a factor $K_{ls}$ is expressed by $$K_{ls} = \frac{-\Delta M_S + KI_\beta \beta d_r - (M_{fl1} + M_{fr1} + M_{rlG0} + M_{rrg\_min})}{(M_{fr\_min} - M_{fr1})}$$

a target moment for each wheel may be set out as $M_{fr2} = (1-K_{ls})M_{fr1} + K_{ls}M_{fr\_min}$ $M_{rlG2} = M_{rlG0}$ $M_{rrG2} = M_{rrG\_min}. \quad (5.34)$ (2) When the Braking Performance is Relatively Preferred A control yaw moment Mns is distributed to each of three wheels at a ratio proportional to the corresponding further available yaw moment (the difference from the effective to the first target yaw moments, $M_{1\_min} - M_{i1}$), thereby improving the braking performance because of the increased weight of the effect of a braking force added by the front wheel. Thus, a total yaw moment of the vehicle may be set out as:

$$(M_{fl} + M_{fr} + M_{rlG} + M_{rrG}) + Mns = -\Delta Ms + KI\beta d_r. \quad (5.35)$$

$$= M_{fl1} + M_{fr1} + M_{rlG1} + M_{rrG1} +$$

$$K_{ls}\{(M_{fr\_min} - M_{fr1}) +$$

$$(M_{frG0} - M_{rlG1}) +$$

$$(M_{rrG\_min} - M_{rrG1})\}$$

Then, since a factor $K_{ls}$ is expressed by $$K_{ls} = \frac{-\Delta M_S + KI_\beta \beta d_r - (M_{fl1} + M_{fr1} + M_{rlG1} + M_{rrG1})}{(M_{fr\_min} - M_{fr1}) + (M_{flG0} - M_{rlG1}) + (M_{rrG\_min} - M_{rrG1})},$$

a target moment for each wheels may be set out as:

$M_{fr2} = (1-K_{ls})M_{fr1} + K_{ls}M_{fr\_min}$ $M_{rlG2} = (1-K_{ls})M_{rlG1} + K_{ls}M_{rlG0}$ $M_{rrG2} = (1-K_{ls})M_{rrG1} + K_{ls}M_{rrG\_min} \quad (5.36)$ (3) When the Braking Performance is Preferred If a control yaw moment Mns can be obtained only from the front wheel, i.e.

$$(M_{fl}+M_{fr}+M_{rlG}+M_{rrG})+Mns=-\Delta Ms+KI\beta d_r \geq M_{fl}+M_{fr\_min}+M_{rlG1}+M_{rrG1} \quad (5.37)$$

a total yaw moment of the vehicle should be set out as:

$$(M_{fl} + M_{fr} + M_{rlG} + M_{rrG}) + Mns = -\Delta Ms + KI\beta d_r. \quad (5.38)$$
$$= M_{fl1} + M_{fr1} +$$
$$M_{rlG1} + M_{rrG1} +$$
$$K_{ls}\{(M_{fr\_min} - M_{fr1}).$$

Then, since a factor $K_{ls}$ is expressed by $$K_{1s} = \frac{-\Delta M_S + KI\beta d_r - (M_{fl1} + M_{tr1} + M_{rlG1} + M_{rrG1})}{M_{fr\_min} - M_{fr1}},$$

a target moment for each wheel may be set out as:

$$M_{fr2}=(1-K_{ls})M_{fr1}+K_{ls}M_{fr\_min}$$
$$M_{rlG2}=M_{rlG1}$$
$$M_{rrG2}=M_{rrG1} \quad (5.39)$$

Otherwise, i.e.

$$(M_{fl}+M_{fr}+M_{rlG}+M_{rrG})+Mns=-\Delta Ms+KI\beta d_r \leq M_{fl}+ M_{fr\_min}+M_{rlG1}+M_{rrG1} \quad (5.40)$$

where the effective yaw moment for the front wheel should be fully used while compensated with the effective critical yaw moments for the rear wheels, a total yaw moment of the vehicle should be set out as:

$$(M_{fl} + M_{fr} + M_{rlG} + M_{rrG}) + Mns = -\Delta Ms + KI\beta d_r. \quad (5.41)$$
$$= M_{fl1} + M_{fr\_min} +$$
$$M_{rlG1} + M_{rrG1} +$$
$$K_{ls}\{(M_{frG0} - M_{rlG1}) +$$
$$(M_{rrG\_min} - M_{rrG1})\}$$

Then, since a factor $K_{ls}$ is expressed by $$K_{1s} = \frac{-\Delta M_S + KI\beta d_r - (M_{fl1} + M_{fr\_min} + M_{rlG1} + M_{rrG1})}{(M_{rlG0} - M_{rlG1}) + (M_{rrG\_min} - M_{rrG1})},$$

a target moment for each wheel may be set out as $$M_{fr2}=M_{fr\_min}$$
$$M_{rlG2}=(1-K_{ls})M_{rlG1}+K_{ls}M_{rlG0}$$
$$M_{rrG2}=(1-K_{ls})M_{rrG1}+K_{ls}M_{rrG\_min}. \quad (5.42)$$

(b) During Non-Braking a Vehicle

The ways of distributing the yaw moment Mns are different, depending upon the vehicle driving types.

(1) Rear Wheel Drive Vehicle

In a rear wheel drive vehicle, in order to acquire a yaw moment suppressing a spin condition, the braking force on the front outside wheel should be increased; the driving force should be reduced or the braking force increased on the rear wheels. However, the increase in the braking force on the front wheel reduces a turning performance because the lateral force on the front wheel is reduced as shown in FIG. 12A. Thus, the suppression of spin condition is done mainly by the rear wheels. The way of distributing the yaw moment Mns is basically identical to that in case (a) (1) of during braking as described above. However, $M_{rlG\_min}$ is given by expression (5.28).

(2) Front Wheel Drive Vehicle

In a front wheel drive vehicle, a spin condition may be suppressed by reducing the driving force on the front outside wheel and/or by increasing a braking force on the rear outside wheel. No yaw moment effective to suppress the spin condition is available from the rear inside wheel, taking into account the direction of force producible thereon (The wheel is non-driven, see FIG. 13B). The reduction of the driving force on the front outside wheel improves a turning performance because of the increase in the corresponding lateral forces while the total driving force of the vehicle is sacrificed.

If a spin condition can be suppressed under a condition of the longitudinal force on the front outside wheel$\geq 0$, i.e.

$$(M_{fl}+M_{fr}+M_{rlG}+M_{rrG})+Mns=-\Delta Ms+KI\beta d_r \geq M_{fl1}+M_{fr0}+M_{rlG1}+M_{rrG1} \quad (5.43)$$

where $M_{fr0}$ denotes $M_{fr1}$ at $F_{Xfr1}=0$ (see expressions (5.18b) and (5.19)), a total yaw moment of the vehicle should be set out as:

$$(M_{fl} + M_{fr} + M_{rlG} + M_{rrG}) + Mns = -\Delta Ms + KI\beta d_r. \quad (5.44)$$
$$= M_{fl1} + M_{fr1} +$$
$$M_{rlG1} + M_{rrG1} +$$
$$K_{ls}(M_{fr0} - M_{fr1}).$$

Then, since a factor $K_{ls}$ is expressed by $$K_{1s} = \frac{-\Delta M_S + KI\beta d_r - (M_{fl1} + M_{tr1} + M_{rlG1} + M_{rrG1})}{M_{fr0} - M_{fr1}},$$

a target moment for each wheel may be set out as:

$$M_{fr2}=(1-K_{ls})M_{fr1}+K_{ls}M_{fr0}$$
$$M_{rrG2}=M_{rrG1}. \quad (5.45)$$

If a spin condition can be suppressed by the rear outside wheel under the longitudinal force on the front outside wheel=0, i.e.

$$M_{fl1}+M_{fr0}+M_{rlG1}+M_{rrG1}>(M_{fl}+M_{fr}+M_{rlG}+M_{rrG})+M_{ns}=-\Delta Ms+ KI\beta d_r \geq_{fl1}+M_{fr0}+M_{rlG1}+M_{rrG\_min}, \quad (5.46)$$

a total yaw moment of the vehicle should be set out as:

$$(M_{fl} + M_{fr} + M_{rlG} + M_{rrG}) + Mns = -\Delta Ms + KI\beta d_r. \quad (5.47)$$
$$= M_{fl1} + M_{fr0} +$$
$$M_{rlG1} + M_{rrG1} +$$
$$K_{ls}(M_{rrG\_min} - M_{rrG1}).$$

Then, since a factor $K_{ls}$ is expressed by $$K_{1s} = \frac{-\Delta M_S + KI\beta d_r - (M_{fl1} + M_{fr0} + M_{rlG1} + M_{rrG1})}{M_{rrG\_min} - M_{rrG1}},$$

a target moment for each wheel may be set out as:

$$M_{fr2}=M_{fr0}$$
$$M_{rrg2}=(1-K_{ls})M_{rrG1}+K_{ls}M_{rrG\_min}. \quad (5.48)$$

Otherwise, a total yaw moment of the vehicle should be set out as:

$$(M_{fl} + M_{fr} + M_{rlG} + M_{rrG}) + Mns = -\Delta Ms + KI\beta d_r \quad (5.49)$$
$$= M_{fll} + M_{fr0} +$$
$$M_{rlG1} + M_{rrG\_min} +$$
$$K_{ls}(M_{fr0} + M_{fr\_min}),$$

where the effective yaw moment for the rear outside wheel are fully used while compensated by applying a braking force on the front outside wheel.

Then, since a factor $K_{ls}$ is expressed by $$K_{ls} = \frac{-\Delta M_S + KI\beta d_r - (M_{fll} + M_{fr0} + M_{rlG1} + M_{rrG\_min})}{M_{fr\_min} - M_{trl}},$$

a target moment for each wheel may be set out as $$M_{fr2}=(1-K_{ls})M_{fr0}+K_{ls}M_{fr\_min}$$
$$M_{rrG2}=M_{rrG\_min} \quad (5.50)$$

(3) Four Wheel Drive Vehicle

A control yaw moment Mns may be obtained by reducing the driving force on the front outside wheel and/or rear inside wheel, and/or by increasing the braking force on the rear outside wheel. The way of distributing the yaw moment Mns is determined as in the case of the front wheel drive vehicle except that the rear inside wheel is used:

If a spin condition can be suppressed only by the longitudinal force on the front outside wheel $F_{Xfr} \geq 0$, i.e.

$$(M_{fl}+M_{fr}+M_{rlG}+M_{rrG})+Mns=-\Delta Ms+KI\beta d_r. \geq M_{fl1}+M_{fr0}+M_{rlG1}+M_{rrG1}, \quad (5.51)$$

a total yaw moment of the vehicle should be set out as:

$$(M_{fl} + M_{fr} + M_{rlG} + M_{rrG}) + Mns = -\Delta Ms + KI\beta d_r. \quad (5.52)$$
$$= M_{fll} + M_{frl} +$$
$$M_{rlG1} + M_{rrG1} +$$
$$K_{ls}(M_{fr0} - M_{frl}).$$

Then, since a factor $K_{ls}$ is expressed by $$K_{ls} = \frac{-\Delta M_S + KI\beta d_r - (M_{fll} + M_{frl} + M_{rlG1} + M_{rrG1})}{M_{fr0} - M_{frl}},$$

a target moment for each wheel may be set out as:

$$M_{fr2}=(1-K_{ls})M_{frl}+K_{ls}M_{fr0}$$
$$M_{rlG2}=M_{rlG1}$$
$$M_{rrG2}=M_{rrG1}. \quad (5.53)$$

If a spin condition can be suppressed by the rear wheels under the longitudinal force on the front outside wheel $F_{Xfr}=0$, i.e.

$$M_{fl1}+M_{fr0}+M_{rlG1}+M_{rrG1}>(M_{fl}+M_{fr}+M_{rlG}+M_{rrG})+Mns=-\Delta Ms+KI\beta d_r \geq M_{fl1}+M_{fr0}+M_{rlG\_min}+M_{rrG\_i\,min}, \quad (5.54)$$

a total yaw moment of the vehicle should be set out as:

$$(M_{fl} + M_{fr} + M_{rlG} + M_{rrG}) + Mns = -\Delta Ms + KI\beta d_r. \quad (5.55)$$
$$= M_{fll} + M_{fr0} +$$
$$M_{rlG1} + M_{rrG1} +$$
$$K_{ls}\{(M_{rlG\_min} - M_{rlG1})\}.$$

Then, since a factor $K_{ls}$ is expressed by $$K_{ls} = \frac{-\Delta M_S + KI\beta d_r - (M_{fll} + M_{fr0} + M_{rlG1} + M_{rrG1})}{(M_{rlG\_min} - M_{rlG1}) + (M_{rrG\_min} - M_{rrG1})},$$

a target moment for each wheel may be set out as:

$$M_{fr2}=M_{fr0}$$
$$M_{rlG2}=(1-K_{ls})M_{rlG1}+K_{ls}M_{rlG\_min}$$
$$M_{rrG2}=(1-K_{ls})M_{rrG1}+K_{ls}M_{rrG\_min}. \quad (5.56)$$

Otherwise, a total yaw moment of the vehicle should be set out as:

$$(M_{fl} + M_{fr} + M_{rlG} + M_{rrG}) + Mns = -\Delta Ms + KI\beta d_r. \quad (5.57)$$
$$M_{fll} + M_{fr0} +$$
$$M_{rlG\_min} + M_{rrG\_min} +$$
$$K_{ls}(M_{fr\_min} - M_{fr0}).$$

where the effective yaw moments for the rear wheels should be fully used while compensated by applying a braking force on the front outside wheel.

Then, since a factor $K_{ls}$ is expressed by $$K_{ls} = \frac{-\Delta M_S + KI\beta d_r - (M_{fll} + M_{fr0} + M_{rlG\_min} + M_{rrG\_min})}{M_{fr\_min} - M_{fr0}},$$

a target moment for each wheel may be set out as $$M_{fr2}=(1-K_{ls})M_{fr0}+K_{ls}M_{fr\_min}$$
$$M_{rlG2}=M_{rlG\_min}$$
$$M_{rrG2}=M_{rrG\_min}. \quad (5.58)$$

(c) Simplified Process

For purpose of simplifying the calculation in the process, Mns may be generated by only the front outside wheel, where the value on point E, Mfr_min* (see expression (5.22)) may be used as the effective yaw moment for the front wheel. In this case, the target moment of the front outside wheel is given by $$M_{fr2}=MAX\{-Mns-(M_{fl}+M_{rlG}+M_{rrG}), M_{fr\_min}^*\} \quad (5.59).$$

Then if Mns can not be obtained by the control of the front outside wheel, the rear wheels will be controlled so as to generate a composite force on point G corresponding to the lower normal running limit (see FIG. 11B), and the front inside wheel controlled so as to generate the forces on point D where ξ=0, whereby all of the wheels are being braked so that the vehicle is decelerated.

(iii) Calculation of Second Target Longitudinal Forces

Using the tire model described in the section I-2, the target moments $M_{fr2}$, $M_{rlG2}$ and $M_{rrG2}$ are converted to the respective longitudinal forces, namely, Second target longitudinal forces $F_{Xi2}$. Parameters required for the following calculations are obtained in the region (A).

(a) Front Outside Wheels

Figure 15A:
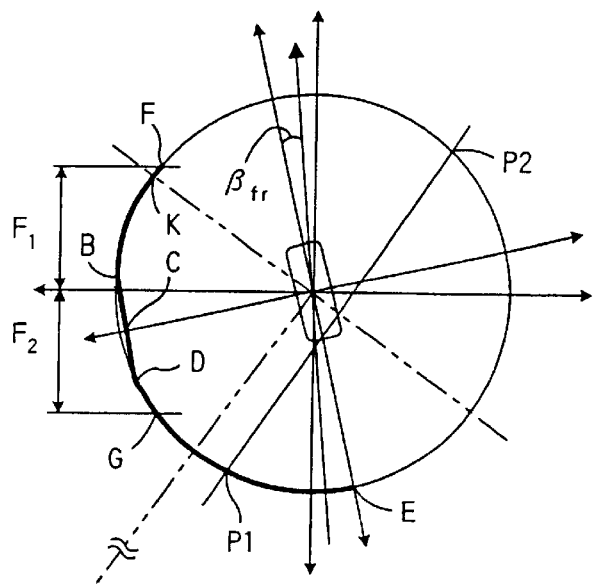
FIGS. 15A and 15B each show a frictional circle indicating how to determine, from a target yaw moment, Second target longitudinal force for the front outside (right) wheel of a left turning vehicle in a spin avoiding process.

For a large $|\beta_{fr}|$ i.e. $F_{XDfr} \geq F_2$, the composite force on the wheel has approximately reached to its critical frictional circle as shown in FIG. 15A.

Thus, $M_{fr2}$ may be expressed by:

$$M_{fr2} = \{(Tr/2)\cos\delta + L_f \sin\delta\} \cdot F_{Xfr2} + \{-(Tr/2)\sin\delta + L_f \cos\delta\} \cdot F_{Yfr2} \quad (5.59)$$

where $$F_{Yfr2} = (\mu_{maxi}^2 F_{zfr}^2 - F_{Xfr2}^2)^{1/2}. \quad (5.60)$$

Although two results are obtained by solving this expression with respect to $F_{xfr2}$ as shown in FIG. 15A denoted by P1 and P2, since the force vector Fxy is movable only on the solid line, the target force will be given by the negative result $P_1$:

$$F_{Xfr2} = \frac{\left(\frac{Tr}{2}\cos\delta + L_f \sin\delta\right) M_{fr2}}{\frac{Tr^2}{4} + L_f^2} - \frac{\left(-\frac{Tr}{2}\sin\delta + L_f \cos\delta\right)\sqrt{\left(\frac{Tr^2}{4} + L_f^2\right)\mu_{maxfr}^2 F_{Zfr}^2 - M_{fr2}^2}}{\frac{Tr^2}{4} + L_f^2} \quad (5.61)$$

Figure 15B:
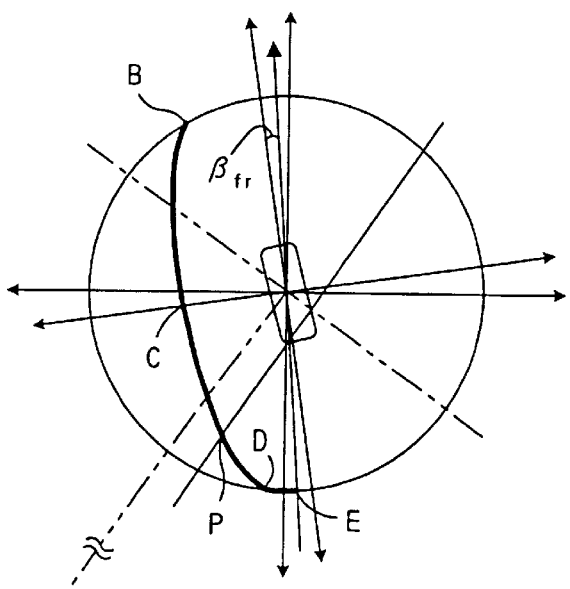

For a small $|\beta_{fr}|$, i.e. $F_{XDfr} \leq F_2$, referring to FIG. 15B, if the composite force to be obtained is from points B to D, the corresponding lateral force $F_{Yfr2}$ will be given by the expression from the tire model, as $$F_{Yfr2} = \{(1+S_{fr})/S_{fr}\}(K_{\beta fr}/K_{Sfr})\tan \beta_{fr} \cdot F_{Xfr2} \quad (5.62)$$

Thus, $M_{fr2}$ may be expressed by $$M_{fr2} = \{(Tr/2)\cos\delta + L_f \sin\delta\} F_{Xfr2} + \{-(Tr/2)\sin\delta + L_f \cos\delta\} F_{Yfr2} \quad (5.63)$$

Then, $$F_{Xfr2} = \frac{M_{fr2}}{\left(\frac{Tr}{2}\cos\delta + L_f \sin\delta\right) + \left(-\frac{Tr}{2}\sin\delta + L_f \cos\delta\right)\frac{1+S_{fr}}{S_{fr}}\frac{K_\beta}{K_S}\tan\beta_{fr}} \quad (5.64)$$

If the composite force to be obtained is between points D and E, the target force will be given by the same expression as for a large $|\beta_{fr}|$.

Thus, the target force is given by $$F_{Xfr2} = \text{MAX}\left\{\frac{M_{fr2}}{\left(\frac{Tr}{2}\cos\delta + L_f\sin\delta\right) + \left(-\frac{Tr}{2}\sin\delta + L_f\cos\delta\right)\frac{1+S_{fr}}{S_{fr}}\frac{K_{\beta fr}}{K_{Sfr}}\tan\beta_{fr}}, \frac{\left(\frac{Tr}{2}\cos\delta + L_f\sin\delta\right)M_{fr2}}{\frac{Tr^2}{4} + L_f^2} - \frac{\left(-\frac{Tr}{2}\sin\delta + L_f\cos\delta\right)\sqrt{\left(\frac{Tr^2}{4} + L_f^2\right)\mu_{max\,fr}^2 F_{Zfr}^2 - M_{fr2}^2}}{\frac{Tr^2}{4} + L_f^2}\right\} \quad (5.65)$$

(b) Rear Inside Wheel

The target (critical) yaw moment $M_{rIG2}$ is expressed by $$M_{rIG2} = -(Tr/2)F_{Xrl2} - L_r(\mu_{max\,rl}^2 F_{Zrl}^2 - F_{Xrl2}^2)^{1/2} \quad (5.66)$$

Figure 16A:
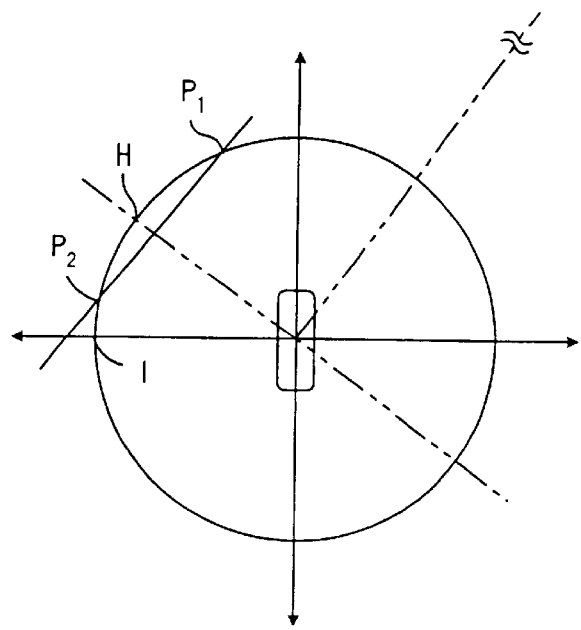
FIGS. 16A and 16B show frictional circles indicating how to determine, from target critical yaw moments, second target longitudinal forces for the rear inside (left) and outside (right) wheels, respectively, of a left turning vehicle in a spin avoiding process.

Thus, two results for the target force are given as $$F_{Xrl2} = \frac{-TrM_{rIG2} \pm L_r\sqrt{(Tr^2 + 4L_r^2)\mu_{max\,rl}^2 F_{Zrl}^2 - 4M_{rIG2}^2}}{2\left(\frac{Tr^2}{4} + L_r^2\right)}, \quad (5.67)$$

which are shown as P1 and P2 in FIG. 16A.

Thus, if the first target force $F_{Xrl1} \geq \mu_{max\,rl} F_{Zrl} \sin(\arctan((Tr/2)/L_r))$ (above point H), P1 (the result of + sign) is selected. Otherwise, i.e. $F_{Xrl1} < \mu_{max\,rl} F_{Zrl} \sin(\arctan((Tr/2)/L_r))$, P2 (the result of − sign) is selected.

(c) Rear Outside Wheel

The target (critical) yaw moment $M_{rrG2}$ is expressed by $$M_{rrG2} = (Tr/2)F_{Xrr2} - L_r(\mu_{max\,rr}^2 F_{Zrr}^2 - F_{Xrr2}^2)^{1/2}. \quad (5.68)$$

Figure 16B:
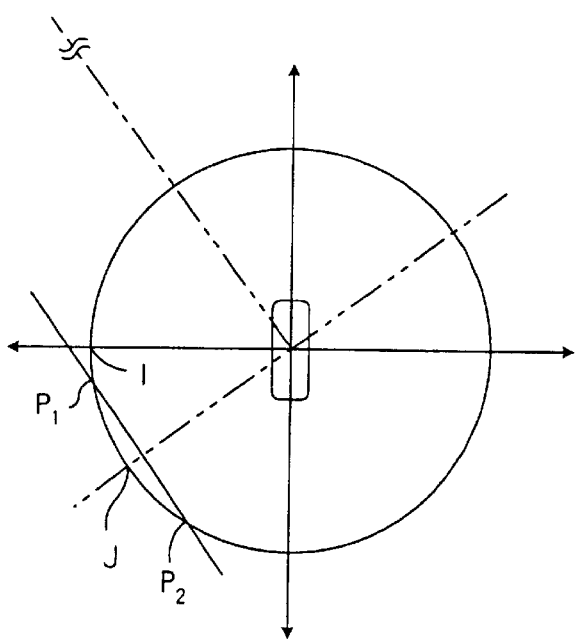

Thus, two results for the target force are given as:

$$F_{Xrr2} = \frac{TrM_{rrG2} \pm L_r\sqrt{(Tr^2 + 4L_r^2)\mu_{max\,rr}^2 F_{Zrr}^2 - 4M_{rrG2}^2}}{2\left(\frac{Tr^2}{4} + L_r^2\right)}, \quad (5.69)$$

which are shown as P1 and P2 in FIG. 16B.

Thus, if the first target force $F_{Xrr1} \geq -\mu_{max\,rr} F_{Zrr} \sin(\arctan(Tr/2L_r))$ (above point J), P1 (the result of + sign) is selected. Otherwise, i.e. $F_{Xrr1} < -\mu_{max\,rr} F_{Zrr} \sin(\arctan(Tr/2L_r))$, P2 (the result of − sign) is selected.

(d) Alternative Solution of Expression (5.63)

As for expression (5.63), a target force of the front outside wheel may be calculated as follows: Assuming that the differences between the present and target values of the longitudinal and lateral forces are small, the target values are approximately given by $$F_{Xfr2} = F_{Xfr} + (\partial F_{Xfr}/\partial S)\Delta S$$

$$F_{Yfr2} = F_{Yfr} + (\partial F_{Yfr}/\partial S)\Delta S,$$

where $\Delta S$ is a small difference of slip ratio. By eliminating $\Delta S$, the relation between the longitudinal and lateral forces is given by:

$$(F_{Xfr2} - F_{Xfr})\frac{\frac{\partial F_{Yfr}}{\partial S}}{\frac{\partial F_{Xfr}}{\partial S}} = F_{Yfr2} - F_{Yfr}.$$

Then, the target longitudinal force is given by $$F_{Xfr2} = \frac{M_{fr2} - \left(-\frac{Tr}{2}\sin\delta + L_f\cos\delta\right)(F_{Yfr} - F_{Xfr}XYS_{fr})}{\left(\frac{Tr}{2}\cos\delta + L_f\sin\delta\right) + \left(-\frac{Tr}{2}\sin\delta + L_f\cos\delta\right)XYS_{fr}}, \quad (5.70)$$

where $XYS_{fr} = \frac{\frac{\partial F_{Yfr}}{\partial S}}{\frac{\partial F_{Xfr}}{\partial S}}.$ Through the tire model in section I-2, the numerator and denominator in the above expression are given by $$\frac{\partial F_{Xfr}}{\partial S} = \frac{1}{\lambda}\left(1 - \frac{S_{fr}}{\lambda}\frac{\partial\lambda}{\partial S}\right)F_{Xfr},$$

$$\frac{\partial F_{Yfr}}{\partial S} = -\frac{K_{\beta fr}}{K_{Sfr}}\tan\beta_{fr}\cdot\frac{1}{\lambda}\left(1 - \frac{1+S_{fr}}{\lambda}\frac{\partial\lambda}{\partial S}\right)F_{Xfr}.$$

I-5-4 Calculations of Third Target Longitudinal Forces $F_{Xi3}$ (Target Forces for Suppressing and/or Avoiding Drift-Out Condition)

Upon detecting Drift condition, the first target force for each wheel $F_{Xi1}$ will be modulated to "Third" target force $F_{Xi3}$ for suppressing the drift condition. In a drift avoiding process, a lateral force on the vehicle should be assured for enabling the vehicle to turn along a curved course. Further, a stronger yaw moment should be generated in the same direction as the present yaw rate, thereby turning the head of the vehicle inwardly to the turning center of the curved course and recovering the turning performance of the vehicle. During left turning, this further required yaw moment should be produced by wheels in anti-clockwise direction.

As described in the section I-4, Drift condition is judged when the index value satisfies:

$$M_{fl}+M_{fr}+M_{rlG}+M_{rrG}-KI\beta d_r < -\Delta M_d, \quad (5.71)$$

where $$M_{fl}+M_{fr} > K_f(M_{flG}+M_{frG}). \quad (5.72)$$

If the yaw moment to be produced based upon the current first target forces $F_{Xi1}$ is smaller than $KI\beta d_r-\Delta M_d$, i.e.

$$M_{fl1}+M_{fr1}+M_{rlG1}+M_{rrG1}-KI\beta d_r < -\Delta M_d,$$

the modulation of $F_{Xi1}$ should be required for suppressing the drift condition and recovering the turning ability of the vehicle. Thus, for the suppression of this condition, a control yaw moment against drifting Mnd is generated by either of the wheels so as to establish $$(M_{flG}+M_{frG}+M_{rlG}+M_{rrG})+Mnd-KI\beta d_r-\Delta M_d \quad (5.73)$$

where $M_{fl}=M_{flG}$ and $M_{fr}=M_{frG}$ are assumed because the actual yaw moments $M_{fl}+M_{fr}$ is nearly equal to the critical yaw moments $M_{rlG}+M_{rrG}$ under the condition of expression (5.72). Mnd should be distributed to the wheels so as to satisfy:

$$M_{flG}+M_{frG}+M_{rlG}+M_{rrG}-KI\beta d_r \geq -\Delta M_d, \quad (5.74)$$

after a controlling process. Further, upon generating the control yaw moment Mnd, the lateral force on each wheel should be also increased, so that a target longitudinal force on each wheel should be set in between the normal running limits.

It should be also noted that the index value consists of "critical" yaw moments which can be generated by the wheels. Thus, the target values of all wheels should be calculated for the respective critical yaw moments.

In the process described here, first, a target critical yaw moment for each wheel is calculated based upon the concept described above. Then, Third target longitudinal force $F_{Xi3}$ for each wheel is obtained from the target critical yaw moment.

In the previous section, parameters used in this process have been introduced, except "Effective critical yaw moment against Drifting". Thus, in the followings, the effective critical yaw moment against Drifting for each wheel is introduced first. Then, the ways of determining a target critical yaw moment for each wheel are described. Finally, the way of converting the target yaw moments to the third target longitudinal forces $F_{Xi3}$.

(i) Calculation of Parameters

Effective Yaw Moments Against Drifting

Here, "Effective Critical Yaw Moment against Drifting" for each wheel is defined as the yaw moment largest in its magnitude in the direction of suppressing a drift condition, or most effective for satisfying expression (5.73). As described above, in expressions (5.73) and (5.74), all of yaw moments to be controlled are critical values $M_{iG}$. Thus, the effective critical yaw moments are defined here. As also described above, a target longitudinal force should be in the range of the normal running limits for assuring a lateral force enough to enable the vehicle to turn along a curved course. Thus, the effective critical yaw moment for each wheel is also defined such that the corresponding longitudinal force will be set in between the normal running limits.

For suppressing a drift condition, a yaw moment should be increased in anti-clockwise direction (or decreased in clockwise direction) during left turning, thus the effective critical yaw moment against drifting will be denoted by "$M_{iG\_}$max" in the following descriptions. The effective critical yaw moment defines an upper limit of the target yaw moment for each wheel, usable in distributing a control yaw moment Mnd to the wheels.

The effective critical yaw moment against drifting for each wheel is defined as follows:

(a) Front Inside (Left) Wheel

Figure 17A:
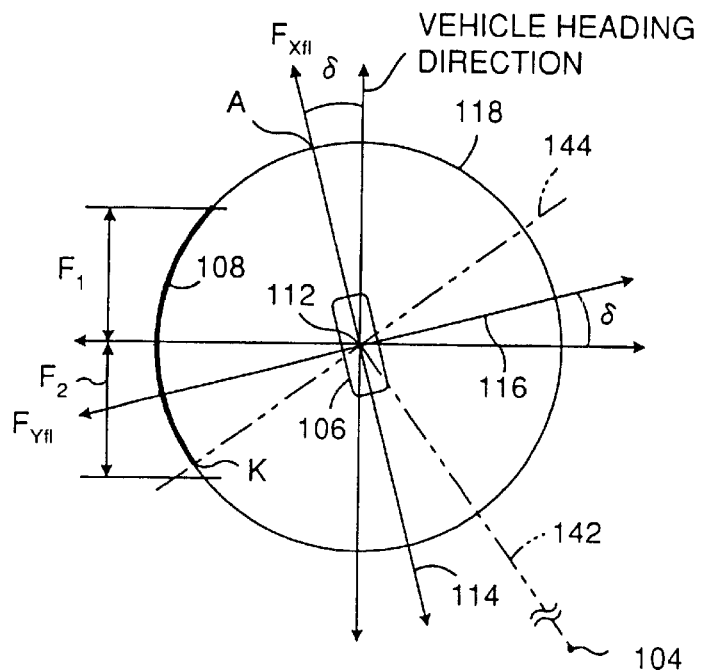
FIG. 17A shows a frictional circle indicating how to define an effective critical yaw moment of the front inside (left) wheel of a left turning vehicle for a drift avoiding process.

Referring to FIG. 17A, the largest critical yaw moment is obtained when a composite force is on point K, the direction of which is perpendicular to a moment arm 142 from the centroid 104 of the vehicle. The largest yaw moment, namely, the effective critical yaw moment is given by:

$$M_{flG\_}max=\mu_{max\,fl}F_{Zfl}L_f/\cos(\arctan((Tr/2)/L_f)). \quad (5.75)$$

However, if the driver commands to brake her/his vehicle, the reduction of the braking force (the increasing of $F_{Xfl}$) is not preferred. Thus, under the following conditions:

(1) $\delta<\arctan\{(Tr/2)/Lr\}$, and $F_{Xfl1}<-\mu_{maxfl}F_{Zfl}\sin(\arctan((Tr/2)/Lr)-\delta))$ [The steering angle is smaller than the angle between the moment arm from the centroid and the vehicle body heading direction, and the first target force $F_{Xfl1}$ is lower than the longitudinal force corresponding to point K.]; and (2) $\delta>\arctan\{(Tr/2)/Lr\}$, and $F_{Xfl1}<0$, [The steering angle is larger than the angle between the moment arm from the centroid and the vehicle body heading direction, and the first target force $F_{Xfl1}$ is higher than the longitudinal force corresponding to point K.],
the effective critical yaw moment is set out to the critical yaw moment at $F_{Xfl1}$:

$$M_{flG\_max} = \{-(Tr/2)\cos \delta + L_f \sin \delta\} \cdot F_{Xfl1} + \{(Tr/2)\sin \delta + L_f \cos \delta\} \cdot F_{YflG1} \quad (5.76)$$

where $F_{YflG1} = (\mu_{maxfl}^2 F_{zfl}^2 - F_{Xfl1}^2)^{1/2}$.

(b) Rear Inside (Left) Wheel

Figure 18A:
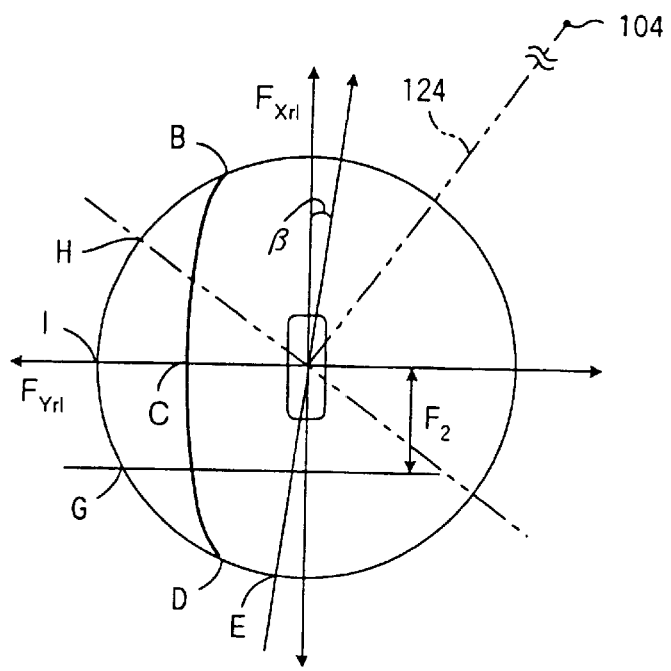
FIGS. 18A and 18B show frictional circles indicating how to define effective critical yaw moment of the rear inside (left) and outside (right) wheels, respectively, of a left turning vehicle for a drift avoiding process.

Referring to FIG. 18A, the largest "critical" yaw moment (smallest in the anti-clockwise direction) is obtained by the composite force vector on point B or D. Thus, the effective critical yaw moment is set out as:

For $F_{Xrl1} > \mu_{max\ rl} F_{Zrl} \sin(\arctan(Tr/(2Lr)))$, $$M_{rlG\_max} = -(Tr/2)F_{XBrl} - L_r(\mu_{max\ rl}^2 F_{Zrl}^2 - F_{XBrl}^2)^{1/2}, \quad (5.77)$$

where the driving force is increased to point B; and

For $F_{Xrl1} \leq \mu_{max\ rl} F_{Zrl} \sin(\arctan(Tr/(2Lr)))$, $$M_{rlG\_max} = -(Tr/2)MIN(F_{XDrl}, -K_{FXrl}\mu_{max\ rl}F_{Zrl}) - L_r(\mu_{max\ rl}^2 F_{Zrl}^2 - MIN(F_{XDrl}, -K_{FXrl}\mu_{max\ rl}F_{Zrl})^2)^{1/2} \quad (5.78)$$

where the braking force is increased to point D.

In the above expressions, $\arctan(Tr/(2Lr))$ is the angle between the moment arm 124 [from the centroid] and the vehicle body heading direction.

(c) Rear Outside (Right) Wheel

Figure 18B:
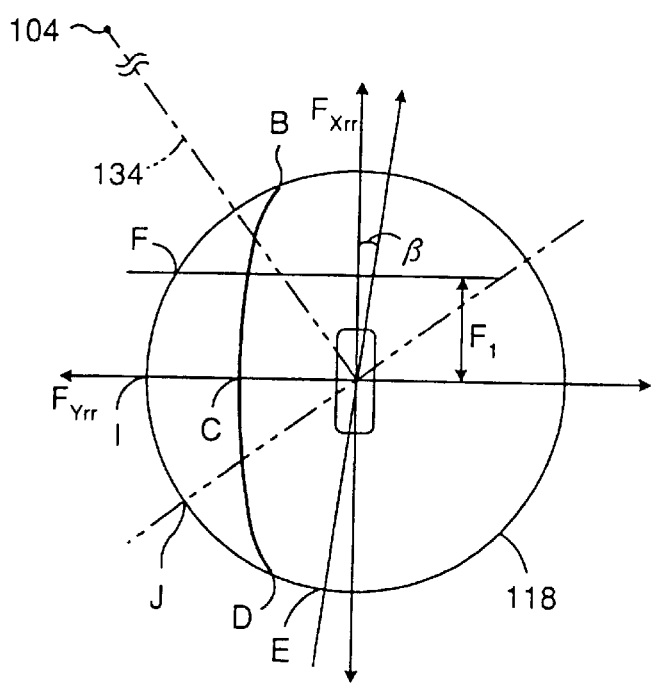

Referring to FIG. 18B, above point J, the largest available "critical" yaw moment is given on point B. However, if the vehicle is braked, the addition of a driving force should be avoided. On the other hand, below point J, the largest available critical yaw moment is given on point D. Thus, the effective critical yaw moment is set out as follows:

For $F_{Xrr1} > -\mu_{max\ rr} F_{Zrr} \sin(\arctan(Tr/(2Lr)))$ [above point J]:
During braking, $$M_{rrG\_max} = -\mu_{maxrr} F_{Zrr} Lr \quad (5.79)$$

[corresponding to point I];
During non-braking, $$M_{rrG\_max} = (Tr/2)MAX(F_{XBrr}, K_{FXrl}\mu_{max\ rr}F_{Zrr}) - L_r(\mu_{max\ rr}^2 F_{Zrr}^2 - MAX(F_{XBrr}, K_{FXrl}\mu_{max\ rr}F_{Zrr})^2)^{1/2}. \quad (5.80)$$

[corresponding to point B or the upper normal running limit.];

For $F_{Xrr1} \leq -\mu_{max\ rr} F_{Zrr} \sin(\arctan(Tr/(2Lr)))$ [below point J], $$M_{rrG\_max} = (Tr/2)F_{XDrr} - L_r(\mu_{max\ rr}^2 F_{Zrr}^2 - F_{XDrr}^2)^{1/2}. \quad (5.81)$$

(d) Front Outside (Right) Wheel

Figure 17B:
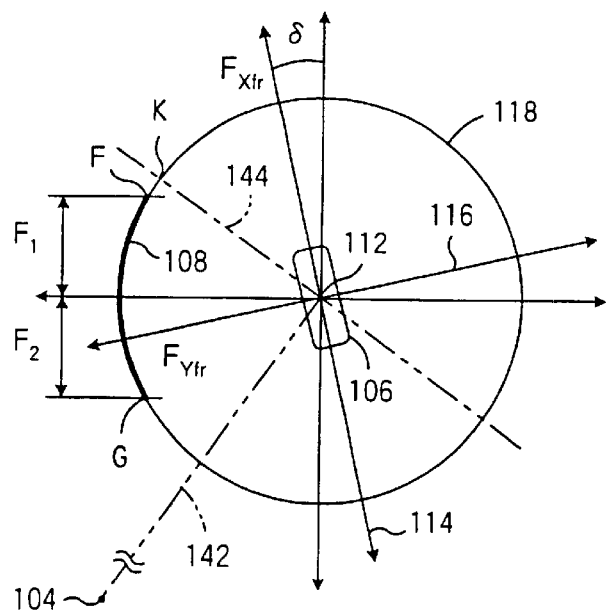
FIG. 17B shows a frictional circle indicating that the front outside (right) wheel is not useful for a drift avoiding process.

Referring to FIG. 17B, the largest yaw moment is available on point K where a composite force Fxy is perpendicular to the corresponding moment arm. However, the point K is close to or exceeds the upper normal running limit as seen from FIG. 17B. Thus, for adjusting the force vector to the point K, the longitudinal force Fx must be increased, which is not preferred because the lateral force $F_Y$ is reduced. Thus, no control against drift conditions is done on this wheel.

(ii) Determination of a Target Yaw Moment for Each Wheel

As in the case of the spin avoiding process, an appropriate way of distributing a control yaw moment Mnd depends upon a drive type and a present condition of a vehicle. A control yaw moment Mnd may be born by three wheels, i.e. front-left, rear-left, -right wheels, or by one or two rear wheels. General expressions for distributing Mnd are as follows:

A total yaw moment of the vehicle should be set out as:

$$(M_{fl} + M_{fr} + M_{rlG} + M_{rrG}) + Mns = -\Delta Ms + Kl\beta d_r \quad (5.82)$$

$$= M_{flG1} + M_{frG1} +$$
$$M_{rlG1} + M_{rrG1} +$$
$$K_{ld}\{(M_{flG\_max} - M_{flG1}) +$$
$$(M_{rlG\_max} - M_{rlG1}) +$$
$$(M_{rrG\_max} - M_{rrG1})\}.$$

Then, since a factor $K_{ld}$ is expressed by $$K_{ld} = \frac{-\Delta M_d + Kl\beta d_r - (M_{flG1} + M_{frG1} + M_{rlG1} + M_{rrG1})}{(M_{flG\_max} - M_{flG1}) + (M_{rlG\_max} - M_{rlG1}) + (M_{rrG\_max} - M_{rrG1})}, \quad (5.82a)$$

a target moments for each wheel may be set out as:

$$M_{flG3} = (1-K_{ld})M_{flG1} + K_{ld}M_{flG\_max}$$
$$M_{rlG3} = (1-K_{ld})M_{rlG1} + K_{ld}M_{rlG\_max}$$
$$M_{rrG3} = (1-K_{ld})M_{rrG1} + K_{ld}M_{rrG\_max}. \quad (5.83)$$

In the above expressions, the yaw moment Mnd is distributed to each wheel at a ratio proportional to the corresponding further available critical yaw moment (the difference from the effective to the first target critical yaw moments). Hereinbelow, the ways of distributing Mnd for individual cases are detailed.

(a) Distributing to Three Wheels: During Braking

The longitudinal force on each wheel is limited to the braking side (the lower quadrant) in each friction circle for assuring to acquire a braking force in the vehicle. Thus, referring to FIGS. 17A, 18A and 18B, the forces Fxi on the front and rear inside wheel should be decreased (braking forces are to be increased).

As for the front inside wheel, however, under the conditions:

(1) $\delta < \arctan\{Tr/(2Lr)\}$, and $F_{Xfl1} < -\mu_{maxfl} F_{Zfl} \sin(\arctan(Tr/(2Lr)-\delta))$ or (2) $\delta > \arctan\{Tr/(2Lr)\}$, and $F_{Xfl1} < 0$, the critical yaw moment $M_{flG1}$ for $F_{Xfl1}$ is directly used as $M_{flG\_max}$ in the general expressions (5.82–83), as described in the sub-section (i) [The term ($M_{flG\_max} - M_{flG1}$) is cancelled].

The rear outside wheel should be decreased or increased depending upon the magnitude of $F_{Xrr1}$ relative to $F_{Xrr}$ on point J. Thus, under the condition of $F_{Xrr1} > -\mu_{maxrr} F_{Zrr} \sin(\arctan(Tr/(2Lr)))$ [above point J], $$MrrG\_max = M_{rrG0} = -\mu_{maxrr} F_{Zrr} Lr.$$

Otherwise, expression (5.81) is applied.

(b) Distributing to Three Wheels: During Non-Braking
In a Rear Wheel Drive Vehicle and a Four-Wheel Drive Vehicle In order to increase a yaw moment producible by each wheel, the forces Fxi on the front inside wheel and rear outside should be decreased and increased, respectively. The direction of modulation of the force on the rear inside wheel $F_{Xrl1}$ is dependent upon the magnitude of the first target force relative to that of point H (see FIG. 18A): The force on the rear inside wheel should be increased toward point B if $F_{Xrl1} > \mu_{max\ rl} F_{Zrl} \sin(\arctan(Tr/(2Lr)))$, and decreased toward point D if $F_{Xrl1} \leq \mu_{max\ rl} F_{Zrl} \sin(\arctan(Tr/(2Lr)))$. In the former case, the rear wheels seem to be accelerated. However, since the slip angle of the rear wheel is increased through the drift avoiding process described here, $F_{Xrl1}$ and $F_{Xrr1}$ are reduced (because point B moves downwardly), and simultaneously, the lateral forces on the wheels are increased, preventing the acceleration of the vehicle. $M_{iG\_}$max to be used in the general expressions for each case has been defined in the previous sub section (i).

In a Front Wheel Drive Vehicle

Only the front and rear inside wheels are used, where the forces Fxi should be reduced. The rear outside wheel is a non-driven wheel, which can not provide a driving force. Thus, its target yaw moment $M_{rrG1}$ is not modulated. In the general expressions, the term $(M_{rrG}\_max-M_{rrG1})$ is cancelled.

In the above cases (a) and (b), the reduction of the longitudinal force of the front inside wheel seems to lead the reduction of the corresponding lateral force, resulting in the deterioration of the turning ability of the vehicle. However, the increase of the turning yaw moment will increase the slip angles on the rear wheel, increasing the lateral force (in magnitude) on the rear wheel.

(c) Generating Mnd Only by the Rear Left Wheel

As described above, in the drift avoiding process, a target critical yaw moment is set out so as to satisfy:

$$(M_{flG}+M_{frG}+M_{rlG}+M_{rrG})+Mnd-KI\beta d_r=-\Delta M_d$$

where $-KI\beta d_r$ may be omitted.

During braking, the control yaw moment Mnd may be generated only by the rear inside wheel if $$M_{rlG}\_max \geq M_{rlG}+Mnd.$$

i.e. $M_{rlG}\_max \geq -\Delta M_d-(M_{flG}+M_{frG}+M_{rrG})$.

Thus, the target critical yaw moment for the rear inside wheel may be set out as:

$$M_{rlG3}=MIN(M_{rlG}\_max, -\Delta M_d-(M_{flG}+M_{frG}+M_{rrG})) \quad (5.84).$$

In a front wheel drive vehicle, the above process is also applicable during non-braking.

(d) Generating Mnd by Rear Wheels

In rear-wheel and four-wheel drive vehicles during non-braking, the control yaw moment Mnd may be generated only by the pair of rear wheels. The modulation of the target yaw moment, i.e. the way of distributing the control yaw moment to the wheels is dependent upon the magnitudes of the current slip angles $|\beta i|$, i.e. whether or not the road reaction forces on each wheel is saturated. Whether a slip angle $|\beta i|$ is large or small is judged as described in Section I-3 with respect to the determination of normal running limits. No modulation process will be done if the lateral forces on both of the wheels have reached to the respective critical frictional circles. If only the force on the outside wheel is saturated, the method described above in (c) will be applied. If the inside wheel is saturated, the modulation will not be done because the outside wheel must be accelerated upon generating yaw moment in the direction of suppressing a drift condition.

The way of modulating the target yaw moment when neither of forces on the wheels is saturated is as follows:

Under a condition that, on both of the rear wheel, road reaction forces are not saturated on both of the rear wheels, i.e. $F_{XDrl} < -K_{FXr}\mu_{max\ rl} F_{Zrl}$ and $K_{FXr}\mu_{max\ rl} F_{Zrl} < F_{XDrr}$ (see FIG. 11A), the rear inside and outside wheels should be provided with a braking and driving forces, respectively, without increasing the acceleration of the vehicle body. Thus, the increase (variation amount) of the braking force on the inside wheel should be larger than that of the driving force on the outside wheel. To do this, the target critical yaw moment is modulated so as to satisfy: $M_{rlG3}-M_{rlG1} \geq M_{rrG3}-M_{rrG1}$, i.e. the modulation amount in the inside wheel is larger than that in the outside wheel, thereby preventing the increase of the total longitudinal force of the vehicle body approximately.

If $M_{rlG}\_max-M_{rlG1} \geq M_{rrG}\_max-M_{rrG1}$, the effective critical yaw moment provided previously may be fully used. Thus, the modulated target yaw moments $M_{rlG3}$ and $M_{rrG3}$ are given by the general expressions (5.82–83), in which $M_{flG}\_max$ should be set out as: $M_{flG}\_max=M_{flG1}$, because, here, no modulation is intended for the front wheel.

If $M_{rlG}\_max-M_{rlG1} < M_{rrG}\_max-M_{rrG1}$, the modulated target yaw moments should satisfy: $M_{rlG3}-M_{rlG1}=M_{rrG3}-M_{rrG1}$. Since $M_{rlG3}$ and $M_{rrG3}$ are also expressed by:

$$(M_{fl}+M_{fr}+M_{rlG}+M_{rrG})+Mnd = M_{flG1}+M_{frG1}+M_{rlG3}+M_{rrG3}$$
$$-\Delta M_d+KI\beta d_r,$$

$M_{rlG3}$ and $M_{rrG3}$ are given by:

$$M_{rlG3}=\tfrac{1}{2}(-\Delta M_d+KI\beta d_r+M_{flG1}+M_{frG1}+M_{rlG1}-M_{rrG1})$$

$$M_{rrG3}=\tfrac{1}{2}(-\Delta M_d+KI\beta d_r+M_{flG1}+M_{frG1}-M_{rlG1}+M_{rrG1}).$$

The drift avoiding process is possible under a condtion: $M_{rlG3} \leq M_{rlG}\_max$. Thus, $$M_{rlG3} \rightarrow MIN(M_{rlG3}, M_{rlG}\_max)$$

$$M_{rrG3} \rightarrow MIN(M_{rrG3}, M_{rlG}\_max). \quad (5.85).$$

(e) Lateral Forces During Drift Avoiding Process

In order to suppress or avoid the drifting of a vehicle, the lateral force generated on each wheel should be enough to turn the vehicle along a curved course. Here, the lateral forces during the drift avoiding process are investigated.

Front Wheels

Figure 19:
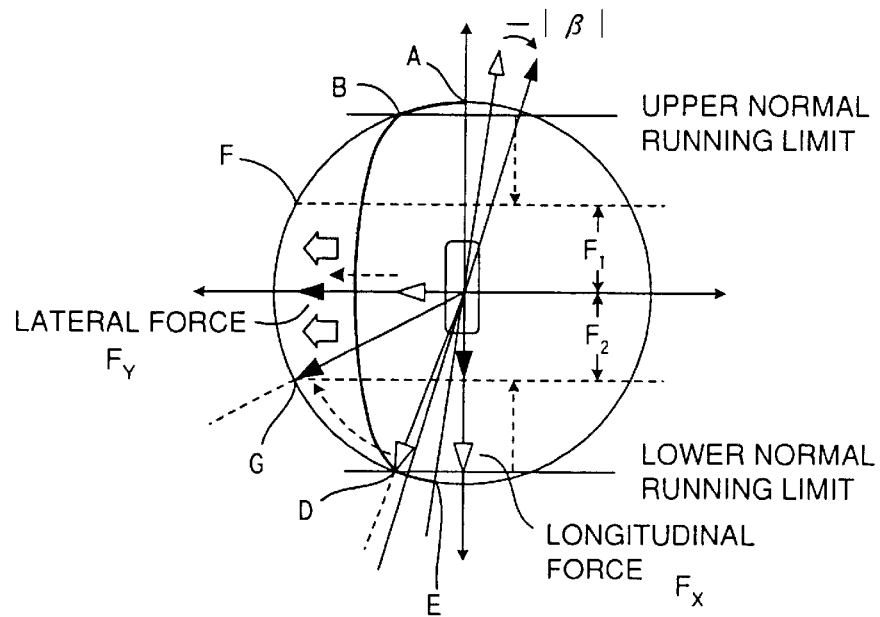
FIG. 19 shows a frictional circle indicating that a lateral force on the front wheel increases during a drift avoiding process.

During braking, a longitudinal force vector $F_X$ in the tire model shown in FIG. 19 (a white arrows) is directed downwardly, and prevented from extending beyond the lower normal running limit in the present invention. Thus, a lateral force is always stronger than that corresponding to the lower normal running limit. Through the drift avoiding process, since the increased turning yaw moment increases the slip angle of the vehicle and its wheels, the normal running limit automatically moves toward the tire center until the limit reaches to point G defined by the width $F_2$ from the tire center (as shown by arrows of dotted line.), whereby the lateral force corresponding to the limit is increased. The lateral force corresponding to point G is the almost maximum producible by the tire.

During non-braking, in a front wheel drive vehicle and a four wheel drive vehicle, similarly, the longitudinal force vector is limited at the upper normal running limit so that a lateral force is increased as the upper normal running limit moves downwardly because of the increase of the corresponding slip angle by the increased turning yaw moment. As for a rear wheel drive vehicle, the longitudinal forces on the front wheels are null so that the corresponding lateral forces are increased as the slip angles increased by the increased turning yaw moment during the drift avoiding process.

Thus, the lateral force for suppressing the drift tendency is obtained by the increase of the slip angle through the increased turning yaw moment and by limiting the longitudinal force within the normal running limits.

Rear Wheel

Figure 20:
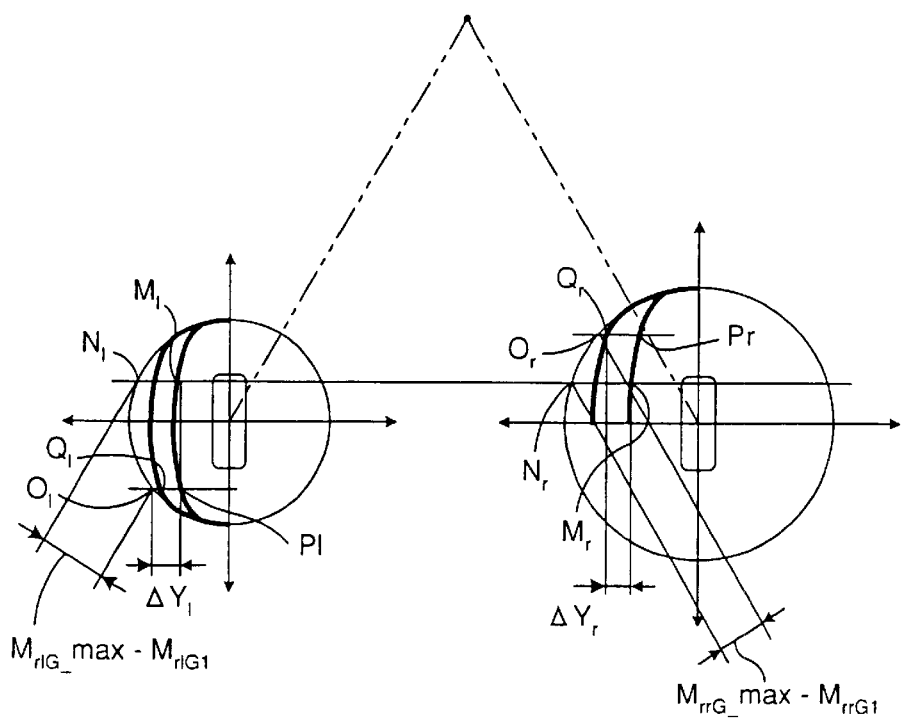
FIG. 20 shows frictional circles of the rear wheels indicating that the lateral forces on the rear wheels increase during a drift avoiding process.

FIG. 20 shows the frictional circles of the tire model for the rear wheels in the rear wheel drive vehicle during non-braking. Before the drift avoiding process, the actual road reaction force vector on each of the wheels is assumed to be directed to each of points $M_l$ and Mr, and thus, force vectors generating the corresponding critical yaw moments $M_{rlG}$ and $M_{rrG}$ will be on points $N_l$ and $N_r$. In the drift avoiding process, the critical yaw moments are targeted from points $N_l$ and $N_r$ to points $O_l$ and $O_r$ by applying braking and driving forces to the inside and outside wheels, and then the actual force vectors on the left and right wheels move to $P_l$ and $P_r$, respectively.

Subsequently, the turning yaw moment is generated, whereby, together with the slip angle for each wheel $|\beta i|$, the actual frictional circle (bold line) on each wheel moves toward the corresponding critical frictional circle. Thus, the actual force vectors move from $P_l$ and $P_r$ to $Q_l$ and $Q_r$, respectively, resulting in the increase of the lateral forces $\Delta Yl + \Delta Yr$ in total. In the above, the increase of the lateral forces on the rear wheels is also realized by the yaw moment generated by the front wheels.

Thus, in spite of the addition or elimination of the longitudinal forces, the lateral forces are substantially increased because of the increase in the magnitude of the slip angles.

(iii) Calculation of Third Target Longitudinal Forces

Using the tire model described in the section I-2, the target critical yaw moments $M_{flG3}$, $M_{rlG3}$ and $M_{rrG3}$, obtained in the above, are converted to the respective longitudinal forces, namely, Third target longitudinal forces $F_{Xi3}$. Parameters required for the following calculations are obtained in the region (A).

(a) Front Inside Wheels

The target (critical) yaw moment $M_{flG3}$ is expressed by:

$$M_{flG3} = \{-(Tr/2)\cos\delta + L_f \sin\delta\} \cdot F_{Xfl3} + \{(Tr/2)\sin\delta + L_f \cos\delta\} \cdot F_{YflG3}$$

where $$F_{YflG3} = (\mu_{maxfl}^2 F_{zfl}^2 - F_{Xfl3}^2)^{1/2} \quad (5.87)$$

Figure 21A:
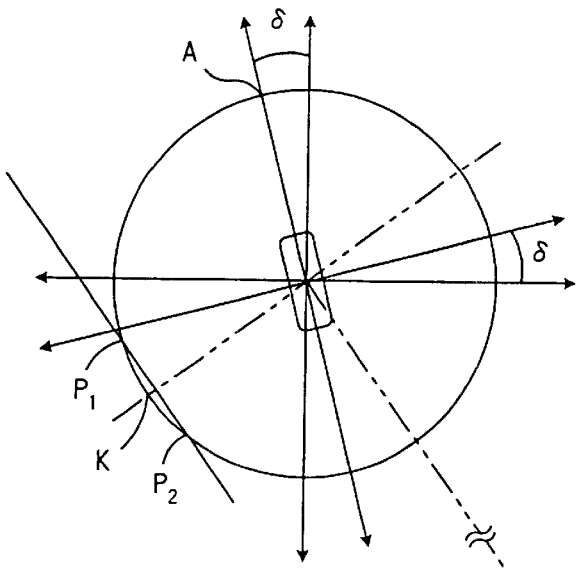
FIGS. 21A–C show frictional circles indicating how to determine, from target critical yaw moments, Third target longitudinal forces for the front inside (left), rear inside (left) and outside (right) wheels, respectively, of a left turning vehicle in a drift avoiding process.

Thus, two results for the target force are given as:

$$F_{XflG3} = \frac{\left(-\frac{Tr}{2}\cos\delta + L_f \sin\delta\right) M_{flG3}}{\frac{Tr^2}{4} + L_f^2} \pm \quad (5.88)$$

$$\frac{\left(\frac{Tr}{2}\sin\delta + L_f\cos\delta\right)\sqrt{\left(\frac{Tr^2}{4}+L_f^2\right)\mu_{max\,fl}^2 F_{Zfl}^2 - M_{flG3}^2}}{\frac{Tr^2}{4} + L_f^2},$$

which are shown as P1 and P2 in FIG. 21A.

If the first target force $$F_{Xfl1} > -\mu_{max\,fl} F_{Zfl} \sin(\arctan(Tr/2L_f)-\delta) \text{ [above point K]},$$

P1 (the result of + sign) is selected.

Otherwise, i.e. $F_{Xfl1} \leq -\mu_{max\,fl} F_{Zfl} \sin(\arctan(Tr/2L_f)-\delta)$. $F_{Xfl3}$ is not modulated, i.e. $F_{Xfl3} = F_{Xfl1}$.

(b) Rear Inside (Left) Wheel

The target (critical) yaw moment $M_{rlG2}$ is expressed by:

$$M_{rlG3} = -(Tr/2)F_{Xrl3} - L_r(\mu_{max\,rl}^2 F_{Zrl}^2 - F_{Xrl3}^2)^{1/2}. \quad (5.89)$$

Figure 21B:
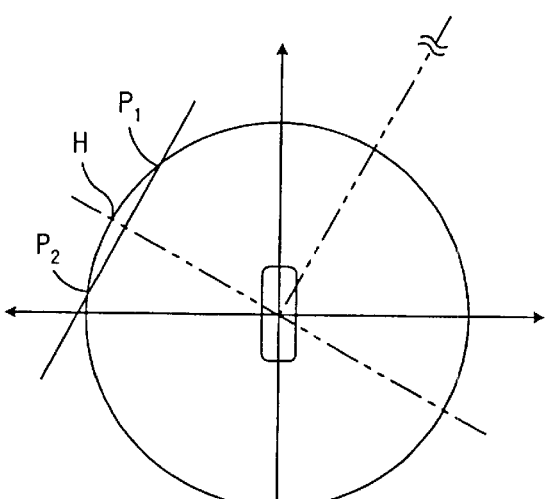

Thus, two results for the target force are given as:

$$F_{Xrl3} = \frac{-TrM_{rlG3} \pm L_r\sqrt{(Tr^2 + 4L_r^2)\mu_{max\,rl}^2 F_{Zrl}^2 - 4M_{rlG3}^2}}{2\left(\frac{Tr^2}{4}+L_r^2\right)}, \quad (5.90)$$

which are shown as P1 and P2 in FIG. 21B.

If the first target force $$F_{Xrl1} \geq \mu_{max\,rl} F_{Zrl} \sin(\arctan(Tr/2L_r)) \text{ [above to point H]},$$

P1 (the result of + sign) is selected.

Otherwise, i.e. $F_{Xrl1} < \mu_{max\,rl} F_{Zrl} \sin(\arctan(Tr/2L_r))$, P2 (the result of − sign) is selected.

(c) Rear Outside (Right) Wheel

The target (critical) yaw moment $M_{rrG3}$ is expressed by:

$$M_{rrG3} = (Tr/2)F_{Xrr3} - L_r(\mu_{max\,rr}^2 F_{Zrr}^2 - F_{Xrr3}^2)^{1/2}. \quad (5.91)$$

Figure 21C:
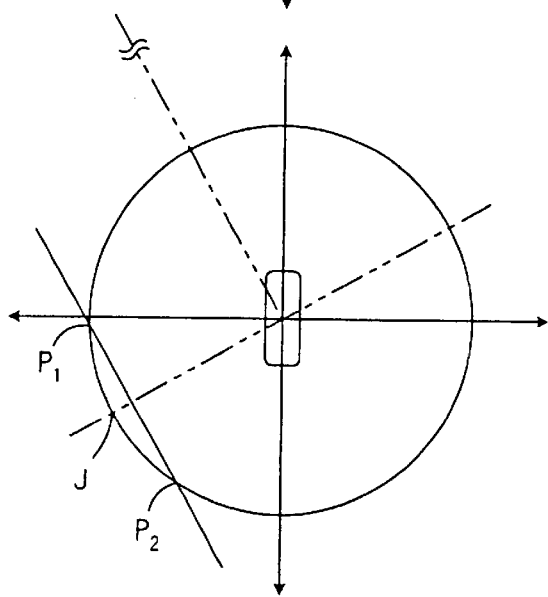

Thus, two results for the target force are given as:

$$F_{Xrr3} = \frac{TrM_{rrG3} \pm L_r\sqrt{(Tr^2 + 4L_r^2)\mu_{max\,rr}^2 F_{Zrr}^2 - 4M_{rrG3}^2}}{2\left(\frac{Tr^2}{4}+L_r^2\right)}, \quad (5.92)$$

which are shown as P1 and P2 in FIG. 21C.

If the first target force $$F_{Xrr1} \geq -\mu_{max\,rr} F_{Zrr} \sin(\arctan(Tr/2L_r)) \text{ [above to point J]},$$

P1 (the result of + sign) is selected.

Otherwise, i.e. $F_{Xrr1} < -\mu_{max\,rr} F_{Zrr} \sin(\arctan(Tr/2L_r))$, P2 (the result of − sign) is selected.

I-5-5 Selection of Target Longitudinal Forces Fti for Each Wheel

It is possible, in actual calculations described above, that the resultant second or third target longitudinal forces $F_{xi2}$ and $F_{xi3}$ are less effective in avoiding abnormal conditions, due to calculation error, etc. in comparison with the corresponding first target forces. Thus, a force finally applied to each wheel, Ftxi, may be selected from the first, second and third target longitudinal forces $F_{xi1}$, $F_{xi2}$ and $F_{xi3}$, respectively, as follows:

Front left wheel

| | | |
|---|---|---|
| Under drift condition | $Ft_{Xfl}$ = MIN ($F_{Xfl1}$, $F_{Xfl3}$) | (5.93) |
| Otherwise | $Ft_{Xfl}$ = $F_{Xfl1}$ | |

Front right wheel

| | | |
|---|---|---|
| Under Spin condition | $Ft_{Xfr}$ = MIN ($F_{Xfr1}$, $F_{Xfr2}$) | (5.94) |
| Otherwise | $Ft_{Xfr}$ = $F_{Xfr1}$ | |

Rear left wheel
When $F_{Xrl1} \geq \mu_{max\,rl\,FZrl} \sin(\arctan(Tr/2L_r))$,

| | | |
|---|---|---|
| Under Spin condition | $Ft_{Xrl}$ = MIN ($F_{Xrl1}$, $F_{Xrl2}$) | (5.95) |
| Under Drift condition | $Ft_{Xrl}$ = MAX ($F_{Xrl1}$, $F_{Xrl3}$) | |
| Otherwise | $Ft_{Xrl}$ = $F_{Xrl1}$ | |

-continued

When $F_{Xrl1} < \mu_{max\ rl} F_{Zrl} \sin(\arctan(Tr/2L_r))$,

| | | |
|---|---|---|
| Under Spin condition | $Ft_{Xrl} = MAX(F_{Xrl1}, F_{Xrl2})$ | (5.96) |
| Under Drift condition | $Ft_{Xrl} = MIN(F_{Xrl1}, F_{Xrl3})$ | |
| Otherwise | $Ft_{Xrl} = F_{Xrl1}$ | |

Rear right wheel

When $F_{Xrr1} \geq -\mu_{max\ rr} F_{Zrr} \sin(\arctan(Tr/2L_r))$,

| | | |
|---|---|---|
| Under Spin condition | $Ft_{Xrr} = MIN(F_{Xrr1}, F_{Xrr2})$ | (5.97) |
| Under Drift condition | $Ft_{Xrr} = MAX(F_{Xrr1}, F_{Xrr3})$ | |
| Otherwise | $Ft_{Xrr} = F_{Xrr1}$ | |

When $F_{Xrr1} < -\mu_{max\ rr} F_{Zrr} \sin(\arctan(Tr/2L_r))$,

| | | |
|---|---|---|
| Under Spin condition | $Ft_{Xrr} = MAX(F_{Xrr1}, F_{Xrr2})$ | (5.98) |
| Under Drift condition | $Ft_{Xrr} = MIN(F_{Xrr1}, F_{Xrr3})$ | |
| Otherwise | $Ft_{Xrr} = F_{Xrr1}$ | |

I-5-6 Conversion of Target Longitudinal Forces to Brake Pressures and Throttle Opening Actual longitudinal force on each wheel may be adjusted to the corresponding target longitudinal forces through (i) braking pressures or (ii) a combination of braking pressures and throttle opening of an engine. Here, the ways of converting the target values to the corresponding brake pressures and/or throttle opening are disclosed.

(i) When Only Braking Pressures Are Controlled Without Modulating the Driving Force D Commanded by the Driver From expressions (3.1) in section I-3, a target braking force Bti for each wheel is given by:

$$Bt_{fl} = Ft_{Xfl} - \frac{a}{2(1+a)}D + \left\{\frac{1}{2}\frac{a}{(1+a)}I_e + \frac{1}{2}I_{Df} + I_{wf}\right\}\frac{G_x}{r^2} \quad (5.99)$$

$$Bt_{fr} = Ft_{Xfr} - \frac{a}{2(1+a)}D + \left\{\frac{1}{2}\frac{a}{(1+a)}I_e + \frac{1}{2}I_{Df} + I_{wf}\right\}\frac{G_x}{r^2}$$

$$Bt_{rl} = Ft_{Xrl} - \frac{1}{2(1+a)}D + \left\{\frac{1}{2}\frac{1}{(1+a)}I_e + \frac{1}{2}I_{Dr} + I_{wr}\right\}\frac{G_x}{r^2}$$

$$Bt_{rr} = Ft_{Xrr} - \frac{1}{2(1+a)}D + \left\{\frac{1}{2}\frac{1}{(1+a)}I_e + \frac{1}{2}I_{Dr} + I_{wr}\right\}\frac{G_x}{r^2},$$

where for a rear wheel drive vehicle, a=0; $I_{DF}=0$; $I_{DR}=0$; and for a front wheel drive vehicle, 1/a=0; $I_{DF}=0$; $I_{DR}=0$.

In the above expressions, wheel accelerations VWdi are assumed to be approximately identical to the longitudinal acceleration Gx, i.e. VWdi≈Gx. The driving force D may be obtained from expression (3.4) or (5.1b). The former is preferable because it is possible that the value of expression (5.1b) is too far from the driving force generated currently on wheels. The resultant target braking forces are then converted to brake pressures through expression (3.2).

(ii) When the Driving Force Provided From the Engine is Controlled as Well as the Braking Pressures Here, a throttle opening is controlled so as to limit the driving force D (namely, an engine output) to the amount required for producing the maximum longitudinal force on the wheels.

(a) Estimation of Throttle Opening vs. Engine Torque

A rotation speed at a transmission output $N_T$ is given by:

$$N_T = (VW/2\pi r)\rho$$

where $\rho$ is a differential reduction gear ratio; r is a tire effective radius; VW is a wheel speed (e.g. the mean of wheel speeds of driven wheels). Then, a transmission gear ratio $R_T$ is given by:

$$R_T = ((VW/2\pi r)\rho)/N_E,$$

where $N_E$ denotes an engine rotation speed. The engine output torque $T_0$ for fully closed throttle (allowing for a transmission efficiency) is expressed as:

$$T_0 = K_0(N_E - N_0) \text{ for } N_E > N_0,$$

where $N_0$ is an idling rotation speed.

Referring to a present driving force $D_0$ obtained from road reaction forces, the current engine output torque, at the present throttle opening $Q_0$, is expressed as:

$$\frac{D_0 \cdot r \cdot \frac{VW}{2\pi r}\rho}{\rho N_E} = \frac{D_0 VW}{2\pi N_E}.$$

Thus, torque T is approximately expressed as a function of throttle opening Q by:

$$T = \frac{\frac{D_0 VW}{2\pi N_E} - T_0}{Q_0}Q + T_0. \quad (5.100)$$

Figure 22:
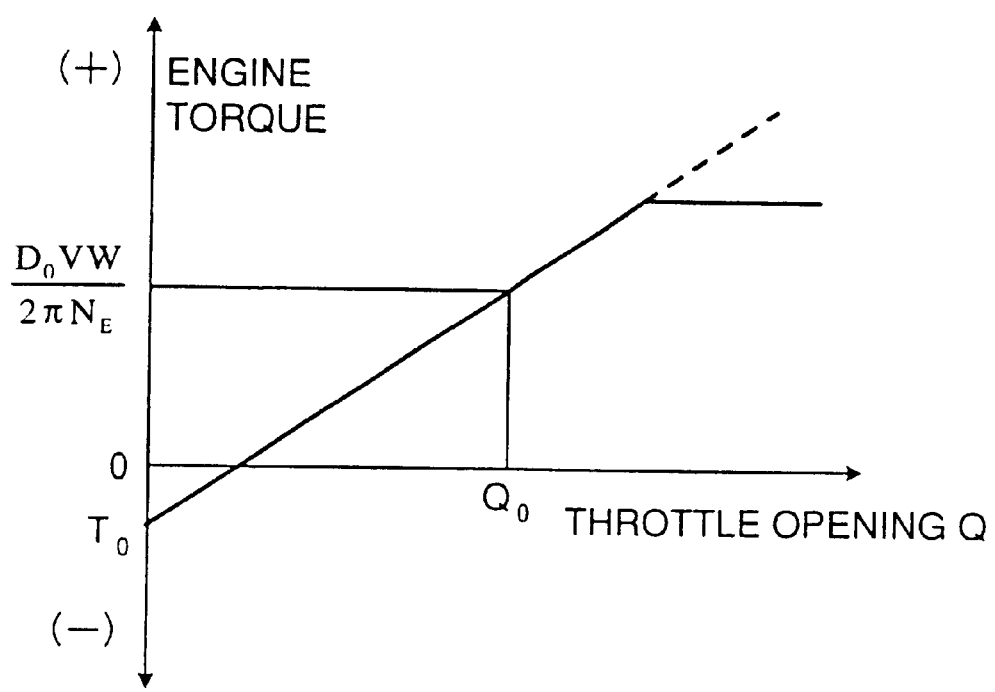
FIG. 22 is a graph of the relation of an engine torque vs. a throttle opening.

(see FIG. 22).

(b) Target Driving Force $D_T$ and Target Throttle Opening Qt

Target driving force $D_T$ is determined such that the driving forces for front and rear wheels, $$D_f = \{a/(2(1+a))\}D \text{ and}$$

$$D_r = \{1/(2(1+a))\}D$$

do not largely exceed the upper limits of target longitudinal forces on the front left and right wheels and rear left and right wheels, respectively. The upper limits of the longitudinal forces is given by:

$$MAX\{F_{XBfl}, \mu_{max\ fl} F_{Zfl} \sin(\arcsin K_{FXf} + |\delta|)\}$$

$$MAX\{F_{XBfr}, \mu_{max\ fr} F_{Zfr} \sin(\arcsin K_{FXf} + |\delta|)\}$$

$$MAX(F_{XBrl}, \mu_{max\ rl} F_{Zrl} \sin(\arctan(Tr/2Lr))$$

$$MAX(F_{XBrr}, K_{FXr}\mu_{max\ rr} F_{Zrr}). \quad (5.101)$$

Thus, the driving forces for the front and rear wheels should be set out as $$\frac{a}{2(1+a)}D_f = MAX[MAX\{F_{XBfl}, \mu_{max\ fl}F_{Zfl}\sin(arsinK_{FXf} + |\delta|)\}, \quad (5.102)$$

$$MAX\{F_{XBfr}, \mu_{max\ fr}F_{Zfr}\sin(arcsinK_{FXf} + |\delta|)\}] + \Delta D$$

$$\frac{1}{2(1+a)}D_r = MAX\left[MAX\left\{F_{XBrl}, \mu_{max\ rl}F_{Zrl}\sin\left(\arcsin\frac{Tr}{2L_r}\right)\right\},\right.$$

$$\left. MAX\{F_{XBrr}, K_{FXr}\mu_{max\ rr}F_{Zrr}\}\right] + \Delta D,$$

where $\Delta D$ is a positive constant that prevents the front and rear wheel driving forces from falling below the upper limits of the corresponding longitudinal forces.

Then, defining $D_G = MAX(Df, Dr)$, the target driving force $D_T$ is set out as:

$$D_T = D_G \text{ if } D \geq D_G,$$

$$D_T = D \text{ if } D < D_G \text{ (No control of D will be done.)} \quad (5.103).$$

And the target throttle opening $Q_T$ is set out by $$Qt = \frac{\frac{D_T VW}{2\pi N_E} - T_0}{\frac{D_0 VW}{2\pi N_E} - T} Q_0 \quad \text{if } D \geq D_G; \text{ and} \tag{5.104}$$

no control of Q is done if $D<D_G$.

(c) Target Braking Forces and Pressures for Individual Forces

Target braking pressures under the control of the engine output are also calculated by expressions (5.99), where $D_T$ is substituted for D. The resultant target braking forces are then converted to brake pressures through the expression (3.2).

I-6 The Process During Right Turning

When a vehicle make a right turn, the process is substantially identical to that during left turning as described above. The inside and outside of the vehicle, however, is reversed, and accordingly, the spinning and drifting of the vehicle will occur in the direction opposite to that during left turning. Thus, in the process during right turning, the signs of the expressions of yaw moments used in the judgement of the vehicle behavior (Region (B)) are reversed, i.e.

If the index value satisfies:

$$M_{fl}+M_{fr}+M_{rlG}+M_{rrG}-KI\beta d_r < \Delta Ms \tag{4.6R}$$

then the behavior is judged under Spin condition.

If the index value satisfies:

$$M_{fl}+M_{fr}+M_{rlG}+M_{rrG}-KI\beta d_r > \Delta M_d$$

and $$M_{fl}+M_{fr}<K_f(M_{flG}+M_{frG}) \tag{4.7R}$$

then the behavior is judged under Drift condition under $I_B \cdot \gamma d \leq 0$.

The following calculations for obtaining target longitudinal forces $F_{Xi2,3}$ are substantially identical except that it should be simply allowed for that the rotational direction is reversed. The differences in the process in the left and right turning will be readily realized by one of ordinary skill in the art. In Appendix III, the expressions in the process during the right turning will be listed.

II. Practical Embodiments

Here, the present invention will be described with reference to practical embodiments based upon the general concept of the present invention described in the previous section. In the followings, six preferred practical embodiments are provided: a four wheel drive vehicle with/without an engine control (first/second embodiments); a rear wheel drive vehicle with/without an engine control (third/fourth embodiments); and a front wheel drive vehicle with/without an engine control (fifth/sixth embodiments).

II-1. First Embodiment (A Four Wheel Drive Vehicle with an Engine Control)

Figure 23:
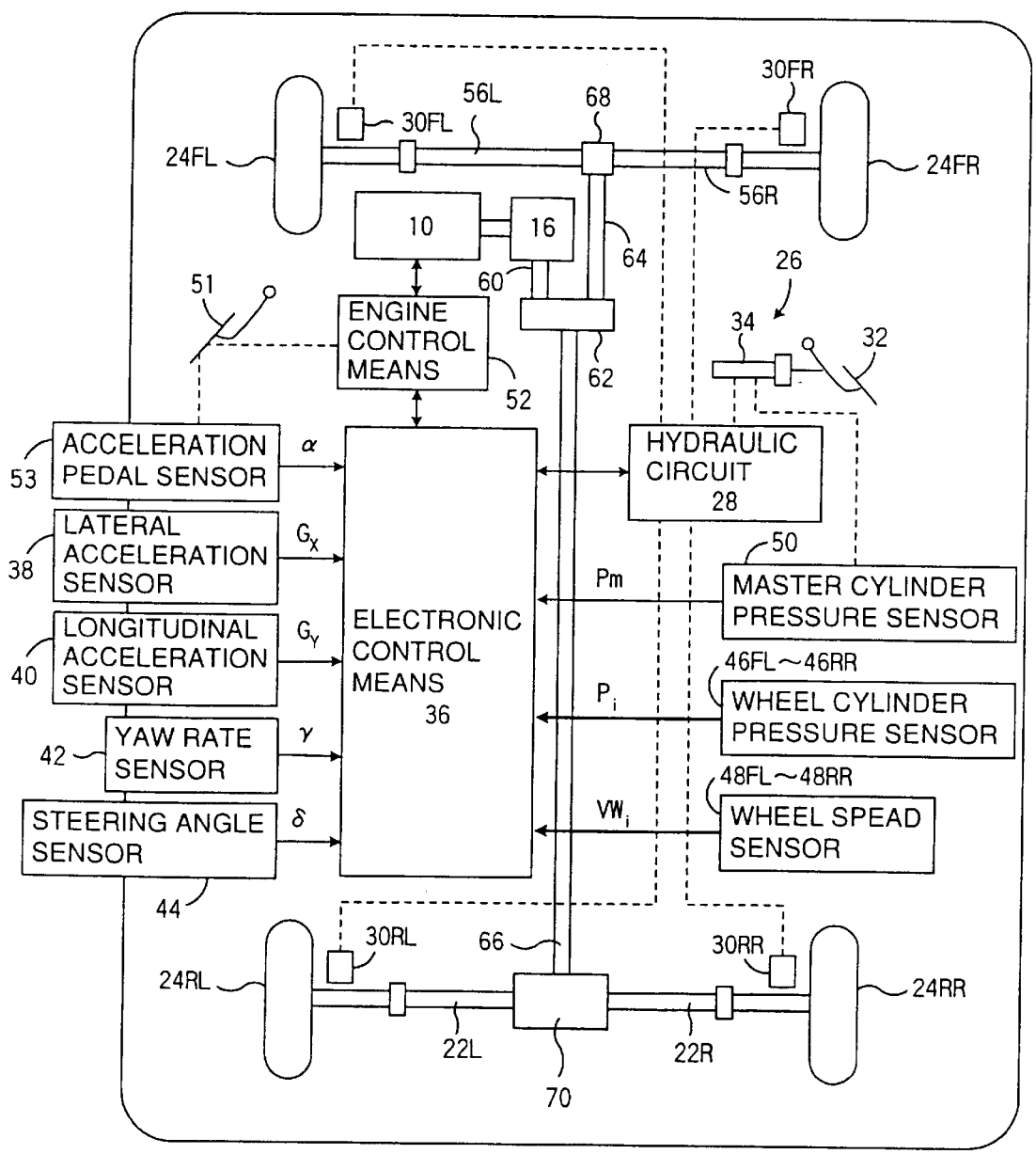
FIG. 23 is a diagrammatical view of a four wheel drive vehicle incorporating a vehicle motion control device of a preferred embodiment of according to the present invention.

FIG. 23 diagrammatically shows a four-wheel drive vehicle incorporating a vehicle motion control device according to the present invention. The vehicle includes a vehicle body 12, front right wheel 24FR, front left wheel 24FL, rear right wheel 24RR and rear left wheel 24RL supporting the vehicle body 12 via the respective suspension means (not shown in the figure), an engine 10 adapted to output a driving torque according to a throttle valve opening in response to the depression of an acceleration pedal 51 by the driver, and a transmission 16 providing a driving force to the wheels through a differential gear system 62–70 and front and rear wheel shafts 22R, L and 56R, L. The differential gear system includes a center differential gear device 62 adapted to distribute a driving torque received through an output shaft 60 of the transmission 16 to front and rear propeller shafts 64, 66, respectively, and front and rear differential gear devices 68 and 70 each adapted to transmit the distributed driving torque to the respective left and right wheel shafts, thereby rotating the wheels. The front right and front left wheels 24FR and 24FL are steered by a rack-and-pinion type power steering means according to a rotation of a steering wheel by a driver via a pair of tie rods (not shown).

A brake system generally designated by 26 includes a hydraulic circuit means 28, a brake pedal 32 adapted to be depressed by the driver, a master cylinder 34 for supplying a master cylinder pressure to the hydraulic circuit means 28 according to the depression of the brake pedal by the driver, and wheel cylinders 30FR, 30FL, 30RR and 30RL each adapted to apply a braking force to each corresponding one of the front right, front left, rear right and rear left wheels according to a supply of a hydraulic pressure thereto from the hydraulic circuit means 28.

Electric control means 36 incorporates a microcomputer which may be of an ordinary type including a central processor unit, a read only memory, a random access memory, input and output port means and a common bus interconnecting these elements (not shown) and function as the vehicle motion control device according to the present invention.

As shown in FIG. 23, the electronic control means 36 are supplied with a signal indicating longitudinal acceleration Gx of the vehicle body from a longitudinal acceleration sensor 38, a signal indicating lateral acceleration Gy of the vehicle body from a lateral acceleration sensor 40, a signal indicating yaw rate γ of the vehicle body from a yaw rate sensor 42, a signal indicating steering angle δ inputted to the lack-and-pinion type power steering means from the steering wheel according to a rotation thereof by the driver from a steering angle sensor 44, signals indicating vehicle wheel speeds VWi of the front right, front left, rear right and rear left wheels from wheel speed sensors 48FR, 48FL, 48RR and 48RL, signals indicating hydraulic pressures Pi in the wheel cylinders 30FR, 30FL, 30RR and 30RL detected by pressure sensors 46FR, 46FL, 46RR and 46RL, a signal indicating hydraulic pressures Pm in the master cylinder 34 detected by a pressure sensor 50, a signal indicating the depressed amount of the acceleration pedal α sensed by an acceleration pedal sensor 53. [The wheel speed sensors 48FR-RL, wheel cylinder pressure sensors 46FR-RL are practically located adjacent to the respective wheels.] Further, constant parameters required for the calculations in the processes have been provided to and stored in the electronic control means 36. Slip angle $\beta_B$ of the vehicle body may be obtained by any of conventional devices.

The calculations as described in the previous section I are conducted by the control means 36 using the parameters indicated by the above signals according to programs stored in the read only memory. After the calculation of the target values for the wheels, the control means 36 output control signals to the hydraulic circuit means 28 and engine control means 52, thereby controlling brake pressures and the throttle opening for the engine 10, respectively.

Figure 24:
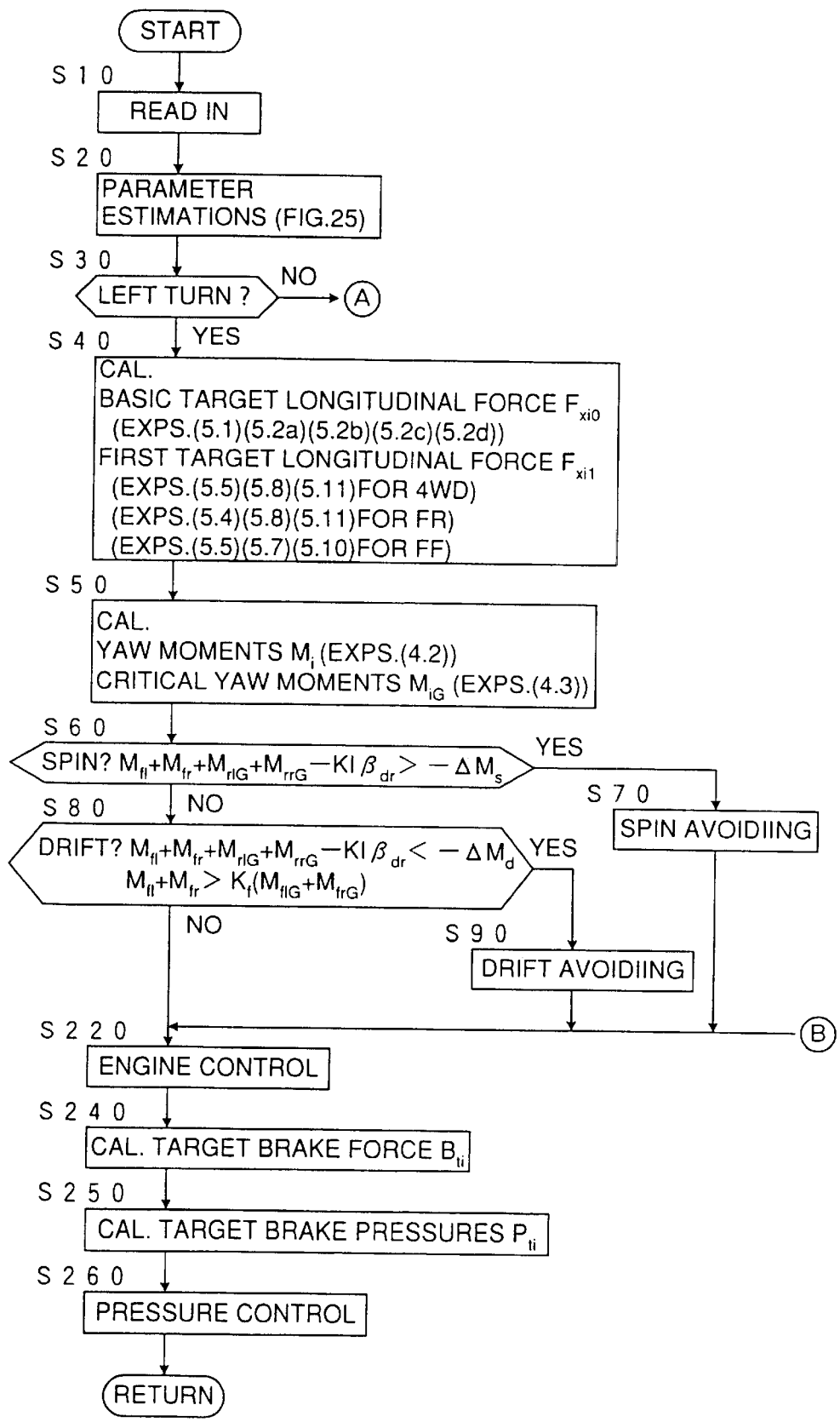
FIG. 24 is a flowchart showing a main routine of the control operation in a preferred embodiment according to the present invention.

Referring to FIGS. 24–29, the vehicle motion control device of the present invention, incorporated in a four wheel drive vehicle, will be described hereinbelow in the form of its control operation of an embodiment thereof. The control according to a main routine shown in FIG. 24 is started by a closure of an ignition switch (not shown in FIG. 23) and cyclically repeated at a cycle time such as tens of microseconds during the operation of the vehicle.

In step 10, the signals shown in FIG. 23 are read in. In step 20, parameters required for calculating target values are estimated such as longitudinal and lateral forces on wheels. This step is detailed in FIG. 25. In step 30, it is judged if the vehicle is making a left turn, based upon any of conventional protocols, for instance, the sign of the yaw rate signal detected by the yaw rate sensor 42. For the affirmative answer or for a left turn, step 40 is conducted. Otherwise, step 140 is conducted for a right turn (see FIG. 29). In step 40, a first target longitudinal force $F_{Xi1}$ for each wheel is calculated. In step 50, actual and critical yaw moments Mi, $M_{iG}$ for each wheel are calculated. In step 60, it is judged if the vehicle is under spin condition. For the affirmative answer, step 70 is conducted, where the first target longitudinal forces $F_{Xi1}$ are modulated to second longitudinal forces $F_{Xi2}$ (see FIG. 26). Otherwise, it is judged if the vehicle is under drift condition in step 80. For the affirmative answer in step 80, step 90 is conducted, where the first target longitudinal forces $F_{Xi1}$ are modulated to third longitudinal forces $F_{Xi3}$ (see FIG. 27). In step 220, a target throttle opening Qt is calculated (see FIG. 28). In step 240, a target braking force and subsequently a target brake pressure are calculated in step 250. Finally, in step 260, the control of the brake pressures of the wheels is implemented, and the process return to the start.

Figure 25:
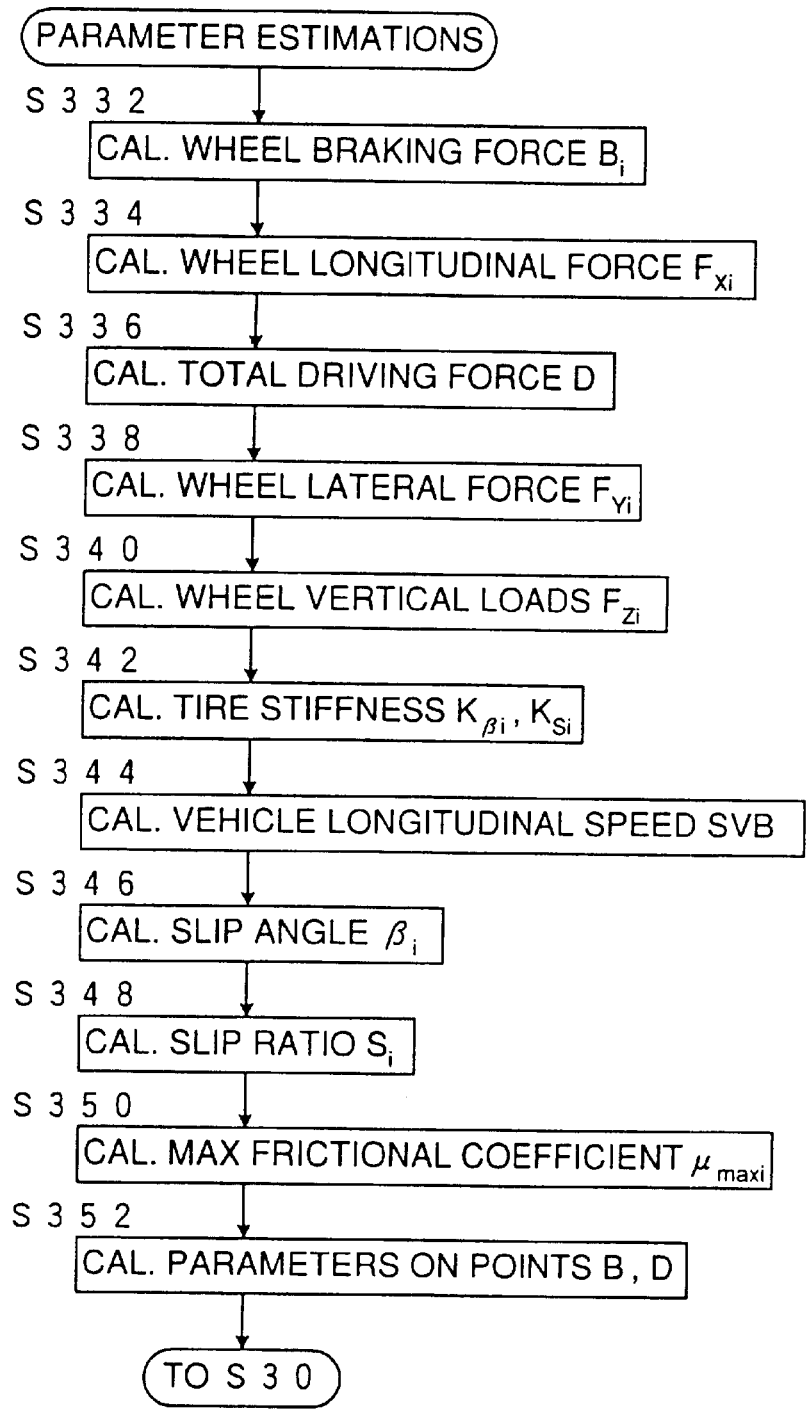
FIG. 25 is a flowchart showing a subroutine of the control operation executed in step 20 of the main routine.

FIG. 25 shows the sub-routine of the calculations of the parameters as described with respect to Region A in section I. As described in the figure, the parameters may be estimated in the following order [the numbers of expressions used for the calculations in the parentheses]: a brake forces Bi (3.2); wheel longitudinal forces $F_{Xi}$ (3.1); a total driving force D (3.4); wheel lateral forces $F_{Yi}$ (3.9) and (3.13); wheel vertical load $F_{Zi}$ (3.14); tire stiffness $K_{Si}$ and $K_{\beta i}$ (3.15); a vehicle longitudinal speed SVB (3.20); wheel slip angle $\beta i$ (3.18); wheel slip ratio Si (3.19); wheel maximum static frictional coefficients $\mu_{maxi}$ (3.22) and sets of parameters of at least points B and D based on the tire model [see FIG. 3] for each wheel (2.13 a–e). In step 344, whether or not a tire is braked may be judged from the direction of the estimated $F_{Xi}$, and depending upon this judgement, a reference slip ratio SKi and a vehicle longitudinal speed SVB are correspondingly selected. For the details of the calculations in this routine, see section I-3.

Referring again to FIG. 24, in step 40, the first longitudinal force $F_{Xi1}$ for each wheel is obtained as follows: First, $F_{XV}$ is calculated in response to the driver's commands based upon a signal α from the acceleration pedal sensor 53 and a signal Pm from the pressure sensor of the master cylinder 34 (see expression (5.1)). Then, whether or not the vehicle is braked is judged from the direction of a vehicle body total longitudinal force $F_{XV}$, and, a basic target longitudinal force $F_{Xi0}$ for each wheel is calculated through expressions (5.2a) during braking and (5.2b) during non-braking.

Subsequently, each resultant basic value is modulated to each corresponding first target longitudinal force $F_{Xi1}$ through expressions (5.5) for the front wheels; (5.8) for the rear inside (left) wheel; and (5.11) for the rear outside (right) wheels. Expressions (5.13) and (5.14) defined based upon the simplified normal running limits may be used in the calculation of $F_{Xi1}$.

In step 50, actual and critical yaw moments $M_i$, $M_{iG}$ for each wheel are calculated through expressions (4.1) and (4.3). Further, a rear wheel slip angle velocity βdr may be calculated. Thus, the index value: $M_{fl}+M_{fr}+M_{rlG}+M_{rrG}-$ KIβdr, $M_{fl}+M_{fr}$ and $M_{flG}+M_{frG}$ are obtained so that the judgement process in steps 60 and 80 can be done as described in section I-4-3.

Figure 26:
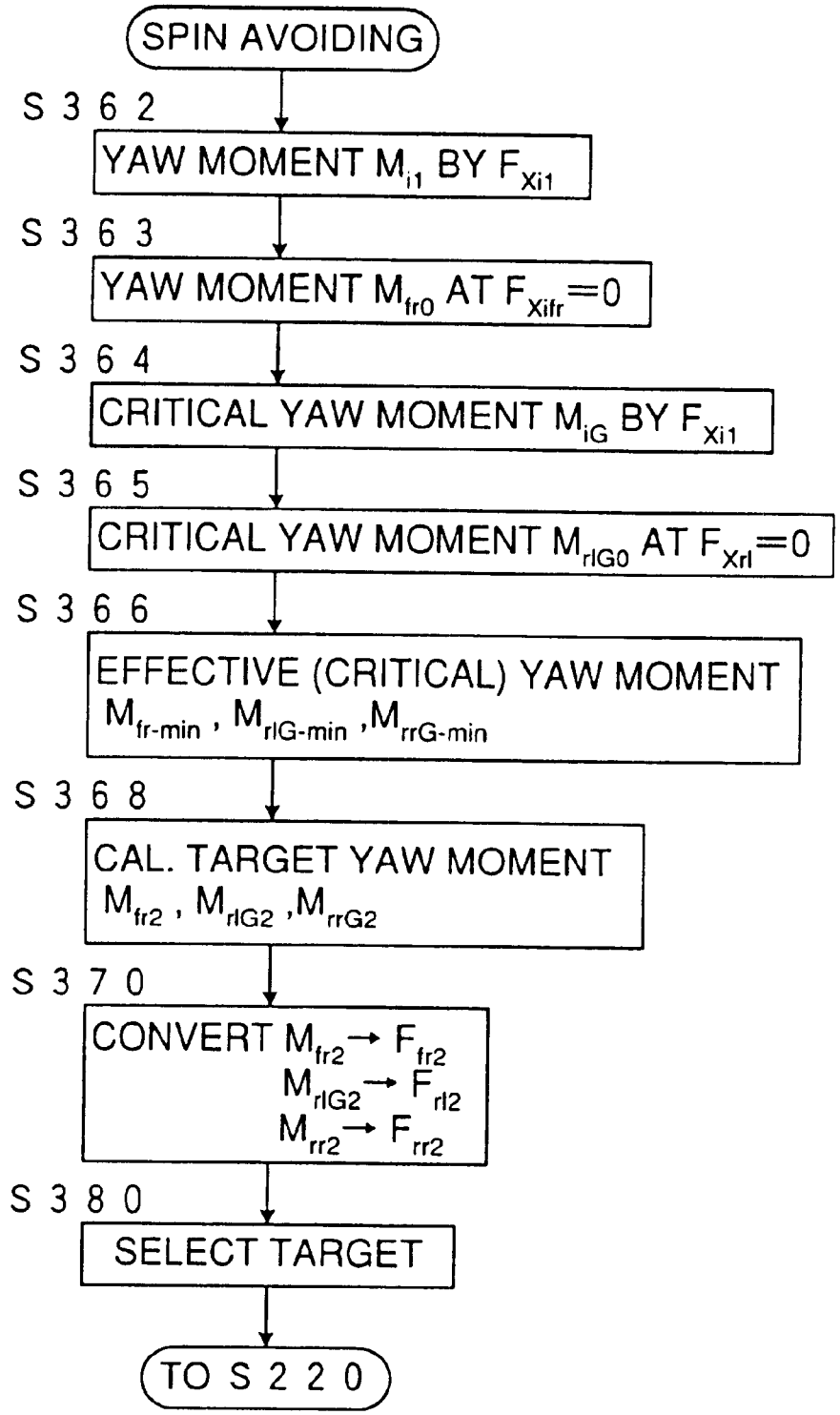
FIG. 26 is a flowchart showing a subroutine of the control operation executed in step 70 of the main routine.

Referring to FIG. 26, in the sub routine from step 70, the first target values $F_{Xi1}$ are modulated to a second target longitudinal force $F_{Xi2}$ for avoiding the spinning of the vehicle. Here, first, the following parameters are calculated through the respective expressions deduced in section I-5-3 (i) for the calculations of the target yaw moments: yaw moments $M_{fl1}$ and $M_{fr1}$ to be generated by the first target longitudinal force $F_{Xi1}$ [only for the front wheels] (in step 362); a yaw moment $M_{fr0}$ to be generated at $F_{Xfr}=0$ (in step 363); critical yaw moments by $F_{Xi1}$ [only for the rear wheel] (in step 364); a critical yaw moment $M_{rlG0}$ at $F_{Xrl}=0$ (in step 365); effective (or critical) yaw moments $M_{fr\_}$min, $M_{rlG\_}$min, $M_{rrG\_}$min (in step 366) [In the calculation of $M_{rlG\_}$min in step 366, the vehicle is judged as being braked if $F_{XV}$<0.].

Then in step 368, a target yaw moment for each wheel, $M_{fr2}$, $M_{rlG2}$ and $M_{rrG2}$ is calculated. In the calculation during braking the vehicle ($F_{XV}$<0), a preferred performance of the vehicle behavior should have been selected from a tuning performance and a braking performance, as described in section I-5-3(ii)(a). During non-braking, the way of calculating target yaw moments are selected from expressions (5.53), (5.56) or (5.58), dependent upon the relative magnitude of a control yaw moment Mns and the effective (critical) yaw moments.

If the simplified process described in section I-5-3 (ii)(c) is employed, where only the target value for the front outside wheel is modulated, steps 362–366 are bypassed and, in step 368, $M_{fr2}$ is calculated through expressions (5.22) and (5.59).

Finally, in step 370, the target yaw moments $M_{fr2}$, $M_{rlG2}$ and $M_{rrG2}$ are converted to the second target longitudinal forces $F_{Xfr2}$, $F_{Xrl2}$ and $F_{Xrr2}$ [$F_{Xfl1}$ is not modulated, thus, always $F_{Xfl2}=F_{Xfl1}$] through either of expressions (5.61), (5.64), (5.65), (5.67), (5.69). Then, in step 380, an appropriate value for each wheels is selected according to expressions in section I-5-5 $F_{Xfr2}$ may be calculated through expression (5.70) instead of (5.64).

Figure 27:
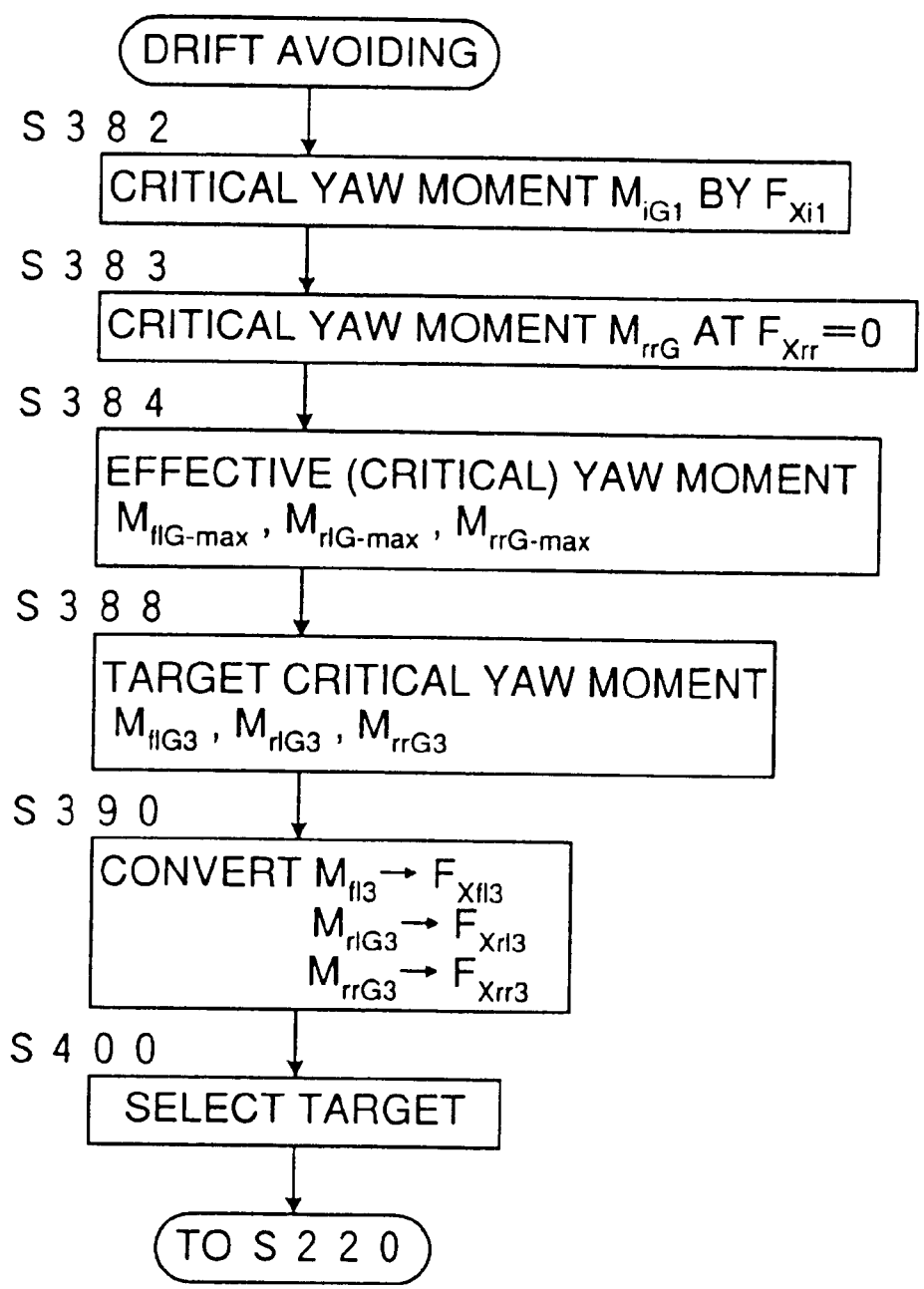
FIG. 27 is a flowchart showing a subroutine of the control operation executed in step 90 of the main routine.

Referring to FIG. 27, in the sub routine from step 90, the first target values $F_{Xi1}$ are modulated to a third target longitudinal force $F_{Xi3}$ for avoiding the drifting of the vehicle. As in the subroutine of FIG. 26, first according to the expressions described in section I-5-4 (i), it is calculated that the parameters required for the calculation of the target yaw moments: critical yaw moments $M_{iG}$ which can be generated by $F_{Xi1}$ (in step 382); a critical yaw moment $M_{rrG0}$ at $F_{Xrr}=0$ (in step 383); effective critical yaw moments $M_{flG\_}$max, $M_{rlG\_}$max, $M_{rrG\_}$max (in step 384) [In the calculation of $M_{rrG\_}$min in step 384, the vehicle is judged as being braked if $F_{XV}$<0.]. Then, in step 388, a target yaw moment for each wheel, $M_{fl3}$, $M_{rlG3}$ and $M_{rrG3}$ are calculated through the general expressions (5.82)–(5.83), where the values of the effective critical yaw moments are different depending upon $F_{Xi1}$ [see section I-5-4 (ii)(a) and(b) for the details.].

If only the rear inside wheel is used for avoiding a drift condition as described in section I-5-4 (ii)(c), steps 382 and 383 are bypassed and, in step 384, only $M_{rlG\_}$max is calculated and, in step 388, $M_{rlG3}$ is calculated through expression (5.84). Alternatively, if the protocol described in section I-5-4 (ii) (d), where both of the rear wheels are used, is employed, step 384 is done assuming $M_{flG\_}$max=$M_{flG1}$, and MrlG3 and MrrG3 are calculated through expression (5.85) if $M_{rlG\_}$max-$M_{rlG}$<$M_{rrG\_}$max-$M_{rrG}$.

Finally, in step 390, the target yaw moments $M_{fl3}$, $M_{rlG3}$ and $M_{rrG3}$ are converted to the third target longitudinal forces $F_{Xfl3}$, $F_{Xrl3}$ and $F_{Xrr3}$ [$F_{Xfr1}$ is not modulated, thus, always $F_{Xfr3}=F_{Xfr1}$] through either of expressions (5.88), (5.90), (5.92). Then, an appropriate value denoted by those expressions is selected for each wheel, dependent upon the corresponding first target value $F_{Xi1}$.

In step 400, a final target longitudinal force is selected for each wheel through expressions described in section I-5-5.

Figure 28:
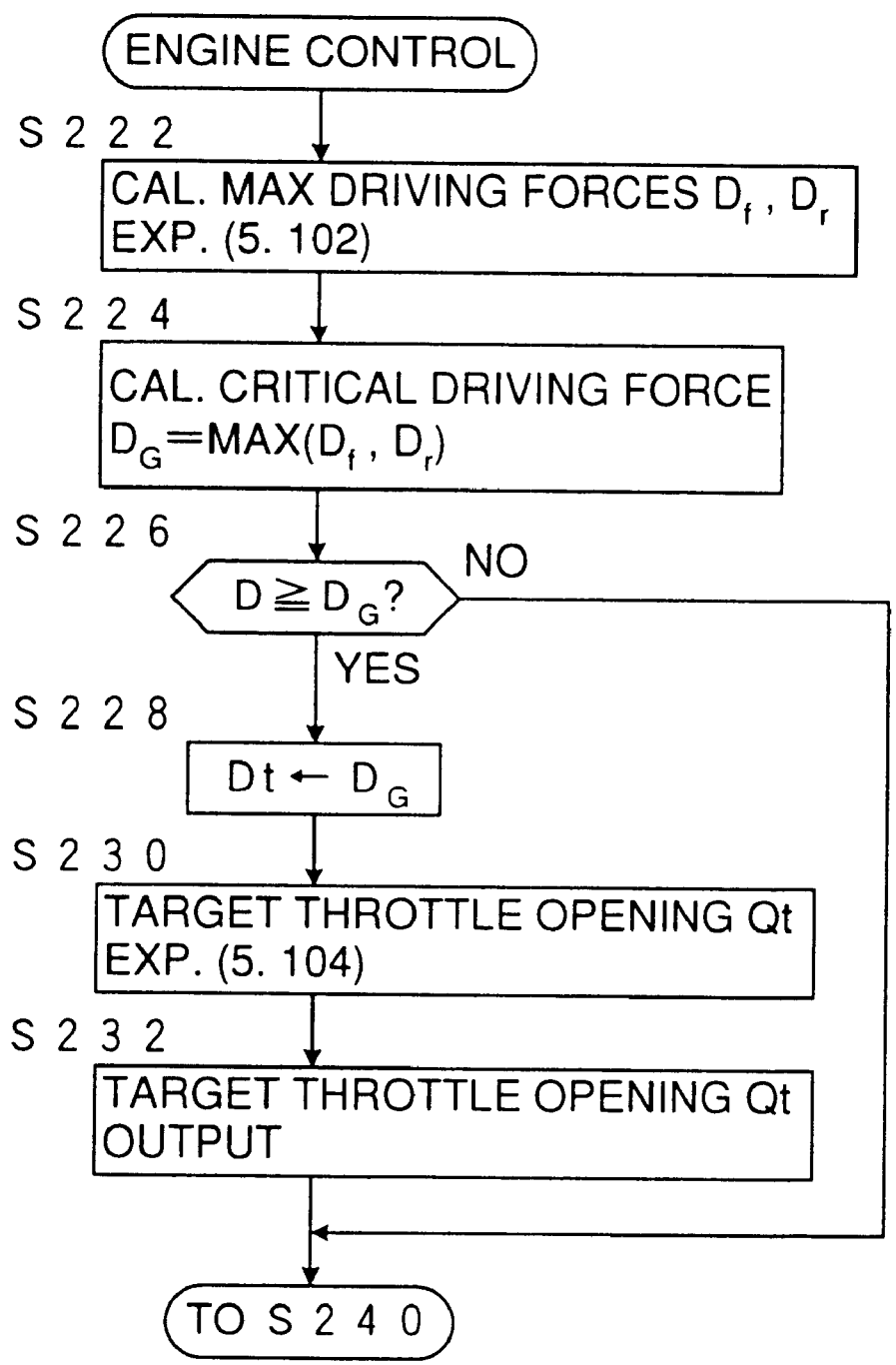
FIG. 28 is a flowchart showing a subroutine of the control operation executed in step 220 of the main routine.

Referring to FIG. 28, in the sub routine from step 220, a target driving force $D_T$ is calculated, which is converted to a target throttle opening $Q_T$. In step 222, Df and Dr are determined through expression (5.102) and $D_G$=MAX (Df, Dr) is defined in step 224. Then, in step 226, it is judged if the driving force determined through expression (3.4) $D \geq D_G$. If the answer is "Yes", then Dt is modulated to $D_G$ in step 228. Then, a target throttle opening $Q_T$ is calculated through expression (5.104), and a signal corresponding to $Q_T$ is outputted to the engine control means 52. If the answer is "No" in step 226, no control is done for the throttle opening.

Referring back to the main routine in FIG. 24, in step 240, a target braking force Bti is calculated for each wheel through the corresponding expression (5.99). Then, Bti is converted to the corresponding brake pressure through expression (3.2) for each wheel. Finally, the control of the braking pressure is implemented in step 260. Then, the process returns to start.

Figure 29:
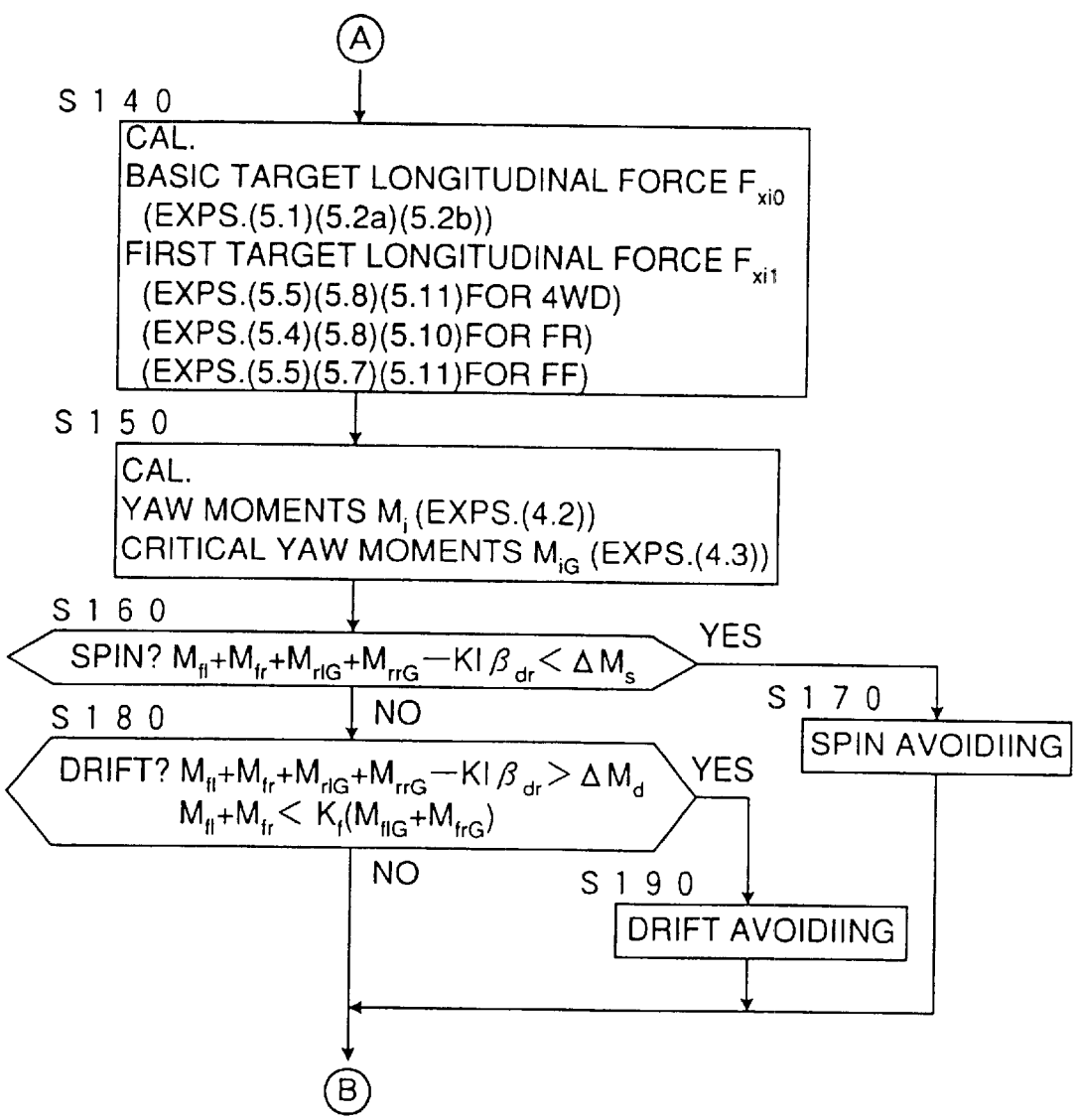
FIG. 29 is a flowchart showing a part of the main routine in FIG. 24 of the control operation, branched from step 30.

FIG. 29 shows the sub routine starting from step 140 for the process during right turning, which is substantially identical to the steps 40–90. As noted previously in section I-6, however, the inside and outside of the vehicle relative to the turning center are reversed so that the directions of yaw moments and the index values for judging the behavior (in steps 160 and 180) are opposite to those during the left turning. The expressions used here are listed in Appendix III.

II-2 Second Embodiment
(A Four Wheel Drive Vehicle Without Engine Control)

The second embodiment is identical to the first embodiment except that no modulation of engine output of the sub-routine as shown in FIG. 28 is done. Thus, step 220 is bypassed. In step 240, a driving force D obtained from expression (3, 4) is substituted in expression (5.99).

II-3 Third Embodiment
(A Rear Wheel Drive Vehicle With an Engine Control)

The vehicle motion control device according to the present invention may be incorporated in a rear wheel drive vehicle. Referring again to FIG. 23, in a rear wheel drive vehicle, as well-known in the art, the front wheels are free of a driving force, and thus, there is no system transmitting the engine torque to the front wheels, corresponding to wheel shafts 56R and L, center differential gear device 62, front propeller shaft 64, front differential gear device 68. The front wheels may rotate independently of each other. The other structures in the rear wheel drive vehicle are substantially identical to those diagrammatically shown in FIG. 23.

The protocols of the vehicle motion control for the rear wheel drive vehicle according to the present invention are substantially similar to those for the four wheel drive vehicle as described above. In the followings, the differences in the protocols from those for the four wheel drive vehicle are noted referring to FIG. 24–29.

In step 334 in the sub-routine staring from step 20 (see FIG. 25), wheel longitudinal forces $F_{Xi}$ and a driving force D are estimated through the same expressions (3.1) and (3.4) as in the four wheel drive vehicle. However, since system parameters $I_{Df}$, $I_{Dr}$ and a are equal to zero in the rear wheel drive vehicle, those expressions will be simplified. In step 344, the vehicle longitudinal speed SVB is selected from the estimated value obtained through expressions (3.21a) of non-driven front wheels. Since there is no estimated value (except the slip angle of the vehicle body) in the expressions (3.21a), the resultant SVB will be more reliable than that in the four wheel drive vehicle.

In step 40 in the main routine in FIG. 24, the basic target value $F_{Xi0}$ for each wheel during non-driving is calculated through expression (5.2c). The first target longitudinal force $F_{Xi1}$ for each wheel is obtained through expressions (5.4) for the front wheels; (5.8) for the rear inside (left) wheel; and (5.11) for the rear outside (right) wheels.

In step 368 in the sub routine shown in FIG. 26 for the spin avoiding process, target yaw moments during non-braking may be calculated in manners similar to those during braking in the four wheel drive vehicle [i.e. in the rear wheel drive vehicle, the spin avoiding process is identical during braking and non-braking], except that the effective critical yaw moment $M_{rlG\_min}$ is given by expression (5.28). [The drift avoiding process in the rear wheel vehicle is identical to that in the four wheel drive vehicle.]

The expressions used in the processes of steps 220–240 are identical to those in the four-wheel drive vehicle. Since, however, the constant parameters, $I_{Df}$, $I_{Dr}$ and a=0, the calculations here will be simplified.

The processes with resect to the rear wheels drive vehicle, other than those pointed out above, are substantially identical to those in the four wheel drive vehicle.

II-4 Fourth Embodiment
(A Rear Wheel Drive Vehicle Without Engine Control)

The fourth embodiment is identical to the third embodiment except that no modulation of engine output of the sub-routine as shown in FIG. 28 is done. Thus, step 220 is bypassed. In step 240, a driving force D obtained from expression (3.4) is substituted in expression (5.99).

II-5 Fifth Embodiment
(A Front Wheel Drive Vehicle With an Engine Control)

The vehicle motion control device according to the present invention may be also incorporated in a front wheel drive vehicle. Referring again to FIG. 23, in a front wheel drive vehicle, as well-known in the art, the rear wheels are free of a driving force, and thus, there is no system transmitting the engine torque to the rear wheels, corresponding to wheel shafts 22R and L, center differential gear device 62, rear propeller shaft 66, rear differential gear device 70. The rear wheels may rotate independently of each other. The other structures in the front wheel drive vehicle are substantially identical to those diagrammatically shown in FIG. 23.

The protocols of the vehicle motion control for the front wheel drive vehicle according to the present invention are also substantially similar to those for the four wheel drive vehicle as described above. In the followings, the differences in the protocols from those for the four wheel drive vehicle are noted, referring to FIGS. 24–29.

In step 334 in the sub-routine staring from step 20 (see FIG. 25), wheel longitudinal forces $F_{Xi}$ and a driving force D are estimated through the same expressions (3.1) and (3.4) as in the four wheel drive vehicle. However, since system parameters $I_{Df}$, $I_{Dr}$ and 1/a are equal to zero in the front wheel drive vehicle, those expressions will be simplified. In step 344, the vehicle longitudinal speed SVB is selected from the estimated value obtained through expressions (3.21b) of non-driven rear wheels. The resultant SVB will be more reliable than that in the four wheel drive vehicle because of the absence of any estimated value in the expressions (3.21b).

In step 40 in the main routine in FIG. 24, the basic target value $F_{Xi0}$ for each wheel during non-braking is calculated through expression (5.2d). The first target longitudinal force $F_{Xi1}$ for each wheel is obtained through expressions (5.5) for the front wheels; (5.7) for the rear inside (left) wheel; and (5.10) for the rear outside (right) wheels.

In step 368 in the sub routine shown in FIG. 26 for the spin avoiding process, the target yaw moments may be calculated in manners similar to those in the four wheel drive vehicle, except that, during non-braking, the rear inside wheel is not used because it is non-driven (see section I-5-4(ii)(b) for the detail).

In step 388 in the sub routine shown in FIG. 27 for the drift avoiding process, the target yaw moments may be calculated in manners similar to those in the four wheel drive vehicle, except that, during non-braking, the rear outside wheel is not used because it is non-driven. The effective critical yaw moment of the rear inside wheel is calculated only in the braking side (the lower quadrants in a frictional circle.). Further, the drift avoiding process using only the opposite rear wheels (see section I-5-4(ii)(d)) is not available in the front wheel drive vehicle because the rear wheels are non-driven.

The expressions used in the processes of steps 220–240 are identical to those in the four wheel drive vehicle. Since, however, system parameters, $I_{Df}$, $I_{Dr}$ and $1/a=0$, the calculations here will be simplified.

The processes with resect to the front wheels drive vehicle, other than those pointed out above, are substantially identical to those in the four wheel drive vehicle.

II-6 Sixth Embodiment

(A Front Wheel Drive Vehicle Without Engine Control)

The sixth embodiment is identical to the fifth embodiment except that no modulation of engine output of the sub-routine as shown in FIG. 28 is done. Thus, step 220 is bypassed. In step 240, a driving force D obtained from expression (3.4) is substituted in expression (5.99).

Although the present invention has been described in detail with respect to preferred embodiments thereof and some partial modifications thereof, it will be apparent for those skilled in the art that other various modifications are possible with respect to the shown embodiments within the scope of the present invention.

Appendix I

Derivation of Expression (3.1) of Longitudinal Force on Each Wheel

In the derivation of expression (3.1), a vehicle is assumed to be a four wheel drive vehicle, and all wheel is treated as driven wheels accordingly. The expressions of two wheel drive vehicles may be obtained simply by assuming some parameters to be zero.

A longitudinal force on each wheel $F_{Xi}$ can be expressed through a conventional motional equation of the rotation on each wheel:

$$I_{wf}\omega d_{fl}=T_{fl}+r\cdot B_{fl}-r\cdot F_{Xfl}$$

$$I_{wf}\omega d_{fr}=T_{fr}+r\cdot B_{fr}-r\cdot F_{Xfr}$$

$$I_{wr}\omega d_{rl}=T_{rl}+r\cdot B_{rl}-r\cdot F_{Xrl}$$

$$I_{wr}\omega d_{rr}=T_{rr}+r\cdot B_{rr}-r\cdot F_{Xrr}, \quad (A1.1)$$

where $\omega d_i$ denotes an angular acceleration on each wheel; $T_i$ denotes a driving torque applied to each wheel from the respective (front or rear) differential gear device. As for two wheel drive vehicle, the torque Ti is zero on either of the pairs of the front and rear wheels.

The torque applied on each wheel Ti is transmitted from an engine through a center differential gear device and each of the front and rear differential gear devices. Thus, Ti can be expressed by the torque outputted by the engine.

The torque $T_e$, outputted from the engine relates to the torque $T_C$, inputted to the center differential gear device through the motional equation of the rotation of engine:

$$I_e\omega d_e=T_e-T_C, \quad (A1.2)$$

where $\omega d_e$ denotes an angular acceleration of engine, namely, the time differential of an engine rotational speed in angle $\omega_e$. The inertia moment $I_e$ includes those from the engine to the output shaft of the transmission (see FIG. 23) and the reduction gear ratio in the differential gear device is assumed to be 1 for simplifying the calculation described here.

Figure 30A:
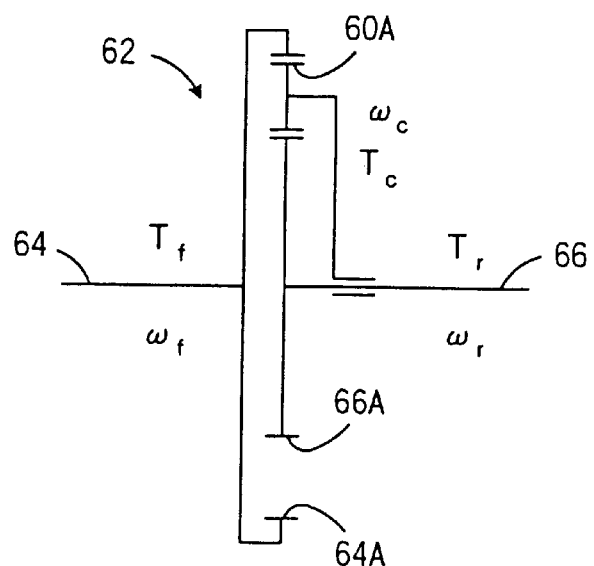
FIG. 30A diagrammatically shows a train of gears in a center differential gear device.

Referring to FIG. 30A, in the center differential device, the torque Tc, inputted from the output shaft of the transmission, is distributed through a planetary gear 60A to a ring gear 64A connected to the front propeller shaft and a sun gear 66A connected to the rear propeller shaft. Then, torque outputted to the front and rear differential gear devices $T_F$ and $T_R$ is given by:

$$T_F=[a/(1+a)]Tc;$$

$$T_R=[1/(1+a)]Tc; \quad (A1.3)$$

where $a=T_F/T_R$ and $Tc=T_F+T_R$.

Figure 30B:
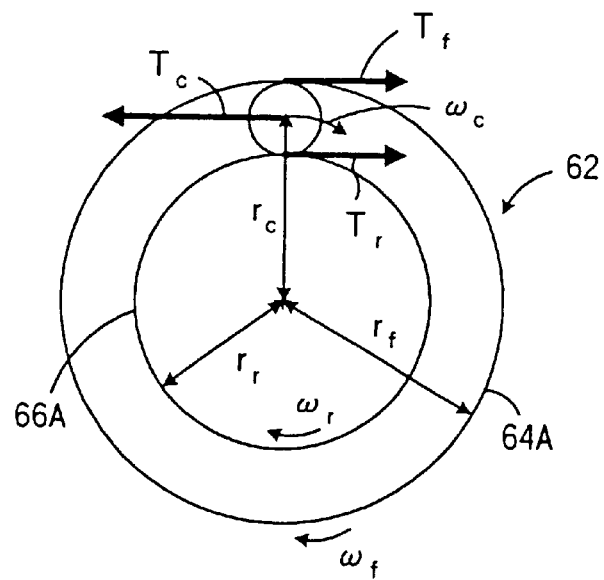
FIG. 30B shows a diagrammatically shows the balance of torque on the gears of a center differential gear device.

Further, the balance of forces on this train of gears is given as (see FIG. 30B):

$$T_C/r_C=T_F/r_F+T_R/r_R, \quad (A1.4)$$

where $r_C$, $r_F$, and $r_R$ are radii of the rotation of the center of the planetary gear, the ring gear and the sun gear, respectively. As shown in FIG. 30A, these radii relate to one another as: $r_C=(r_F+r_R)/2$ and $r_F>r_R$. Thus, from expressions (A1.3) and (A1.4), the ratio of the radii is also given by $r_F/r_R=a$. [From a simple calculation, $T_F/r_F=T_R/r_R$ is also obtained].

The relation of the rotational speeds of the gears is also given by:

$$\omega_F\cdot r_F+\omega_R\cdot r_R=2\omega_C\cdot r_C$$

where $\omega_F$, $\omega_R$ and $\omega_C$ denote angular speeds of, the ring gear, the sun gear and the center of the planetary gear (around the sun gear), respectively. Thus, the angular speed of the center of the planetary gear is expressed with the ratio a by:

$$\omega_C = [r_F/2r_C]\omega_F + [r_R/2r_C]\omega_R$$

$$[a/(1+a)]\omega_F + [1/(1+a)]\omega_R$$

Then the time differential of this expression is given by:

$$\omega d_C=[a/(1+a)]\omega r_F+[1/(1+a)]\omega d_R \quad (A1.5)$$

where $\omega d_F$, $\omega d_R$ denote angular accelerations of the ring gear and the sun gear. These angular accelerations are directly applied to the front and rear differential gear devices, respectively. $\omega d_C$ is the angular acceleration of the center of the planetary gear. As described above, since the reduction gear ratio in the differential gear device is assumed to be 1, the angular acceleration of the center of the planetary gear $\omega d_C$ is assumed to be $\omega d_{C=\omega de}$.

The torque $T_F$, $T_R$ and angular accelerations $\omega d_F$, $\omega d_R$, relate to the torque applied to the respective wheels via a motional equation of the rotation on each of the front and rear differential gear devices:

$$I_{DF}\omega d_F = T_F - T_{fl} - T_{fr}$$

$$I_{DR}\omega d_R = T_R - T_{rl} - T_{rr} \tag{A1.6}$$

Assuming that, in each of the differential gear devices, the torque is distributed equally to the left and right wheels, i.e.

$$T_{fl}=T_{fr};$$

$$T_{rl}=T_{rr};$$

then, $$\omega d_F=(\omega d_{fl}+\omega d_{fr})/2;$$

$$\omega d_R=(\omega d_{rl}+\omega d_{rr})/2 \tag{A1.7}$$

From the relations of the torque and accelerations described above, expression (A1.1) is rewritten as follows:

$$\frac{a}{2(1+a)}T_e + T_{Bfl} - rF_{Xfl} = \left\{\frac{1}{4}\left(\frac{a}{1+a}\right)^2 I_e + \frac{1}{4}I_{Df} + I_{Wf}\right\}\omega d_{fl} + \tag{A1.8}$$

$$\left\{\frac{1}{4}\left(\frac{a}{1+a}\right)^2 I_e + \frac{1}{4}I_{Df}\right\}\omega d_{fr} + \frac{1}{4}\frac{a}{(1+a)^2}I_e(\omega d_{rl}+\omega d_{rr})$$

$$\frac{a}{2(1+a)}T_e + T_{Bfr} - rF_{Xfr} = \left\{\frac{1}{4}\left(\frac{a}{1+a}\right)^2 I_e + \frac{1}{4}I_{Df}\right\}\omega d_{fl} +$$

$$\left\{\frac{1}{4}\left(\frac{a}{1+a}\right)^2 I_e + \frac{1}{4}I_{Df}\right\}\omega d_{fr} + \frac{1}{4}\frac{a}{(1+a)^2}I_e(\omega d_{rl}+\omega d_{rr})$$

$$\frac{1}{2(1+a)}T_e + T_{Brl} - rF_{Xrl} = \left\{\frac{1}{4}\left(\frac{1}{1+a}\right)^2 I_e + \frac{1}{4}I_{Dr} + I_{Wr}\right\}\omega d_{rl} +$$

$$\left\{\frac{1}{4}\left(\frac{1}{1+a}\right)^2 I_e + \frac{1}{4}I_{Dr}\right\}\omega d_{rr} + \frac{1}{4}\frac{a}{(1+a)^2}I_e(\omega d_{fl}+\omega d_{fr})$$

$$\frac{1}{2(1+a)}T_e + T_{Brr} - rF_{Xrr} = \left\{\frac{1}{4}\left(\frac{1}{1+a}\right)^2 I_e + \frac{1}{4}I_{Dr}\right\}\omega d_{rl} +$$

$$\left\{\frac{1}{4}\left(\frac{1}{1+a}\right)^2 I_e + \frac{1}{4}I_{Dr} + I_{Wr}\right\}\omega d_{rr} + \frac{1}{4}\frac{a}{(1+a)^2}I_e(\omega d_{fl}+\omega d_{fr}),$$

where D denotes the total driving force, which is obtained from the engine torque $T_e$ with D=Te/r. The angular acceleration $\omega di$ on each wheel can be converted to a wheel rotational acceleration VWdi with VWdi=r·$\omega$di.

Thus, the longitudinal force $F_{Xi}$ on each wheel is expressed with a function of the total driving force, the braking force Bi, the wheel rotational acceleration VWdi on each wheel as described in expression (3.1).

As for two-wheel drive vehicles, a rear wheel drive vehicle has only a rear differential gear device, which corresponds to the center differential gear device in the above calculations, and thus, $I_{Df}$, $I_{Dr}$, a=0. On the other hand, a front wheel drive vehicle has only a front differential gear device, which corresponds to the center device, thus, $I_{Df}$, $I_{Dr}$, 1/a=0.

Appendix II

Derivation of Expression (3.22) of Maximum Static Frictional Coefficient

Figure 31A:
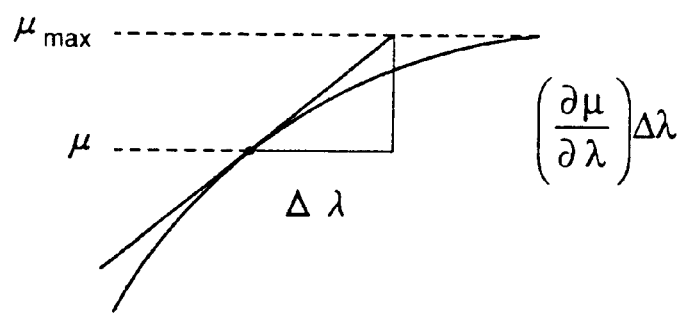
FIGS. 31A and 31B show how to derive expression (3.22) and a result of an estimation through expression (3.22) when a true $\mu_{max}$ is rather low, respectively.

As shown in FIG. 5A, a static frictional coefficient $\mu$ is given by a function of a composite slip ratio $\lambda$. Referring to FIG. 31A, with a certain $\mu$ and its differential $(\partial\mu/\partial\lambda)$, $\mu_{max}$ is expressed as:

$$\mu_{max}=\mu+(\partial\mu/\partial\lambda)\Delta\lambda \tag{A2.1}$$

where $\Delta\lambda$ is a small displacement of $\lambda$, respectively. Then, $\Delta\lambda$ is defined as:

$$\Delta\mu=(\partial\mu/\partial\lambda)_{\lambda=0}\Delta\lambda.$$

where $(\partial\mu/\partial\lambda)_{\lambda=0}$ is a slope of the curve of $\mu(\lambda)$ at $\lambda$=0. Thus, $\mu_{max}$ is approximately given by expression (3.22).

Figure 31B:
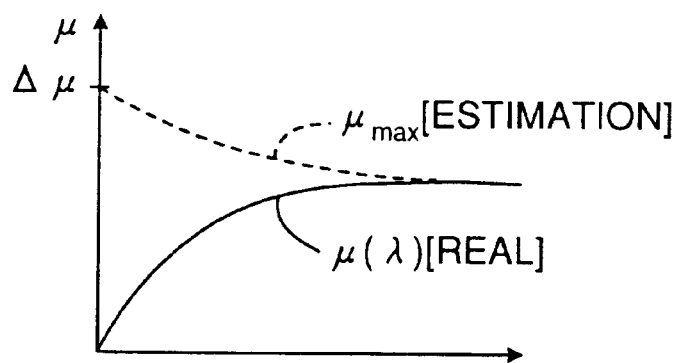

In this estimation with expression (3.22), $\Delta\mu$ and $(\partial\mu/\partial\lambda)_{\lambda=0}$ are given as fixed parameters. Thus, before a road reaction force is saturated, the difference between a true $\mu_{max}$ and an estimated $\mu_{max}$ depends upon the relative magnitude of $\Delta\mu$ to a true $\mu_{max}$. As shown in FIG. 31B, an estimated $\mu_{max}$ varies from $\Delta\mu$ at $\lambda$=0 to a true $\mu_{max}$ together with the increase of $\lambda$. Thus, if the true $\mu_{max}$ is relatively small, the estimated $\mu_{max}$ is always larger than the true one unless the road reaction force is saturated. On the other hand, the true $\mu_{max}$ is relatively large, the estimated $\mu_{max}$ is smaller than the true one as shown in FIG. 5C. However, after the road reaction force is saturated, $\mu_{max}$ is correctly estimated.

During braking for a large |Fxi| and a small |$F_{Yi}$|, i.e. when the vehicle is running on a straight course, $\xi$ is expressed by $$\xi_i=(1-|F_{Xi}|/\mu_{maxi}\cdot F_{Zi})^{1/3}$$

As noted in section I-3-6, $\xi\geq 0$ must be satisfied during braking for a large |Fxi| and a small |$F_{Yi}$|, so that at least one wheel should be controlled so as to meet this condition. To do this, a maximum frictional coefficient $\mu_{max}$ for a rear wheel may be estimated as $$\mu_{max} = \frac{MIN(F_{XY}, \mu_{max}F_Z)}{F_Z} + \Delta\mu\cdot MAX\left(\frac{\frac{\partial F_{XY}}{\partial\lambda}}{\left(\frac{\partial F_{XY}}{\partial\lambda}\right)_{\lambda=0}} - \Delta, 0\right) \tag{A2.2}$$

where $\Delta$ is a small value such as 0.01. Then, the frictional coefficient for a rear wheel will be estimated smaller, and accordingly, the braking force on the rear wheels will be also controlled to be smaller value, avoiding an instability of a running behavior of a vehicle during braking.

Appendix III

Expressions During Right Turning

In the followings, there are listed expressions during right turning, different from those during left turning. Corresponding numbers of expressions indicate corresponding expressions during left turning.

I-4 Region (B): Judgement of Vehicle Behavior Stability/Instability

I-4-2 Calculation of Critical Yaw Moments $M_{1G}$ $$M_{flG}=\{-(Tr/2)\cos\delta+L_f\sin\delta\}\cdot F_{Xfl}+\{(Tr/2)\sin\delta+L_f\cos\delta\}\cdot F_{YflG}$$

$$M_{frG}=\{(Tr/2)\cos\delta+L_f\sin\delta\}\cdot F_{Xfr}+\{-(Tr/2)\sin\delta+L_f\cos\delta\}\cdot F_{YfrG}$$

$$M_{rlG}=-(Tr/2)\cdot F_{Xrl}-L_r\cdot F_{YrlG}$$

$$M_{rrG}=(Tr/2)\cdot F_{Xrr}-L_r\cdot F_{YrrG} \tag{4.3}$$

where $F_{YiG}=-(\mu_{max}^2\ Fz^2-Fxi^2)^{1/2}$.

I-4-3 Judgement of Vehicle Behavior Stability
(b) Practical
When the index value satisfies:

$$M_{fl}+M_{fr}+M_{rlG}+M_{rrG}-KI\beta d_r<\Delta Ms \tag{4.6}$$

where $\Delta$Ms is an appropriate small positive constant, the behavior is judged under Spin condition.

If the index value satisfies:

$$M_{fl}+M_{fr}+M_{rlG}+M_{rrG}-KI\beta d_r > \Delta M_d$$

and $$M_{fl}+M_{fr} < K_f(M_{flG}+M_{frG}) \quad (4.7)$$

where $\Delta M_d$ is an appropriate small positive constant; $K_f$ is an appropriate positive factor of 0.8–0.9, the behavior is judged under Drift condition under $I_B \cdot \gamma d \leq 0$.

I-5 Region (C) Calculations of Target Values for Individual Wheels
I-5-2 Calculations of First Target Longitudinal Forces
(b) Rear Inside (Right) Wheel
  In a front-wheel drive vehicle:
    For a small $|\beta i|$, Normal running limits: C and D
    For a large $|\beta i|$, Normal running limits: C and G $$F_{Xrr1}=MAX\{F_{Xrr0}, MIN(F_{XDrr}, -K_{FXr} \cdot \mu_{maxrr} \cdot F_{Zrr})\} \quad (5.7)$$

Note:

$$MIN(F_{XDrr}, -K_{FXr} \cdot \mu_{maxrr} \cdot F_{Zrr}) \quad (5.7a)$$

represents an anti-lock target longitudinal force.
  In a rear-wheel drive vehicle and a four-wheel vehicle:
    During braking: identical to that in the front-wheel drive vehicle;
    During non-braking:
      For a small $|\beta i|$, Normal running limits: B and C.
      For a large $|\beta i|$, Normal running limits: H and C.

$$F_{Xrr1}=MIN[MAX\{F_{Xrr0}, MIN(F_{XDrr}, -K_{FXr} \cdot \mu_{maxrr} \cdot F_{Zrr})\},$$
$$MAX(F_{XBrr}, \mu_{maxrr} F_{Zrr} \cdot \sin(\arctan(Tr/2L_r)))] \quad (5.8)$$

Note:

$$MAX(F_{XBrr}, \mu_{maxrr} F_{Zrr} \cdot \sin(\arctan(Tr/2L_r))) \quad (5.8a)$$

represents an anti-wheel spin target longitudinal forces.
(c) Rear Outside (Left) Wheel
  In a front-wheel drive vehicle:
    For a small $|\beta i|$, Normal running limits: C and D;
    For a large $|\beta i|$, Normal running limits: C and J;

$$F_{Xrl1}=MAX\{F_{Xrl0}, MIN(F_{XDrl}, -\mu_{maxrl} F_{Zrl} \cdot \sin(\arctan(Tr/2L_r)))\} \quad (5.10)$$

Note:

$$MIN(F_{XDrl}, -\mu_{maxrl} F_{Zrl} \cdot \sin(\arctan(Tr/2L_r))) \quad (5.10a)$$

represents an anti-lock target longitudinal force.
  In a rear-wheel drive vehicle and a four-wheel vehicle:
    During braking: identical to that in the front-wheel drive vehicle;
    During non-braking:
      For a small $|\beta i|$, Normal running limits: B and C.
      For a large $|\beta i|$, Normal running limits: F and C.

$$F_{Xrl1}=MIN[MAX\{F_{Xrl0}, MIN(F_{XDrl}, -\mu_{maxrl} F_{Zrl} \cdot \sin(\arctan(Tr/2L_r)))\}, MAX(F_{XBrl}, K_{FXr} \cdot \mu_{maxrl} \cdot F_{Zrl})] \quad (5.11)$$

Note:

$$MAX(F_{XBrl}, K_{FXr} \cdot \mu_{maxrl} \cdot F_{Zrl}) \quad (5.11a)$$

represents an anti-wheel spin target longitudinal forces.

I-5-3 Calculations of Second Target Longitudinal Forces $F_{Xi2}$
(Target Forces for Suppressing and/or Avoiding Spin Condition)

For suppressing this spin tendency, a control yaw moment Mns in the direction against spinning is generated by wheels so as to satisfy $$(M_{fl}+M_{fr}+M_{rlG}+M_{rrG})+Mns=\Delta Ms+KI\beta d_r \quad (5.16)$$

where Mns should be distributed to the wheels so as to satisfy $$M_{fl}+M_{fr}+M_{rlG}+M_{rrG}-KI\beta d_r \geq \Delta Ms$$

after a controlling process.
(i) Calculations of Parameters
Yaw Moments To Be Generated by $F_{Xi1}$
  If $|F_{XDi}|$ is small, i.e. the slip angle $|\beta i|$ is large, $$F_{Yfl1}=-(\mu_{maxfl}^2 F_{zfl}^2 - F_{Xfl1}^2)^{1/2}$$

$$F_{Yfr1}=-(\mu_{maxfr}^2 F_{zfr}^2 - F_{Xfr1}^2)^{1/2} \quad (5.17)$$

Critical Yaw Moments Which Can Be Generated by $F_{Xi1}$ $$M_{flG1}=\{-(Tr/2)\cos\delta+L_f\sin\delta\} \cdot F_{Xfl1}+\{(Tr/2)\sin\delta+L_f\cos\delta\} \cdot F_{YflG1}$$

$$M_{frG1}=\{(Tr/2)\cos\delta+L_f\sin\delta\} \cdot F_{Xfr1}+\{-(Tr/2)\sin\delta+L_f\cos\delta\} \cdot F_{YfrG1}$$

$$M_{rlG1}=-(Tr/2) \cdot F_{Xrl1}-L_r \cdot F_{YrlG1} \quad (5.20)$$

$$M_{rrG1}=(Tr/2) \cdot F_{Xrr1}-L_r \cdot F_{YfrG1},$$

where $F_{YiG1}=-(\mu_{maxi}^2 F_{Zi}^2 - F_{Xi1}^2)^{1/2}$.
Critical Yaw Moments at $F_{Xi1}=0$ $$M_{rlG0}=\mu_{max} F_{Zrl} Lr$$

$$M_{rrG0}=\mu_{max} F_{Zrr} Lr \quad (5.21).$$

Effective Yaw Moments Against Spinning
(a) Front Outside (Right) Wheel
  When $\beta_f > 0$, $$M_{fl\_max}^*=-\mu_{maxfl} F_{Zfl} \sin(\arctan(Tr/2L_f)-\delta-\beta_{fl}) \cdot L_f/\cos(\arctan(Tr/2L_f)) \quad (5.22)$$

where $F_{Xfl}=-\mu_{max\,fl} F_{Zfl} \cos\beta_{fl}$.

$$F_{Xfl\_min}=-(S_{max}/\lambda_{maxfl})\mu_{maxfl} \cdot F_{Zfl}\{1-K_D(S_{fl}-S_{max})\} \quad (5.23)$$

where $$\lambda_{max\,fl} = \sqrt{S_{max}^2 + (1 + S_{max})^2 \left(\frac{K_{\beta fl}}{K_{Sfl}}\right)^2 \tan^2\beta_{lr}} \quad (5.24)$$

$$M_{fl\_max} = \{-(Tr/2)\cos\delta + L_f\sin\delta\} \cdot F_{Xfl\_min} +$$
$$\{(Tr/2)\sin\delta + L_f\cos\delta\} \cdot F_{Yfl\_min},$$

where $F_{Yfl\_min} = -(\mu_{maxfl}^2 F_{zfl}^2 - F_{Xfl\_min}^2)^{1/2}$.

When $\beta f > 0$:
  If $F_{XDfl} \geq -\mu_{maxfl} F_{Zfl} \cdot \sin(\arctan(Tr/2Lf)-\delta)$, $$M_{fl\_max}=\mu_{maxfl} F_{Zfl} L_f/\cos(\arctan(Tr/2L_f)). \quad (5.25)$$

If $F_{XDfl} < -\mu_{maxfl} F_{Zfl} \cdot \sin(\arctan(Tr/2Lf)-\delta)$, $$M_{fl\_max}=\{-(Tr/2)\cos\delta+L_f\sin\delta\} \cdot F_{XDfl}+\{(Tr/2)\sin\delta+L_f\cos\delta\} \cdot F_{YDfl}, \quad (5.26)$$

where $F_{YDfl}=-(\mu_{maxfl}^2 F_{zfl}^2 - F_{XDfl}^2)^{1/2}$.

(b) Rear Inside (Right) Wheel
During braking vehicle, $$M_{rrG}\_max = M_{rrG0} \tag{5.27}$$

During non-braking, $$M_{rrG}\_max = \mu_{max\_rr} F_{Zrr} L_r / \cos(\arctan(Tr/2L_r)). \tag{5.28}$$

(c) Rear Outside (Left) Wheel $$M_{rlG}\_max = \mu_{max\_rl} F_{Zrl} L_r / \cos(\arctan(Tr/2L_r)). \tag{5.29}$$

(ii) Determination of a Target Yaw Moment for Each Wheel
(a) During Barking a Vehicle $$M_{rrG}\_max = M_{rrG0}.$$

(1) When the Turning Performance is Preferred
If $$(M_{fl}+M_{fr}+M_{rlG}+M_{rrG})+Mns=\Delta Ms+KI\beta d_r \leq M_{fl1}+M_{fr1}+M_{rlG}\_max+M_{rrG0} \tag{5.30}$$

a total yaw moment of the vehicle should be set out as:

$$(M_{fl}+M_{fr}+M_{rlG}+M_{rrG})+Mns=\Delta Ms+KI\beta d_r. = M_{fl1}+M_{fr1}+M_{rlG1}+M_{rrG1}+Kr_s\{(M_{rlG}\_max-M_{rlG1})+(M_{rrG0}-M_{rrG1})\} \tag{5.31}$$

Then, since a factor $K_{ls}$ is expressed by $$K_{rs} = \frac{\Delta M_S + KI\beta d_r - (M_{fl1} + M_{fr1} + M_{rlG1} + M_{rrG1})}{(M_{rlG}\_max - M_{rlG1}) + (M_{rrG0} - M_{rrG1})},$$

a target moment for each wheel may be set out as:

$$M_{fl2} = M_{fl1}$$

$$M_{rlG2} = (1-K_{rs})M_{rlG1} + K_{ls}M_{rlG}\_max$$

$$M_{rrG2} = (1-K_{rs})M_{rrG1} + K_{ls}M_{rrG0} \tag{5.32}$$

Otherwise, i.e.

$$(M_{fl}+M_{fr}+M_{rlG}+M_{rrG})+Mns=\Delta Ms+KI\beta d_r \leq M_{fl1}+M_{fr1}+M_{rlG}\_max+M_{rrG0}$$

a total yaw moment of the vehicle may be set out as:

$$(M_{fl} + M_{fr} + M_{rlG} + M_{rrG}) + Mns = \Delta Ms + KI\beta d_r. \tag{5.33}$$

$$= M_{fl1} + M_{fr1} +$$
$$M_{rlG}\_max + M_{rrG0} +$$
$$K_{rs}(M_{fl}\_max - M_{fl1}).$$

Then, since a factor $K_{ls}$ is expressed by $$K_{rs} = \frac{\Delta M_S + KI\beta d_r - (M_{fl1} + M_{fr1} + M_{rlG}\_max + M_{rrG0})}{(M_{fl}\_max - M_{fl1})}$$

a target moment for each wheel may be set out as $$M_{fr2} = (1-K_{rs})M_{fl1} + K_{rs}M_{fl}\_max$$

$$M_{rlG2} = M_{rlG}\_max$$

$$M_{rrG2} = M_{rrG0} \tag{5.34}$$

(2) When the Braking Performance is Relatively Preferred
A total yaw moment of the vehicle may be set out as:

$$(M_{fl} + M_{fr} + M_{rlG} + M_{rrG}) + Mns = \Delta Ms + KI\beta d_r. \tag{5.35}$$

$$= M_{fl1} + M_{fr1} +$$
$$M_{rlG1} + M_{rrG1} +$$
$$K_{rs}\{(M_{fl}\_max - M_{fl1}) +$$
$$(M_{rlG}\_max - M_{rlG1}) +$$
$$(M_{rrG0} - M_{rrG1})\}$$

Then, since a factor $K_{ls}$ is expressed by $$K_{rs} = \frac{\Delta M_S + KI\beta d_r - (M_{fl1} + M_{fr1} + M_{rlG1} + M_{rrG1})}{(M_{fl}\_max - M_{fl1}) + (M_{rlG}\_max - M_{rlG1}) + (M_{rrG0} - M_{rrG1})},$$

a target moment for each wheels may be set out as:

$$M_{fl2} = (1-K_{rs})M_{fl1} + K_{rs}M_{fl}\_max$$

$$M_{rlG2} = (1-K_{rs})M_{rlG1} + K_{rs}M_{rlG}\_max$$

$$M_{rrG2} = (1-K_{rs})M_{rrG1} + K_{rs}M_{rrG0} \tag{5.36}$$

(3) When the Braking Performance is Preferred
If $$(M_{fl}+M_{fr}+M_{rlG}+M_{rrG})+Mns=\Delta Ms+KI\beta d_r \leq M_{fl}\_max+M_{fr1}+M_{rlG1}+M_{rrG1} \tag{5.37}$$

a total yaw moment of the vehicle should be set out as:

$$(M_{fl} + M_{fr} + M_{rlG} + M_{rrG}) + Mns = \Delta Ms + KI\beta d_r. \tag{5.38}$$

$$= M_{fl1} + M_{fr1} +$$
$$M_{rlG1} + M_{rrG1} +$$
$$K_{rs}(M_{fl}\_max - M_{fl1}).$$

Then, since a factor $K_{ls}$ is expressed by $$K_{rs} = \frac{\Delta M_S + KI\beta d_r - (M_{fl1} + M_{fr1} + M_{rlG1} + M_{rrG1})}{M_{fl}\_max - M_{fl1}},$$

a target moment for each wheel may be set out as:

$$M_{fl2} = (1-K_{rs})M_{fl1} + K_{rs}M_{fl}\_max$$

$$M_{rlG2} = M_{rlG1}$$

$$M_{rrG2} = M_{rrG1} \tag{5.39}$$

Otherwise, i.e.

$$(M_{fl}+M_{fr}+M_{rlG}+M_{rrG})+Mns=\Delta Ms+KI\beta d_r \geq M_{fl}\_max+M_{fr1}+M_{rlG1}+M_{rrG1} \tag{5.40}$$

a total yaw moment of the vehicle should be set out as:

$$(M_{fl} + M_{fr} + M_{rlG} + M_{rrG}) + Mns = \Delta Ms + KI\beta d_r. \tag{5.41}$$

$$= M_{fl}\_max + M_{fr1} +$$
$$M_{rlG1} + M_{rrG1} +$$
$$K_{rs}\{(M_{rlG}\_max - M_{rlG1}) +$$
$$(M_{rrG0} - M_{rrG1})\}.$$

Then, since a factor $K_{ls}$ is expressed by $$K_{rs} = \frac{\Delta M_S + KI\beta d_r - (M_{fl\_max} + M_{fr1} + M_{rlG1} + M_{rrG1})}{(M_{rlG\_max} - M_{rlG1}) + (M_{rrG0} - M_{rrG1})},$$

a target moment for each wheel may be set out as $M_{fl2} = M_{fl\_max}$ $M_{rlG2} = (1-K_{rs})M_{rlG1} + K_{rs}M_{rlG\_max}$ $M_{rrG2} = (1-K_{rs})M_{rrG1} + K_{rs}M_{rrG0}.$ (5.42)

(b) During Non-Braking a Vehicle
(1) Rear Wheel Drive Vehicle

The way of distributing the yaw moment Mns is basically identical to that in case (a) (1) of during braking as described above. However, $M_{rr\_max}$ is given by expression (5.28).

(2) Front Wheel Drive Vehicle

If $(M_{fl}+M_{fr}+M_{rlG}+M_{rrG})+Mns=\Delta Ms+KI\beta d_r \leq M_{fl0}+M_{fr1}+M_{rlG1}+M_{rrG1}$ (5.43)

a total yaw moment of the vehicle should be set out as:

$$(M_{fl} + M_{fr} + M_{rlG} + M_{rrG}) + Mns = \Delta Ms + KI\beta d_r. \quad (5.44)$$
$$= M_{fl1} + M_{fr1} +$$
$$M_{rlG1} + M_{rrG1} +$$
$$K_{rs}(M_{fl0} - M_{fl1}).$$

Then, since a factor $K_{ls}$ is expressed by $$K_{rs} = \frac{\Delta M_S + KI\beta d_r - (M_{fl1} + M_{fr1} + M_{rlG1} + M_{rrG1})}{M_{fl0} - M_{fl1}},$$

a target moment for each wheel may be set out as:

$M_{fl2} = (1-K_{rs})M_{fl1} + K_{rs}M_{fl0}$ $M_{rlG2} = M_{rlG1}.$ (5.45)

If $M_{fl0}+M_{fr1}+M_{rlG1}+M_{rrG1} < (M_{fl}+M_{fr}+M_{rlG}+M_{rrG})+Mns = \Delta Ms+KI\beta d_r \leq M_{fl0}+M_{fr1}+M_{rlG\_max}+M_{rrG1},$ (5.46)

a total yaw moment of the vehicle should be set out as:

$$(M_{fl} + M_{fr} + M_{rlG} + M_{rrG}) + Mns = \Delta Ms + KI\beta d_r. \quad (5.47)$$
$$= M_{fl0} + M_{fr1} +$$
$$M_{rlG1} + M_{rrG1} +$$
$$K_{rs}(M_{rlG\_max} - M_{frG1}).$$

Then, since a factor $K_{ls}$ is expressed by $$K_{rs} = \frac{\Delta M_S + KI\beta d_r - (M_{fl0} + M_{fr1} + M_{rlG1} + M_{rrG1})}{M_{rlG\_max} - M_{rlG1}},$$

a target moment for each wheel may be set out as:

$M_{fl2} = M_{fl0}$ $M_{rlG2} = (1-K_{rs})M_{rlG1} + K_{rs}M_{rlG\_max}.$ (5.48)

Otherwise, a total yaw moment of the vehicle should be set out as:

$$(M_{fl} + M_{fr} + M_{rlG} + M_{rrG}) + Mns = \Delta Ms + KI\beta d_r. \quad (5.49)$$
$$= M_{fl0} + M_{fr1} +$$
$$M_{rlG\_max} + M_{rrG1} +$$
$$K_{rs}(M_{fl0} - M_{fl\_max}),$$

since a factor $K_{ls}$ is expressed by $$K_{rs} = \frac{\Delta M_S + KI\beta d_r - (M_{fl0} + M_{fr1} + M_{rlG\_max} + M_{rrG1})}{M_{fl\_max} - M_{fl1}},$$

a target moment for each wheel may be set out as $M_{fl2} = (1-K_{rs})M_{fl0} + K_{rs}M_{fr\_max}$ $M_{rlG2} = M_{rlG\_max}$ (5.50)

(3) Four Wheel Drive Vehicle

If $(M_{fl}+M_{fr}+M_{rlG}+M_{rrG})+Mns=\Delta Ms+KI\beta d_r \leq M_{fl0}+M_{fr1}+M_{rlG1}+M_{rrG1},$ (5.51)

a total yaw moment of the vehicle should be set out as:

$$(M_{fl} + M_{fr} + M_{rlG} + M_{rrG}) + Mns = \Delta Ms + KI\beta d_r. \quad (5.52)$$
$$= M_{fl0} + M_{fr1} +$$
$$M_{rlG1} + M_{rrG1} +$$
$$K_{rs}(M_{fl0} - M_{fl1}).$$

Then, since a factor $K_{ls}$ is expressed by $$K_{rs} = \frac{\Delta M_S + KI\beta d_r - (M_{fl1} + M_{fr1} + M_{rlG1} + M_{rrG1})}{M_{fl0} - M_{fl1}},$$

a target moment for each wheel may be set out as:

$M_{fl2} = (1-K_{rs})M_{fl1} + K_{rs}M_{fl0}$ $M_{rlG2} = M_{rlG1}$ $M_{rrG2} = M_{rrG1}.$ (5.53)

If $M_{fl0}+M_{fr1}+M_{rlG1}+M_{rrG1} < (M_{fl}+M_{fr}+M_{rlG}+M_{rrG})+Mns = \Delta Ms+KI\beta d_r \leq M_{fl0}+M_{fr1}+M_{rlG\_max}+M_{rrG\_max},$ (5.54)

a total yaw moment of the vehicle should be set out as:

$$(M_{fl} + M_{fr} + M_{rlG} + M_{rrG}) + Mns = \Delta Ms + KI\beta d_r. \quad (5.55)$$
$$= M_{fl0} + M_{fr1} + M_{rlG1} + M_{rrG1} +$$
$$K_{rs}\{(M_{rlG\_max} - M_{rlG1}) +$$
$$(M_{rrG\_max} - M_{rrG1})\}.$$

Then, since a factor $K_{ls}$ is expressed by $$K_{rs} = \frac{\Delta M_S + KI\beta d_r - (M_{fl0} + M_{fr1} + M_{rlG1} + M_{rrG1})}{(M_{rlG\_max} - M_{rlG1}) + (M_{rrG\_max} - M_{rrG1})},$$

a target moment for each wheel may be set out as:

$M_{fl2} = M_{fl0}$ $M_{rlG2} = (1-K_{rs})M_{rlG1} + K_{rs}M_{rlG\_max}$ $M_{rrG2} = (1-K_{rs})M_{rrG1} + K_{rs}M_{rrG\_max}.$  (5.56)

Otherwise,
a total yaw moment of the vehicle should be set out as:

$(M_{fl} + M_{fr} + M_{rlG} + M_{rrG}) + Mns = \Delta Ms + KI\beta d_r.$  (5.57)

$= M_{fl0} + M_{fr1} +$ $M_{rlG\_max} + M_{rrG\_max} +$ $K_{rs}(M_{fl\_max} - M_{fl0}).$ Since a factor $K_{ls}$ is expressed by $$K_{rs} = \frac{\Delta M_S + KI\beta d_r - (M_{fl0} + M_{fr1} + M_{rlG\_} + M_{rrG\_max})}{M_{fl\_max} - M_{fl0}},$$

a target moment for each wheel may be set out as $M_{fl2} = (1-K_{rs})M_{fl0} + K_{rs}M_{fl\_max}$ $M_{rlG2} = M_{rlG\_max}$ $M_{rrG2} = M_{rrG\_max}.$  (5.58)

(c) Simplified Process $M_{fl2} = MAX\{Mns - (M_{fr} + M_{rlG} + M_{rrG}), M_{fl\_max}^*\}$  (5.59)

(iii) Calculation of Second Target Longitudinal Forces
(a) Front Outside Wheels
For a large $|\beta_{fl}|$ i.e. $F_{XDfl} \geq F_2$:

$M_{fl2} = \{-(Tr/2)\cos\delta + L_f \sin\delta\} \cdot F_{Xfl2} + \{(Tr/2)\sin\delta + L_f \cos\delta\} \cdot F_{Yfl2}$ where $F_{Yfl2} = -(\mu_{maxi}^2 F_{zfl}^2 - F_{Xfl2}^2)^{1/2}.$  (5.60)

$$F_{Xfl2} = \frac{\left(-\frac{Tr}{2}\cos\delta + L_f\sin\delta\right)M_{fl2}}{\frac{Tr^2}{4} + L_f^2} -$$  (5.61)

$$\frac{\left(\frac{Tr}{2}\sin\delta + L_f\cos\delta\right)\sqrt{\left(\frac{Tr^2}{4} + L_f^2\right)\mu_{maxfl}^2 F_{Zfl}^2 - M_{fl2}^2}}{\frac{Tr^2}{4} + L_f^2}$$

For a small $|\beta_{fl}|$, i.e. $F_{XDfl} \leq F_2$, $F_{Yfl2} = \{(1+S_{fl})/S_{fl}\}(K_{\beta fl}/K_{Sfl})\tan\beta_{fl} \cdot F_{Xfl2}$  (5.62)

$M_{fl2}\{-(Tr/2)\cos\delta + L_f \sin\delta\}F_{Xfl2} + \{(Tr/2)\sin\delta + L_f \cos\delta\}F_{Yfl2}$  (5.63)

$$F_{Xfl2} = \frac{M_{fl2}}{\left(-\frac{Tr}{2}\cos\delta + L_f\sin\delta\right) + \left(\frac{Tr}{2}\sin\delta + L_f\cos\delta\right)\frac{1+S_{fl}}{S_{fl}}\frac{K_{\beta fl}}{K_{Sfl}}\tan\beta_{fl}}$$  (5.64)

$$F_{Xfl2} = MAX\left\{\frac{M_{fl2}}{\left(-\frac{Tr}{2}\cos\delta + L_f\sin\delta\right) + \left(\frac{Tr}{2}\sin\delta + L_f\cos\delta\right)\frac{1+S_{fl}}{S_{fl}}\frac{K_{\beta fl}}{K_{Sfl}}\tan\beta_{fl}},\right.$$  (5.65)

$$\frac{\left(-\frac{Tr}{2}\cos\delta + L_f\sin\delta\right)M_{fl2}}{\frac{Tr^2}{4} + L_f^2} -$$

$$\left.\frac{\left(\frac{Tr}{2}\sin\delta + L_f\cos\delta\right)\sqrt{\left(\frac{Tr^2}{4} + L_f^2\right)\mu_{maxfl}^2 F_{Zfl}^2 - M_{fl2}^2}}{\frac{Tr^2}{4} + L_f^2}\right\}$$

(b) Rear Outside (Left) Wheel $M_{rlG2} = -(Tr/2)F_{Xrl2} - L_r(\mu_{max\,rl}^2 F_{Zrl}^2 - F_{Xrl2}^2)^{1/2}$  (5.66)

$$F_{Xrl2} = \frac{-TrM_{rlG2} \pm L_r\sqrt{(Tr^2 + 4L_r^2)\mu_{max\,rl}^2 F_{Zrl}^2 - 4M_{rlG2}^2}}{2\left(\frac{Tr^2}{4} + L_r^2\right)},$$  (5.67)

If $F_{Xrl1} \geq -\mu_{max\,rl}F_{Zrl}\sin(\arctan((Tr/2)/L_r))$, (the result of + sign) is selected.

If $F_{Xrl1} < -\mu_{max\,rl}F_{Zrl}\sin(\arctan((Tr/2)/L_r))$, (the result of − sign) is selected.

(c) Rear Inside (Right) Wheel $M_{rrG2} = (Tr/2)F_{Xrr2} - L_r(\mu_{max\,rr}^2 F_{Zrr}^2 - F_{Xrr2}^2)^{1/2}.$  (5.68)

$$F_{Xrr2} = \frac{TrM_{rrG2} \pm L_r\sqrt{(Tr^2 + 4L_r^2)\mu_{max\,rr}^2 F_{Zrr}^2 - 4M_{rrG2}^2}}{2\left(\frac{Tr^2}{4} + L_r^2\right)},$$  (5.69)

If $F_{Xrl1} \geq \mu_{max\,rr} F_{Zrr} \sin(\arctan(Tr/2L_r))$, (the result of + sign) is selected.

If $F_{Xrr1} < \mu_{max\,rr} F_{Zrr} \sin(\arctan(Tr/2L_r))$, (the result of − sign) is selected.

(d) Alternative Solution of Expression (5.63)

$$F_{Xfl2} = \frac{M_{fl2} + \left(\frac{Tr}{2}\sin\delta + L_f\cos\delta\right)(F_{Yfl} - F_{Xfl}XYS_{fl})}{\left(-\frac{Tr}{2}\cos\delta + L_f\sin\delta\right) - \left(\frac{Tr}{2}\sin\delta + L_f\cos\delta\right)XYS_{fl}},$$  (5.70)

where $$XYS_{fl} = \frac{\frac{\partial F_{Yfl}}{\partial S}}{\frac{\partial F_{Xfl}}{\partial S}}, \quad \frac{\partial F_{Xfl}}{\partial S} = -\frac{1}{\lambda}\left(1 - \frac{S_{fl}}{\lambda}\frac{\partial \lambda}{\partial S}\right)F_{XYfl},$$

$$\frac{\partial F_{Yfl}}{\partial S} = -\frac{K_{\beta fl}}{K_{Sfl}}\tan\beta_{fl} \cdot \frac{1}{\lambda}\left(1 - \frac{1+S_{fl}}{\lambda}\frac{\partial \lambda}{\partial S}\right)F_{XYfl}.$$

I-5-4 Calculations of Third Target Longitudinal Forces $F_{Xti3}$ (Target Forces for Suppressing and/or Avoiding Drift-Out Condition)

For the suppression of a drift condition, a control yaw moment against drifting Mnd is generated by either of the wheels so as to establish $$(M_{flG}+M_{frG}+M_{rlG}+M_{rrG})+Mnd-KI\beta d_r=\Delta M_d \quad (5.73)$$

Mnd should be distributed to the wheels so as to satisfy $$M_{flG}+M_{frG}+M_{rlG}+M_{rrG}-KI\beta d_r \leq \Delta M_d, \quad (5.74)$$

after a controlling process.
(i) Calculation of Parameters
Effective Yaw Moments Against Drifting
(a) Front Inside (Right) Wheel $$i\ M_{frG\_min}=-\mu_{max\ fr}\ F_{Zfr}\cdot L_f/\cos(\arctan((Tr/2)/L_f)). \quad (5.75)$$

(1) $\delta > -\arctan\{(Tr/2)/Lr\}$, and $F_{Xfl1} < -\mu_{max}\ F_{Zfr}\sin(\arctan((Tr/2)/Lr)+\delta))$ (2) $\delta \leq -\arctan\{(Tr/2)/Lr\}$, and $F_{Xfl1} < 0$, $$M_{frG\_min}=\{(Tr/2)\cos \delta + L_f \sin \delta\}\cdot F_{Xfr1}+\{-(Tr/2)\sin \delta + L_f \cos \delta\}\cdot F_{YfrG1} \quad (5.76)$$

where $F_{YfrG1}=-(\mu_{max\ fr}^2\ F_{zfr}^2-F_{Xfr1}^2)^{1/2}$.

(b) Rear Inside (Right) Wheel
For $F_{Xrr1} > \mu_{maxrr}\ F_{Zrr}\sin(\arctan(Tr/(2Lr)))$, $$M_{rrG\_min}=(Tr/2)F_{XBrr}-L_r(\mu_{max\ rr}^2 F_{Zrr}^2-F_{XBrr}^2)^{1/2}, \quad (5.77)$$

For $F_{Xrr1} \leq \mu_{maxrr}\ F_{Zrr}\sin(\arctan(Tr/(2Lr)))$, $$M_{rrG\_min}=(Tr/2)MIN(F_{XDrr},-K_{FXrl}\mu_{max\ rr}F_{Zrr})+L_r(\mu_{max\ rr}^2F_{Zrr}^2-MIN(F_{XDrr},-K_{FXrl}\mu_{max\ rr}F_{Zrr})^2)^{1/2} \quad (5.78)$$

(c) Rear Outside (Left) Wheel
For $F_{Xrl1} > -\mu_{max\ rl}\ F_{Zrl}\sin(\arctan(Tr/(2Lr)))$:
During braking, $$M_{rlG\_min}=-\mu_{max\ rl}F_{Zrl}Lr \quad (5.79)$$

During non-braking, $$M_{rlG\_mim}=-(Tr/2)MAX(F_{XBrl},K_{FXrl}\mu_{max\ rl}F_{Zrl})+L_r(\mu_{max\ rl}^2F_{Zrl}^2-MAX(F_{XBrl},K_{FXrl}\mu_{max\ rl}F_{Zrl})^2)^{1/2}. \quad (5.80)$$

For $F_{Xrl1} < -\mu_{max\ rl}\ F_{Zrl}\sin(\arctan(Tr/(2Lr)))$, $$M_{rlG\_min}=-(Tr/2)F_{XDrl}+L_r(\mu_{max\ rl}^2F_{Zrl}^2-F_{XDrl}^2)^{1/2}. \quad (5.81)$$

(ii) Determination of a Target Yaw Moment for Each Wheel
General expressions for distributing Mnd are as follows:
A total yaw moment of the vehicle should be set out as:

$$(M_{fl}+M_{fr}+M_{rlG}+M_{rrG})+Mns = \Delta Ms + KI\beta d_r. \quad (5.82)$$

$$= M_{flG1}+M_{frG1}+$$
$$M_{rlG1}+M_{rrG1}+$$
$$K_{rd}\{(M_{frG\_min}-M_{frG1})+$$
$$(M_{rlG\_min}-M_{rlG1})+$$
$$(M_{rrG\_min}-M_{rrG1})\}.$$

Then, since a factor $K_{ld}$ is expressed by $$K_{rd}=\frac{\Delta M_d + KI\beta d_r - (M_{flG1}+M_{frG1}+M_{rlG1}+M_{rrG1})}{(M_{frG\_min}-M_{frG1})+(M_{rlG\_min}-M_{rlG1})+(M_{rrG\_min}-M_{rrG1})}, \quad (5.82a)$$

a target moments for each wheel may be set out as:

$$M_{frG3}=(1-Kr_d)M_{frG1}+K_{rd}M_{frG\_min}$$

$$M_{rlG3}=(1-K_{rd})M_{rlG1}+K_{rd}M_{rlG\_min}$$

$$M_{rrG3}=(1-K_{rd})M_{rrG1}+K_{rd}M_{rrG\_min}. \quad (5.83)$$

(a) Distributing to Three Wheels
During Braking
(1) $\delta > -\arctan\{(Tr/2)/Lr\}$, and $F_{Xfl1} < -\mu_{max}\ F_{Zfr}\sin(\arctan((Tr/2)/Lr)+\delta))$
(2) $\delta \leq -\arctan\{(Tr/2)/Lr\}$, and $F_{Xfl1}<0$,
the term ($M_{frG\_min}-M_{frG1}$) is cancelled.

$$F_{Xrl1} > -\mu_{max\ rl}F_{Zrl}\sin(\arctan(Tr/(2Lr))), M_{rlG\_min}=\mu_{max\ rl}F_{Zrl}Lr.$$

Otherwise, expression (5.81) is applied.
(b) Distributing to Three Wheels
During Non-Braking
In a rear wheel drive vehicle and a four wheel drive vehicle:
the force on the rear inside wheel, should be
increased toward point B if $F_{Xrr1}>\mu_{max\ rr}F_{Zrr}\sin(\arctan(Tr/(2Lr)))$
and decreased toward point D if $F_{Xrr1}\leq\mu_{max\ rr}F_{Zrr}\sin(\arctan(Tr/(2Lr)))$.

$M_{iG\_min}$ to be used in the general expressions for each case has been defined in the previous sub section (i).
In a front wheel drive vehicle:
In the general expressions, the term ($M_{rlG\_min}-M_{rlG1}$) is cancelled.
(c) Generating Mnd Only by the Rear Left Wheel $$M_{rrG3}=MIN(M_{rrG\_min}, \Delta M_d-(M_{flG}+M_{frG}+M_{rlG})) \quad (5.84).$$

(d) Generating Mnd by Rear Wheels
If $M_{rrG1}-M_{rrG\_min}\geq M_{rlG1}-M_{rlG\_min}$,
General expressions (5.82–83), where $M_{frG\_min}=M_{frG1}$,
If $M_{rrG1}-M_{rrG\_min}<M_{rlG1}-M_{rlG\_min}$, $$M_{rlG3}=\tfrac{1}{2}(\Delta M_d+KI\beta d_r+M_{flG1}+M_{frG1}+M_{rlG1}-M_{rrG1})$$

$$M_{rrG3}=\tfrac{1}{2}(\Delta M_d+KI\beta d_r+M_{flG1}+M_{frG1}-M_{rlG1}+M_{rrG1}).$$

Then if $M_{rrG3}\geq M_{rrG\_min}$, $$M_{rlG3}\to MAX(M_{rlG3}, M_{rlG\_min})$$

$$M_{rrG3}\to MAX(M_{rrG3}, M_{rrG\_min}). \quad (5.85).$$

(iii) Calculation of Third Target Longitudinal Forces
(a) Front Inside Wheels $$M_{frG3}=\{(Tr/2)\cos \delta+L_f\sin \delta\}\cdot F_{Xfr3}+\{-(Tr/2)\sin \delta+L_f\cos \delta\}\cdot F_{YfrG3}$$

where $$F_{YfrG3}=-(\mu_{maxfr}^2\ F_{zfr}^2-F_{Xfr3}^2)^{1/2}. \quad (5.87).$$

$$F_{XfrG3} = \frac{\left(\frac{Tr}{2}\cos\delta + L_f\sin\delta\right)M_{frG3}}{\frac{Tr^2}{4} + L_f^2} \pm \quad (5.88)$$

$$\frac{\left(-\frac{Tr}{2}\sin\delta + L_f\cos\delta\right)\sqrt{\left(\frac{Tr^2}{4} + L_f^2\right)\mu_{\max\,fr}^2 F_{Zfr}^2 - M_{frG3}^2}}{\frac{Tr^2}{4} + L_f^2},$$

If $F_{Xfr1} > -\mu_{\max\,fr} F_{Zfr} \sin(\arctan(Tr/2L_f)+\delta)$, the result of + sign is selected.

If $F_{Xfl1} \leq -\mu_{\max\,fr} F_{Zfr} \sin(\arctan(Tr/2L_f)+\delta)$, $F_{Xfl3} = F_{Xfl1}$.

(b) Rear Inside (Right) Wheel $$M_{rrG3} = (Tr/2)F_{Xrr3} - L_r(\mu_{\max\,rr}^2 F_{Zrr}^2 - F_{Xrr3}^2)^{1/2}. \quad (5.89)$$

$$F_{Xrr3} = \frac{TrM_{rrG3} \pm L_r\sqrt{(Tr^2 + 4L_r^2)\mu_{\max\,rr}^2 F_{Zrr}^2 - 4M_{rrG3}^2}}{2\left(\frac{Tr^2}{4} + L_r^2\right)}, \quad (5.90)$$

If $F_{Xrr1} \geq \mu_{\max\,rr} F_{Zrr} \sin(\arctan(Tr/2L_r))$, the result of + sign is selected.

If $F_{Xrr1} < \mu_{\max\,rr} F_{Zrr} \sin(\arctan(Tr/2L_r))$, the result of − sign is selected.

(c) Rear Outside (Left) Wheel $$M_{rlG3} = -(Tr/2)F_{Xrl3} + L_r(\mu_{\max\,rl}^2 F_{Zrl}^2 - F_{Xrl3}^2)^{1/2}. \quad (5.91)$$

$$F_{Xrl3} = \frac{-TrM_{rlG3} \pm L_r\sqrt{(Tr^2 + 4L_r^2)\mu_{\max\,rl}^2 F_{Zrl}^2 - 4M_{rlG3}^2}}{2\left(\frac{Tr^2}{4} + L_r^2\right)}, \quad (5.92)$$

If $F_{Xrl1} \geq -\mu_{\max\,rl} F_{Zrl} \sin(\arctan(Tr/2L_r))$, the result of + sign is selected.

If $F_{Xrl1} < -\mu_{\max\,rl} F_{Zrl} \sin(\arctan(Tr/2L_r))$, the result of − sign is selected.

I-5-5 Selection of Target Longitudinal Forces Fti for Each Wheel

Front left wheel

| | | |
|---|---|---|
| Under spin condition | $Ft_{Xfl} = MIN (F_{Xfl1}, F_{Xfl3})$ | (5.93) |
| Otherwise | $Ft_{Xfl} = F_{Xfl1}$ | |

Front right wheel

| | | |
|---|---|---|
| Under drift condition | $Ft_{Xfr} = MIN (F_{Xfr1}, F_{Xfr2})$ | (5.94) |
| Otherwise | $Ft_{Xfr} = F_{Xfr1}$ | |

Rear left wheel
When $F_{Xrl1} \geq -\mu_{\max\,rl} F_{Zrl} \sin(\arctan(Tr/2L_r))$,

| | | |
|---|---|---|
| Under Spin condition | $Ft_{Xrl} = MIN (F_{Xrl1}, F_{Xrl2})$ | (5.95) |
| Under Drift condition | $Ft_{Xrl} = MAX (F_{Xrl1}, F_{Xrl3})$ | |
| Otherwise | $Ft_{Xrl} = F_{Xrl1}$ | |

When $F_{Xrl1} < -\mu_{\max\,rl} F_{Zrl} \sin(\arctan(Tr/2L_r))$,

| | | |
|---|---|---|
| Under Spin condition | $Ft_{Xrl} = MAX (F_{Xrl1}, F_{Xrl2})$ | (5.96) |
| Under Drift condition | $Ft_{Xrl} = MIN (F_{Xrl1}, F_{Xrl3})$ | |
| Otherwise | $Ft_{Xrl} = F_{Xrl1}$ | |

Rear right wheel
When $F_{Xrr1} \geq \mu_{\max\,rr} F_{Zrr} \sin(\arctan(Tr/2L_r))$,

| | | |
|---|---|---|
| Under Spin condition | $Ft_{Xrr} = MIN (F_{Xrr1}, F_{Xrr2})$ | (5.97) |
| Under Drift condition | $Ft_{Xrr} = MAX (F_{Xrr1}, F_{Xrr3})$ | |
| Otherwise | $Ft_{Xrr} = F_{Xrr1}$ | |

When $F_{Xrr1} < \mu_{\max\,rr} F_{Zrr} \sin(\arctan(Tr/2L_r))$,

| | | |
|---|---|---|
| Under Spin condition | $Ft_{Xrr} = MAX (F_{Xrr1}, F_{Xrr2})$ | (5.98) |
| Under Drift condition | $Ft_{Xrr} = MIN (F_{Xrr1}, F_{Xrr3})$ | |
| Otherwise | $Ft_{Xrr} = F_{Xrr1}$ | |

What is claimed is:

1. A device for controlling a running behavior of a vehicle, the vehicle having a vehicle body and wheels, comprising:
   means for estimating a road reaction force generated on each of the wheels;
   means for calculating a yaw moment around a centroid of the vehicle body generated by the road reaction force on each of the wheels; and
   means for controlling driving and braking forces on each of the wheels based upon said yaw moments so as to stabilize a running of the vehicle,
   wherein said driving and braking force controlling means includes calculation means to calculate a yaw moment required to be added to the vehicle body so as to stabilize the vehicle running, and controls the driving and braking forces on each of the wheels so as to add said required yaw moment to the vehicle body, said required yaw moment being calculated based upon a yaw moment presently generated by the road reaction force on each of the wheels and a yaw moment estimated to be realized through the control of the driving and braking forces on each of the wheels.

2. A device according to claim 1, wherein said driving and braking force controlling means calculates target driving and braking forces for each of the wheels based upon said required yaw moment, and controls the driving and braking forces on each of the wheels based upon said target driving and braking forces.

3. A device according to claim 1, wherein said calculation means estimates, based upon a tire model, a road reaction force which can be generated on each of the wheels, and calculates said yaw moment which can be generated on each of the wheel according to the presently generated road reaction force and said road reaction force which can be generated on each of the wheels.

4. A device according to claim 1, wherein said driving and braking force controlling means controls the driving and braking forces on each of the wheels so that a magnitude of a sum of the presently generated yaw moments is reduced by said required yaw moment being added to the vehicle body when the direction of said sum of yaw moments is identical to the turning direction of the vehicle and the magnitude of said sum of yaw moments is too large.

5. A device according to claim 4, wherein said wheels include front left and right wheels and rear left and right wheels; and said driving and braking force controlling means judges that said magnitude of said yaw moment sum is too large and the vehicle is under a spin condition if $M_{fl} + M_{fr} + M_{rlG} + M_{rrG}$ is out of a predetermined range, where $M_{fl}$ and $M_{fr}$ denote yaw moments around the centroid of the vehicle body generated by the road reaction force on the front left and right wheels, respectively, and $M_{rlG}$ and $M_{rrG}$ denote critical yaw moments at the present longitudinal forces on the rear wheels, respectively; said critical yaw moment being defined as a yaw moment which can be generated around the centroid of the vehicle body assuming that a road reaction force is maximized while maintaining its longitudinal force component.

6. A device according to claim 5, wherein said driving and braking force controlling means judges that $M_{fl}+M_{fr}+M_{rlG}+M_{rrG}$ is out of a predetermined range if $M_{fl}+M_{fr}+M_{rlG}+M_{rrG}$ is larger than a negative reference value for judgement when the vehicle is making a left turn or if $M_{fl}+M_{fr}+M_{rlG}+M_{rrG}$ is smaller than a positive reference value for judgement when the vehicle is making a right turn, where the direction of the left turn of the vehicle is defined as the positive direction of a yaw moment.

7. A device according to claim 6, wherein said driving and braking force controlling means controls the driving and braking forces on each of the wheels such that $M_{fl}+M_{fr}+M_{rlG}+M_{rrG}$ is not more than a negative control reference value $-\Delta Ms$ if $M_{fl}+M_{fr}+M_{rlG}+M_{rrG}$ is larger than said negative reference value for judgement when the vehicle is making a left turn, and $M_{fl}+M_{fr}+M_{rlG}+M_{rrG}$ is not less than a positive control reference value $\Delta Ms$ if $M_{fl}+M_{fr}+M_{rlG}+M_{rrG}$ is smaller than said positive reference value for judgement when the vehicle is making a right turn.

8. A device according to claim 7, wherein said driving and braking force controlling means calculates a target yaw moment for an outside one of the front wheels relative to a turning center of the vehicle in order that $M_{fl}+M_{fr}+M_{rlG}+M_{rrG}$ is not more than said negative control reference value $-\Delta Ms$ if $M_{fl}+M_{fr}+M_{rlG}+M_{rrG}$ is larger than said negative reference value for judgement when the vehicle is making a left turn and that $M_{fl}+M_{fr}+M_{rlG}+M_{rrG}$ is not less than said positive control reference value $\Delta Ms$ if $M_{fl}+M_{fr}+M_{rlG}+M_{rrG}$ is smaller than a positive reference value for judgement when the vehicle is making a right turn, and said driving and braking force controlling means also calculates a target longitudinal force on said front outside wheel based upon said target yaw moment and controls the driving and braking forces on said front outside wheel based upon said target longitudinal force.

9. A device according to claim 8, wherein said driving and braking force controlling means judges if a spin condition can be suppressed by a control of said front outside wheel; and calculates a target longitudinal force for said front outside wheel based upon said target yaw moment when the spin condition can be suppressed by a control of said front outside wheel; and controls the driving and braking forces on the front outside wheel based upon said target longitudinal force.

10. A device according to claim 1, wherein the driving and braking force controlling means controls the driving and braking forces on each of the wheels so as to increase a magnitude of a lateral force on the rear wheels by adding said required yaw moment to the vehicle body when the lateral forces on the front wheels reach to limits of the corresponding wheels while the lateral forces on the rear wheels have not reached to limits of the corresponding tires under a condition where the magnitude of a sum of the yaw moments is not excessive.

11. A device according to claim 10, wherein said wheels include front left and right wheels and rear left and right wheels; and said driving and braking force controlling means judges that lateral forces on the front wheels reach to the limits of the corresponding tires while lateral forces on the rear wheels have not reached to the limits of the corresponding tires and the vehicle is under a drift condition if a magnitude of a ratio of $M_{fl}+M_{fr}$ to $M_{flG}+M_{frG}$ is larger than a minimum reference value and $M_{fl}+M_{fr}+M_{rlG}+M_{rrG}$ is out of a predetermined range, where $M_{fl}$ and $M_{fr}$ denote yaw moments around the centroid of the vehicle body generated by the road reaction force on the front left and right wheels, respectively, and $M_{flG}$, $M_{frG}$, $M_{rlG}$ and $M_{rrG}$ denote critical yaw moments at the present longitudinal forces on the front left, front right, rear left and rear right wheels, respectively; said critical yaw moment being defined as a yaw moment which can be generated around the centroid of the vehicle body assuming that a road reaction force is maximized while maintaining its longitudinal force component.

12. A device according to claim 11, wherein said driving and braking force controlling means judges that the lateral forces on the front wheels reach to the limits of the corresponding tires while the lateral forces on the rear wheels have not reached to the limits of the corresponding tires and the vehicle is under a drift condition if the magnitude of the ratio of $M_{fl}+M_{fl}$ to $M_{flG}+M_{frG}$ is larger than a minimum reference value and $M_{fl}+M_{fr}+M_{rlG}+M_{rrG}$ is lower than a negative reference value for judgement when the vehicle is making a left turn or if the magnitude of the ratio of $M_{rlG}+M_{rrG}$ to $M_{flG}+M_{frG}$ is larger than a minimum reference value and $M_{fl}+M_{fr}+M_{rlG}+M_{rrG}$ is higher than a positive reference value for judgement when the vehicle is making a right turn, where the direction of the left turn of the vehicle is defined as the positive direction of a yaw moment.

13. A device according to claim 12, wherein said minimum reference value is a positive value smaller than one.

14. A device according to claim 12, wherein said driving and braking forces controlling means controls the driving and braking forces on each of the wheels such that $M_{fl}+M_{fr}+M_{rlG}+M_{rrG}$ is not less than said negative control reference value $-\Delta Md$ if $M_{fl}+M_{fr}+M_{rlG}+M_{rrG}$ is smaller than said negative reference value for judgement when the vehicle is making a left turn, and $M_{fl}+M_{fr}+M_{rlG}+M_{rrG}$ is not more than a positive control reference value $\Delta Md$ if $M_{fl}+M_{fr}+M_{rlG}+M_{rrG}$ is larger than said positive reference value for judgement when the vehicle is making a right turn.

15. A device according to claim 14, wherein said driving and braking force controlling means calculates a target yaw moment for each of the rear wheels in order that $M_{fl}+M_{fr}+M_{rlG}+M_{rrG}$ is not less than said negative control reference value $-\Delta Ms$ if $M_{fl}+M_{fr}+M_{rlG}+M_{rrG}$ is smaller than said negative reference value for judgement when the vehicle is making a left turn, and $M_{fl}+M_{fr}+M_{rlG}+M_{rrG}$ is not more than a positive control reference value $\Delta Ms$ if $M_{fl}+M_{fr}+M_{rlG}+M_{rrG}$ is larger than said positive reference value for judgement when the vehicle is making a right turn, and said driving and braking force controlling means calculates a target longitudinal force on each of the rear wheels based upon said target yaw moment and controls the driving and braking forces on said rear wheels based upon said target longitudinal force.

16. A device according to claim 15, wherein said driving and braking force controlling means calculates a maximum allowable value for a vehicle body turning yaw moment around the centroid of the vehicle body in the same direction of the turning of the vehicle to be generated by the road reaction force on each of the rear wheels, and limits said target yaw moment for each of the rear wheels if said target yaw moment exceeds said maximum allowable value.

17. A device according to claim 8, wherein said driving and braking force controlling means includes means to calculate a slip angle of each of the wheels; means to calculate a vertical load on each of the wheels; means to calculate a maximum static frictional coefficient between the wheel and a road surface of each of the wheels; means for calculating a normal running limit for a target longitudinal force for each of the wheels based upon said vertical load and said maximum static frictional coefficient; said driving and braking force controlling means preventing the target longitudinal force for each of the wheels other than the front outside wheel from exceeding the corresponding normal running limit.

18. A device according to claim 15, said driving and braking force controlling means includes means to calculate a slip angle of each of the wheels; means to calculate a vertical load on each of the wheels; means to calculate a maximum static frictional coefficient between the wheel and a road surface of each of the wheels; means for defining a normal running limit for a target longitudinal force for each of the wheels based upon said vertical load and said maximum static frictional coefficient; said driving and braking force controlling means preventing the target longitudinal force for each of the front left and right wheels from exceeding the corresponding normal running limit.

19. A device according to claim 17, wherein said normal running limit defining means defines a first range of longitudinal force in which a composite road reaction force on the wheel is not saturated to its critical value at a slip angle according to a tire model and a second range based upon a vertical load and a maximum static frictional coefficient for each of the wheels, and select, as upper and lower normal running limits for each of the wheels, the larger range from said first and second ranges.

20. A device according to claim 19, wherein said normal running limit defining means defines said second range along a longitudinal direction of the vehicle body.

21. A device according to claim 5, wherein said driving and braking force controlling means estimates a slip angle rate $\beta dr$ of the rear wheels and judges that $M_{fl}+M_{fr}+M_{rlG}+M_{rrG}-KI\beta dr$ is out of a predetermined range if $M_{fl}+M_{fr}+M_{rlG}+M_{rrG}-KI\beta dr$ is larger than a negative reference value for judgement when the vehicle is making a left turn or if $M_{fl}+M_{fr}+M_{rlG}+M_{rrG}-KI\beta dr$ is smaller than a positive reference value for judgement when the vehicle is making a right turn, where the direction of the left turn of the vehicle is defined as the positive direction of a yaw moment and KI denotes a positive constant.

22. A device according to claim 21, wherein said driving and braking forces controlling means controls the driving and braking forces on each of the wheels for satisfying that $M_{fl}+M_{fr}+M_{rlG}+M_{rrG}-KI\beta dr$ is not more than a negative control reference value $-\Delta Ms$ if $M_{fl}+M_{fr}+M_{rlG}+M_{rrG}-KI\beta dr$ is larger than said negative reference value for judgement when the vehicle is making a left turn, and $M_{fl}+M_{fr}+M_{rlG}+M_{rrG}-KI\beta dr$ is not less than a positive control reference value $\Delta Ms$ if $M_{fl}+M_{fr}+M_{rlG}+M_{rrG}-KI\beta dr$ is smaller than said positive reference value for judgement when the vehicle is making a right turn.

23. A device according to claim 22, wherein said driving and braking force controlling means calculates a spin avoiding yaw moment Mns which satisfies a condition of $M_{fl}+M_{fr}+M_{rlG}+M_{rrG}+Mns=\Delta Ms-KI\beta dr$, and controls the driving and braking force on each of the wheels so as to generate said spin avoiding yaw moment.

24. A device according to claim 23, wherein said driving and braking force controlling means calculates a target longitudinal forces for each of the wheels for generating said spin avoiding yaw moment, and controls the driving and braking force on each of the wheels based upon said target longitudinal force therefor.

25. A device according to claim 11, wherein said driving and braking force controlling means estimates a slip angle rate $\beta dr$ of the rear wheels and judges that the lateral forces on the front wheels reach to the limits of the corresponding tires while the lateral forces on the rear wheels do not reach to the limits of the corresponding tires and the vehicle is under a drift condition if a magnitude of a ratio of $M_{fl}+M_{fr}$ to $M_{flG}+M_{frG}$ is larger than a minimum reference value and $M_{fl}+M_{fr}+M_{rlG}+M_{rrG}-KI\beta dr$ is smaller than a negative reference value for judgement when the vehicle is making a left turn or if the magnitude of the ratio of $M_{rlG}+M_{rrG}$ to $M_{flG}+M_{frG}$ is larger than a minimum reference value and $M_{fl}+M_{fr}+M_{rlG}+M_{rrG}-KI\beta dr$ is larger than a positive reference value for judgement when the vehicle is making a right turn, where the direction of the left turn of the vehicle is defined as the positive direction of a yaw moment.

26. A device according to claim 25, wherein said driving and braking force controlling means controls the driving and braking forces on each of the wheels for satisfying that $M_{fl}+M_{fr}+M_{rlG}+M_{rrG}-KI\beta dr$ is not less than said negative control reference value $-\Delta Md$ if $M_{fl}+M_{fr}+M_{rlG}+M_{rrG}-KI\beta dr$ is smaller than said negative reference value for judgement when the vehicle is making a left turn, and that $M_{fl}+M_{fr}+M_{rlG}+M_{rrG}-KI\beta dr$ is not more than said positive control reference value $\Delta Md$ if $M_{fl}+M_{fr}+M_{rlG}+M_{rrG}-KI\beta dr$ is larger than said positive reference value for judgement when the vehicle is making a right turn.

27. A device according to claim 26, wherein said driving and braking force controlling means calculates a drift avoiding yaw moment Mnd which satisfies a condition of $M_{fl}+M_{fr}+M_{rlG}+M_{rrG}+Mnd=\Delta Md-KI\beta dr$ and controls the driving and braking force on each of the wheels so as to generate said drift avoiding yaw moment.

28. A device according to claim 27, wherein said driving and braking force controlling means calculates a target longitudinal force for each of the wheels for generating said drift avoiding yaw moment, and controls the driving and braking force on each of the wheels based upon said target longitudinal force therefor.

29. A device according to claim 24, wherein said driving and braking force controlling means includes means to calculate a slip angle of each of the wheels; means to calculate a vertical load on each of the wheels; means to calculate a maximum static frictional coefficient between the wheel and a road surface of each of the wheels; means for calculating a normal running limit for a target longitudinal force for each of the wheels based upon said vertical load and said maximum static frictional coefficient; said driving and braking force controlling means preventing the target longitudinal force for each of the wheels other than the wheels required for generation of said spin avoiding yaw moment from exceeding the corresponding normal running limit.

30. A device according to claim 28, wherein said driving and braking force controlling means includes means to calculate a slip angle of each of the wheels; means to calculate a vertical load on each of the wheels; means to calculate a maximum static frictional coefficient between the wheel and a road surface of each of the wheels; means for calculating a normal running limit for a target longitudinal force for each of the wheels based upon said vertical load and said maximum static frictional coefficient; said driving and braking force controlling means preventing the target longitudinal force for each of the wheels other than the wheels required for generation of said drift avoiding yaw moment from exceeding the corresponding normal running limit.

31. A device according to claim 29, wherein said normal running limit defining means defines a first range of longitudinal force in which a composite road reaction force on the wheel is not saturated to its critical value at a slip angle according to a tire model and a second range of a longitudinal force based upon a vertical load and a maximum static frictional coefficient for each of the wheels, and selects the larger range from said first and second ranges as upper and lower normal running limits for each of the wheels in each of driving and braking terms of the vehicle.

32. A device according to claim 31, wherein said normal running limit defining means defines said second range along the longitudinal direction of the vehicle body.

33. A device according to claim 23, wherein said term of $KI\beta dr$ is omitted.

34. A device according to claim 1, each of the wheels bearing a tire; wherein said road reaction force estimating means estimates a tire longitudinal force and a tire lateral force on each of the wheels, and further estimates a road reaction force on each of the wheels based upon said tire longitudinal force and said tire lateral force on each of the wheels.

35. A device according to claim 34, wherein said tire longitudinal force on each of the wheels are estimated based upon a vehicle total driving force, a braking force on each of the wheels and a wheel rotational acceleration of each of the wheels.

36. A device according to claim 35, wherein said road reaction force estimating means estimates a vehicle total driving force based upon a steering angle and a tire lateral force on either of the wheels estimated in a previous cycle.

37. A device according to claim 34, wherein said tire lateral forces on the front wheels are estimated based upon a yaw rate of the vehicle body, a lateral acceleration of the vehicle body and a longitudinal force on each of wheels.

38. A device according to claim 34, wherein said tire lateral forces on the rear wheels are estimated based upon a lateral acceleration of the vehicle body, said longitudinal forces and said lateral forces on the front wheels.

39. A device according to claim 34, further comprising said vehicle further including a differential gear device; wherein said road reaction forces are estimated allowing for a torque transmission mechanism in said differential gear device.

40. A device according to claim 34, wherein a sum of the lateral forces on the left and right wheels for each of the pairs of the front and rear wheels is estimated first, and then individual lateral forces on the left and right wheels are calculated from said sum of the lateral forces according to the ratio between the corresponding lateral forces on the left and right wheels obtained from a calculation based upon the tire model.

41. A device according to 29, wherein said normal running limits are defined individually for the pair of the front wheels, rear inside wheel and rear outside wheel.

42. A method for controlling a running behavior of a vehicle, the vehicle having a vehicle body and wheels, comprising steps of:
estimating a road reaction force generated on each of the wheels; and
calculating a yaw moment around a centroid of the vehicle body generated by the road reaction force on each of the wheels; and
controlling driving and braking forces on each of the wheels based upon said yaw moments so as to stabilize a running of the vehicle,
wherein said step of controlling said driving and braking forces includes steps of:
calculating a yaw moment required to be added to the vehicle body so as to stabilize the vehicle running, and;
controlling the driving and braking forces on each of the wheels so as to add said required yaw moment to the vehicle body, said required yaw moment being calculated based upon a yaw moment presently generated by the road reaction force on each of the wheels and a yaw moment estimated to be realized through the control of the driving and braking forces on each of the wheels.

43. A method according to claim 42, each of the wheel bearing a tire wherein said step of estimating the road reaction force includes steps of:
estimating a tire longitudinal force on each of the wheels;
estimating a tire lateral force on each of the wheels; and
estimating a road reaction force on each of the wheels based upon said tire longitudinal force and said tire lateral force on each of the wheels.

44. A method according to claim 43, wherein said tire longitudinal force on each of the wheels are estimated based upon a vehicle total driving force, a braking force on each of the wheels and a wheel rotational acceleration of each of the wheels.

45. A method according to claim 43, wherein said step of estimating the road reaction force further includes a step of: estimating a vehicle total driving force based upon a steering angle and said tire lateral force on either of the wheels estimated in a previous cycle.

46. A method according to either of claim 43, wherein said tire lateral forces on the front wheels are estimated based upon a yaw rate of the vehicle body, a lateral acceleration of the vehicle body and said longitudinal force on each of wheels.

47. A method according to claim 42, wherein said step of controlling said driving and braking forces further includes a step of:
calculating target driving and braking forces for each of the wheels based upon said required yaw moment, thereby controlling the driving and braking forces on each of the wheels based upon said target driving and braking forces.

48. A method according to claim 42, wherein said step of calculating said required yaw moment includes a step of
estimating a road reaction force which can be generated on each of the wheels based upon a tire model, thereby calculating said yaw moment which can be generated on each of the wheel according to the presently generated road reaction force and said road reaction force which can be generated on each of the wheels.

49. A method according to claim 42, wherein the driving and braking forces on each of the wheels are controlled so that a magnitude of a sum of presently generated yaw moments is reduced by said required yaw moment being added to the vehicle body when the direction of said sum of yaw moments is identical to the turning direction of the vehicle and the magnitude of said sum of yaw moments is too large.

50. A method according to claim 49, wherein said wheels include front left and right wheels and rear left and right wheels; and said step of controlling said driving and braking forces further includes a step of:
judging that said magnitude of said yaw moment sum is too large and the vehicle is under a spin condition if $M_{fl}+M_{fr}+M_{rlG}+M_{rrG}$ is out of a predetermined range, where $M_{fl}$ and $M_{fr}$ denote yaw moments around the centroid of the vehicle body generated by the road reaction force on the front left and right wheels, respectively, and $M_{rlG}$ and $M_{rrG}$ denote critical yaw moments at the present longitudinal forces on the rear wheels, respectively, said critical yaw moment being defined as a yaw moment which can be generated around the centroid of the vehicle body assuming that a road reaction force is maximized while maintaining its longitudinal force component.

51. A method according to claim 50, wherein said $M_{fl}+M_{fr}+M_{rlG}+M_{rrG}$ is judged out of a predetermined range if $M_{fl}+M_{fr}+M_{rlG}+M_{rrG}$ is larger than a negative reference value for judgement when the vehicle is making a left turn or if $M_{fl}+M_{fr}+M_{rlG}+M_{rrG}$ is smaller than a positive reference value for judgement when the vehicle is making a right turn, where the direction of the left turn of the vehicle is defined as the positive direction of a yaw moment.

52. A method according to claim 51, wherein the driving and braking forces on each of the wheels are controlled such that $M_{fl}+M_{fr}+M_{rlG}+M_{rrG}$ is not more than a negative control reference value $-\Delta Ms$ if $M_{fl}+M_{fr}+M_{rlG}+M_{rrG}$ is larger than said negative reference value for judgement when the vehicle is making a left turn, and $M_{fl}+M_{fr}+M_{rlG}+M_{rrG}$ is not less than a positive control reference value $\Delta Ms$ if $M_{fl}+M_{fr}+M_{rlG}+M_{rrG}$ is smaller than said positive reference value for judgement when the vehicle is making a right turn.

53. A method according to claim 52, wherein said step of controlling said driving and braking forces further includes steps of:

calculating a target yaw moment for the outside one of the front wheels relative to a turning center of the vehicle in order that $M_{fl}+M_{fr}+M_{rlG}+M_{rrG}$ is not more than said negative control reference value $-\Delta Ms$ if $M_{fl}+M_{fr}+M_{rlG}+M_{rrG}$ is larger than said negative reference value for judgement when the vehicle is making a left turn and that $M_{fl}+M_{fr}+M_{rlG}+M_{rrG}$ is not less than said positive control reference value $\Delta Ms$ if $M_{fl}+M_{fr}+M_{rlG}+M_{rrG}$ is smaller than a positive reference value for judgement when the vehicle is making a right turn;

calculating a target longitudinal force on said front outside wheel based upon said target yaw moment; and controlling the driving and braking forces on said front outside wheel based upon said target longitudinal force.

54. A method according to claim 50, wherein said step of controlling said driving and braking forces further includes steps of:

judging if a spin condition can be suppressed by a control of said front outside wheel;

calculating a target longitudinal force for said front outside wheel based upon said target yaw moment when the spin condition can be suppressed by a control of said front outside wheel; and controlling the driving and braking force on the front outside wheel based upon said target longitudinal force.

55. A method according to claim 42, wherein the driving and braking forces on each of the wheels are controlled so as to increase a magnitude of a lateral force on the rear wheels by adding said required yaw moment to the vehicle body when the lateral forces on the front wheels reach to limits of the corresponding wheels while the lateral forces on the rear wheels have not reached to limits of the corresponding tires under a condition where the magnitude of a sum of the yaw moments is not excessive.

56. A method according to claim 55, wherein said wheels include front left and right wheels and rear left and right wheels; and said step of controlling said driving and braking forces further includes a step of:

judging that the lateral forces on the front wheels reach to the limits of the corresponding tires while the lateral forces on the rear wheels have not reached to the limits of the corresponding tires and the vehicle is under a drift condition if a magnitude of a ratio of $M_{fl}+M_{fr}$ to $M_{flG}+M_{frG}$ is larger than a minimum reference value and $M_{fl}+M_{fr}+M_{rlG}+M_{rrG}$ is out of a predetermined range, where $M_{fl}$ and $M_{fr}$ denote yaw moments around the centroid of the vehicle body generated by the road reaction force on the front left and right wheels, respectively, and $M_{flG}$, $M_{frG}$, $M_{rlG}$ and $M_{rrG}$ denote critical yaw moments at the present longitudinal forces on the front left, front right, rear left and rear right wheels, respectively; said critical yaw moment being defined as a yaw moment which can be generated around the centroid of the vehicle body assuming that a road reaction force is maximized while maintaining its longitudinal force component.

57. A method according to claim 56, wherein it is judged that the lateral forces on the front wheels reach to the limits of the corresponding tires while the lateral forces on the rear wheels have not reached to the limits of the corresponding tires and the vehicle is under a drift condition, if the magnitude of the ratio of $M_{fl}+M_{fr}$ to $M_{flG}+M_{frG}$ is larger than a minimum reference value and $M_{fl}+M_{fr}+M_{rlG}+M_{rrG}$ is lower than a negative reference value for judgement when the vehicle is making a left turn or if the magnitude of the ratio of $M_{rlG}+M_{rrG}$ to $M_{flG}+M_{frG}$ is larger than a minimum reference value and $M_{fl}+M_{fr}+M_{rlG}+M_{rrG}$ is higher than a positive reference value for judgement when the vehicle is making a right turn, where the direction of the left turn of the vehicle is defined as the positive direction of a yaw moment.

58. A method according to claim 57, wherein said minimum reference value is a positive value smaller than one.

59. A method according to claim 57, wherein the driving and braking forces on each of the wheels are controlled such that $M_{fl}+M_{fr}+M_{rlG}+M_{rrG}$ is not less than said negative control reference value $-\Delta Md$ if $M_{fl}+M_{fr}+M_{rlG}+M_{rrG}$ is smaller than said negative reference value for judgement when the vehicle is making a left turn, and $M_{fl}+M_{fr}+M_{rlG}+M_{rrG}$ is not more than a positive control reference value $\Delta Md$ if $M_{fl}+M_{fr}+M_{rlG}+M_{rrG}$ is larger than said positive reference value for judgement when the vehicle is making a right turn.

60. A method according to claim 59, wherein said step of controlling said driving and braking forces further includes steps of:

calculating a target yaw moment for each of the rear wheels in order that $M_{fl}+M_{fr}+M_{rlG}+M_{rrG}$ is not less than said negative control reference value $-\Delta Ms$ if $M_{fl}+M_{fr}+M_{rlG}+M_{rrG}$ is larger than said negative reference value for judgement when the vehicle is making a left turn, and $M_{fl}+M_{fr}+M_{rlG}+M_{rrG}$ is not more than a positive control reference value $\Delta Ms$ if $M_{fl}+M_{fr}+M_{rlG}+M_{rrG}$ is larger than said positive reference value for judgement when the vehicle is making a right turn, calculating a target longitudinal force on each of the rear wheels based upon said target yaw moment; and controlling the driving and braking forces on said front outside wheel based upon said target longitudinal force.

61. A method according to claim 60, wherein the step of controlling said driving and braking forces further includes:

calculating a maximum allowable value for a vehicle body turning yaw moment around the centroid of the vehicle body in the same direction of the turning of the vehicle to be generated by the road reaction force on each of the rear wheels, and limiting said target yaw moment for each of the rear wheels if said target yaw moment exceeds said maximum allowable value.

62. A method according to claim 53, further comprising steps of: calculating a slip angle of each of the wheels; calculating a vertical load on each of the wheels; and calculating a maximum static frictional coefficient between the wheel and a road surface of each of the wheels; and wherein said step of controlling said driving and braking forces further includes steps of: calculating a normal running limit for a target longitudinal force for each of the wheels based upon said vertical load and said maximum static frictional coefficient; and preventing the target longitudinal force for each of the wheels other than the front outside wheel from exceeding the corresponding normal running limit.

63. A method according to claim 60, further comprising steps of: calculating a slip angle of each of the wheels; calculating a vertical load on each of the wheels; and calculating a maximum static frictional coefficient between the wheel and a road surface of each of the wheels; and wherein said step of controlling said driving and braking forces further includes steps of: defining a normal running limit for a target longitudinal force for each of the wheels based upon said vertical load and said maximum static frictional coefficient; and preventing the target longitudinal force for each of the wheels other than the front outside wheel from exceeding the corresponding normal running limit.

64. A method according to claim 62, wherein said step of defining said normal running limit includes steps of
defining a first range of a longitudinal force in which a composite road reaction force on the wheel is not saturated to its critical value at a slip angle according to a tire model and a second range based upon a vertical load and a maximum static frictional coefficient for each of the wheels; and
selecting the larger range from said first and second ranges as upper and lower normal running limits for each of the wheels.

65. A method according to claim 64, wherein said second range is defined along the longitudinal direction of the vehicle body.

66. A method according to claim 50, wherein said step of controlling said driving and braking forces includes steps of
estimating a slip angle rate $\beta dr$ of the rear wheels; and
judging that $M_{fl}+M_{fr}+M_{rlG}+M_{rrG}-KI\beta dr$ is out of a predetermined range if $M_{fl}+M_{fr}+M_{rlG}+M_{rrG}-KI\beta dr$ is larger than a negative reference value for judgement when the vehicle is making a left turn or if $M_{fl}+M_{fr}+M_{rlG}+M_{rrG}-KI\beta dr$ is smaller than a positive reference value for judgement when the vehicle is making a right turn, where the direction of the left turn of the vehicle is defined as the positive direction of a yaw moment and KI denotes a positive constant.

67. A method according to claim 66, wherein the driving and braking forces on each of the wheels are controlled such that $M_{fl}+M_{fr}+M_{rlG}+M_{rrG}-KI\beta dr$ is not more than a negative control reference value $-\Delta Ms$ if $M_{fl}+M_{fr}+M_{rlG}+M_{rrG}-KI\beta dr$ is larger than said negative reference value for judgement when the vehicle is making a left turn, and $M_{fl}+M_{fr}+M_{rlG}+M_{rrG}-KI\beta dr$ is not less than a positive control reference value $\Delta Ms$ if $M_{fl}+M_{fr}+M_{rlG}+M_{rrG}-KI\beta dr$ is smaller than said positive reference value for judgement when the vehicle is making a right turn.

68. A method according to claim 67, wherein said step of controlling said driving and braking forces includes steps of:
calculating a spin avoiding yaw moment Mns which satisfies a condition of $M_{fl}+M_{fr}+M_{rlG}+M_{rrG}+Mns=\Delta Ms-KI\beta dr$; and
controlling the driving and braking force on each of the wheels so as to generate said spin avoiding yaw moment.

69. A method according to claim 68, wherein said step of controlling said driving and braking forces includes steps of:
calculating a target longitudinal forces for each of the wheels for generating said spin avoiding yaw moment;
controlling the driving and braking force on each of the wheels based upon said target longitudinal force therefor.

70. A method according to claim 56, wherein said step of controlling said driving and braking forces includes steps of
estimating a slip angle rate $\beta dr$ of the rear wheels; and
judging that the lateral forces on the front wheels reach to the limits of the corresponding tires while the lateral forces on the rear wheels have not reached to the limits of the corresponding tires and the vehicle is under a drift condition if a magnitude of a ratio of $M_{fl}+M_{fr}$ to $M_{flG}+M_{frG}$ is larger than a minimum reference value and $M_{fl}+M_{fr}+M_{rlG}+M_{rrG}-KI\beta dr$ is smaller than a negative reference value for judgement when the vehicle is making a left turn or if the magnitude of the ratio of $M_{rlG}+M_{rrG}$ to $M_{flG}+M_{frG}$ is larger than a minimum reference value and $M_{fl}+M_{fr}+M_{rlG}+M_{rrG}-KI\beta dr$ is larger than a positive reference value for judgement when the vehicle is making a right turn, where the direction of the left turn of the vehicle is defined as the positive direction of a yaw moment.

71. A method according to claim 70, wherein the driving and braking forces on each of the wheels are controlled such that $M_{fl}+M_{fr}+M_{rlG}+M_{rrG}-KI\beta dr$ is not less than said negative control reference value $-\Delta Md$ if $M_{fl}+M_{fr}+M_{rlG}+M_{rrG}-KI\beta dr$ is smaller than said negative reference value for judgement when the vehicle is making a left turn, and that $M_{fl}+M_{fr}+M_{rlG}+M_{rrG}-KI\beta dr$ is not more than said positive control reference value $\Delta Md$ if $M_{fl}+M_{fr}+M_{rlG}+M_{rrG}-KI\beta dr$ is larger than said positive reference value for judgement when the vehicle is making a right turn.

72. A method according to claim 71, wherein said step of controlling said driving and braking forces includes steps of:
calculating a drift avoiding yaw moment Mnd which satisfy a condition of $M_{fl}+M_{fr}+M_{rlG}+M_{rrG}+Mnd=\Delta Md-KI\beta dr$; and
controlling the driving and braking force on each of the wheels so as to generate said drift avoiding yaw moment.

73. A method according to claim 72, wherein said step of controlling said driving and braking forces includes steps of:
calculating a target longitudinal forces for each of the wheels for generating said drift avoiding yaw moment; and
controlling the driving and braking force on each of the wheels based upon said target longitudinal force therefor.

74. A method according to claim 69, further comprising steps of: calculating a slip angle of each of the wheels; calculating a vertical load on each of the wheels; and calculating a maximum static frictional coefficient between the wheel and a road surface of each of the wheels; and wherein said step of controlling said driving and braking forces further includes steps of: calculating a normal running limit for a target longitudinal force for each of the wheels based upon said vertical load and said maximum static frictional coefficient; and preventing the target longitudinal force for each of the wheels other than the wheels required for generation of said spin avoiding yaw moment from exceeding the corresponding normal running limit.

75. A method according to claim 73, further comprising steps of: calculating a slip angle of each of the wheels; calculating a vertical load on each of the wheels; and calculating a maximum static frictional coefficient between the wheel and a road surface of each of the wheels; and wherein said step of controlling said driving and braking forces further includes steps of: defining a normal running limit for a target longitudinal force for each of the wheels based upon said vertical load and said maximum static frictional coefficient; and preventing the target longitudinal force for each of the wheels other than the wheels required for generation of said drift avoiding yaw moment from exceeding the corresponding normal running limit. braking terms of the vehicle.

76. A method according to claim 74, wherein said step of defining said normal running limit includes steps of defining a first range of a longitudinal force in which a composite road reaction force on the wheel is not saturated to its critical value at a slip angle according to a tire model and a second range based upon a vertical load and a maximum static frictional coefficient for each of the wheels; and selecting the larger range from said first and second ranges as upper and lower normal running limits for each of the wheels in each of driving and braking terms of the vehicle.

77. A method according to claim 76, wherein said second range is defined along the longitudinal direction of the vehicle body.

78. A method according to claim 68, wherein said term of $KI\beta dr$ is omitted.

79. A method according to either of claim 43, wherein said tire lateral forces on the rear wheels are estimated based upon a lateral acceleration of the vehicle body, said longitudinal forces and said lateral forces on the front wheels.

80. A method according to claim 43, said vehicle further including a differential gear device; wherein said road reaction forces are estimated allowing for a torque transmission mechanism in said differential gear device.

81. A method according to claim 43, wherein a sum of the lateral forces on the left and right wheels for each of the pairs of the front and rear wheels is estimated first, and then individual lateral forces on the left and right wheels are calculated from said sum of the lateral forces according to the ratio between the corresponding lateral forces on the left and right wheels obtained from a calculation based upon the tire model.

82. A method according to claim 74, wherein said normal running limits are defined individually for the pair of the front wheels, rear inside wheel and rear outside wheel.

* * * * *